US011210754B1

(12) United States Patent
Castelle

(10) Patent No.: US 11,210,754 B1
(45) Date of Patent: Dec. 28, 2021

(54) BUSINESS MODEL FOR RESIDENTIAL DEVELOPMENT OF VACANT ABANDONED LANDFILLS

(71) Applicant: Jerry Castelle, Old Bethpage, NY (US)

(72) Inventor: Jerry Castelle, Old Bethpage, NY (US)

( * ) Notice: Subject to any disclaimer, the term of this patent is extended or adjusted under 35 U.S.C. 154(b) by 0 days.

(21) Appl. No.: 17/096,601

(22) Filed: Nov. 12, 2020

Related U.S. Application Data

(60) Provisional application No. 63/070,087, filed on Aug. 25, 2020.

(51) Int. Cl.
| | |
|---|---|
| *G06Q 50/16* | (2012.01) |
| *E02D 27/02* | (2006.01) |
| *E02D 7/02* | (2006.01) |
| *E02D 7/22* | (2006.01) |
| *E02D 5/56* | (2006.01) |

(Continued)

(52) U.S. Cl.
CPC .......... *G06Q 50/165* (2013.01); *B09B 1/006* (2013.01); *E02D 5/56* (2013.01); *E02D 7/02* (2013.01); *E02D 7/22* (2013.01); *E02D 27/02* (2013.01); *E04B 1/04* (2013.01); *E04B 1/14* (2013.01); *E04B 1/24* (2013.01); *E04B 5/12* (2013.01); *E04B 7/022* (2013.01); *E04C 2/296* (2013.01); *E04C 3/17* (2013.01); *E04C 5/08* (2013.01); *E04H 1/04* (2013.01); *F24D 13/024* (2013.01); *G06Q 10/10* (2013.01); *G06Q 30/018* (2013.01); *G06Q 40/06* (2013.01); *G06Q 50/04* (2013.01);

(Continued)

(58) Field of Classification Search
None
See application file for complete search history.

(56) References Cited

U.S. PATENT DOCUMENTS 8,927,014 B2 * 1/2015 Rahmouni .......... A61K 9/1623
424/464

* cited by examiner

*Primary Examiner* — Jan P Mincarelli
(74) *Attorney, Agent, or Firm* — Jerry Castelle

(57) ABSTRACT

This invention concerns a method of doing business which is combined with several scientific advancements of technological ingenuity that results in a novel way of doing business. It in fact teaches a "business method" which creates an innovative approach to obtain annual multi-billion dollar financial revenue as monthly rental income; which results from a rather large scale residential development community of 2000 dwelling units per 50 acre parcels; each parcel being developed upon heretofore 10,000 separately abandoned "Municipal Solid Waste" MSW landfill sites throughout the United States. These apartments are exclusively geared as rentals of a 1,020 square foot-two-bedroom apartment dwellings for only Covid-19 "First Responders" and military service personnel, for the unprecedented sum of just $800/month rent. Additionally, as a supplemental "business method" approach, this instant business model also teaches how to solve the nation's Municipal Solid Waste MSW disposal problems forever into the future as an ingenious viable solution into perpetuity. Moreover, it is further postulated within this business model that further collateral financial revenue automatically inures as a natural business consequence of the sheer necessary and vital purchase of construction materials needed herein, thus positioned as a leveraged-buyout; whereby this 76 billion dollar opportunity now becomes an integral adjunct to this unique business model by adopting a "Home Depot" type retail business concept structure as additional revenue sharing for this inventor's shareholders.

2 Claims, 21 Drawing Sheets

(51) Int. Cl.
*E04B 1/14* (2006.01)
*E04B 1/04* (2006.01)
*E04C 5/08* (2006.01)
*E04B 1/24* (2006.01)
*E04B 5/12* (2006.01)
*E04C 2/296* (2006.01)
*E04B 7/02* (2006.01)
*E04C 3/17* (2006.01)
*E04H 1/04* (2006.01)
*G06Q 50/08* (2012.01)
*G06Q 50/04* (2012.01)
*G06Q 50/18* (2012.01)
*G06Q 10/10* (2012.01)
*G06Q 30/00* (2012.01)
*G06Q 40/06* (2012.01)
*F24D 13/02* (2006.01)
*B09B 1/00* (2006.01)

(52) U.S. Cl.
CPC ............. *G06Q 50/08* (2013.01); *G06Q 50/18* (2013.01); *E02D 2300/002* (2013.01)

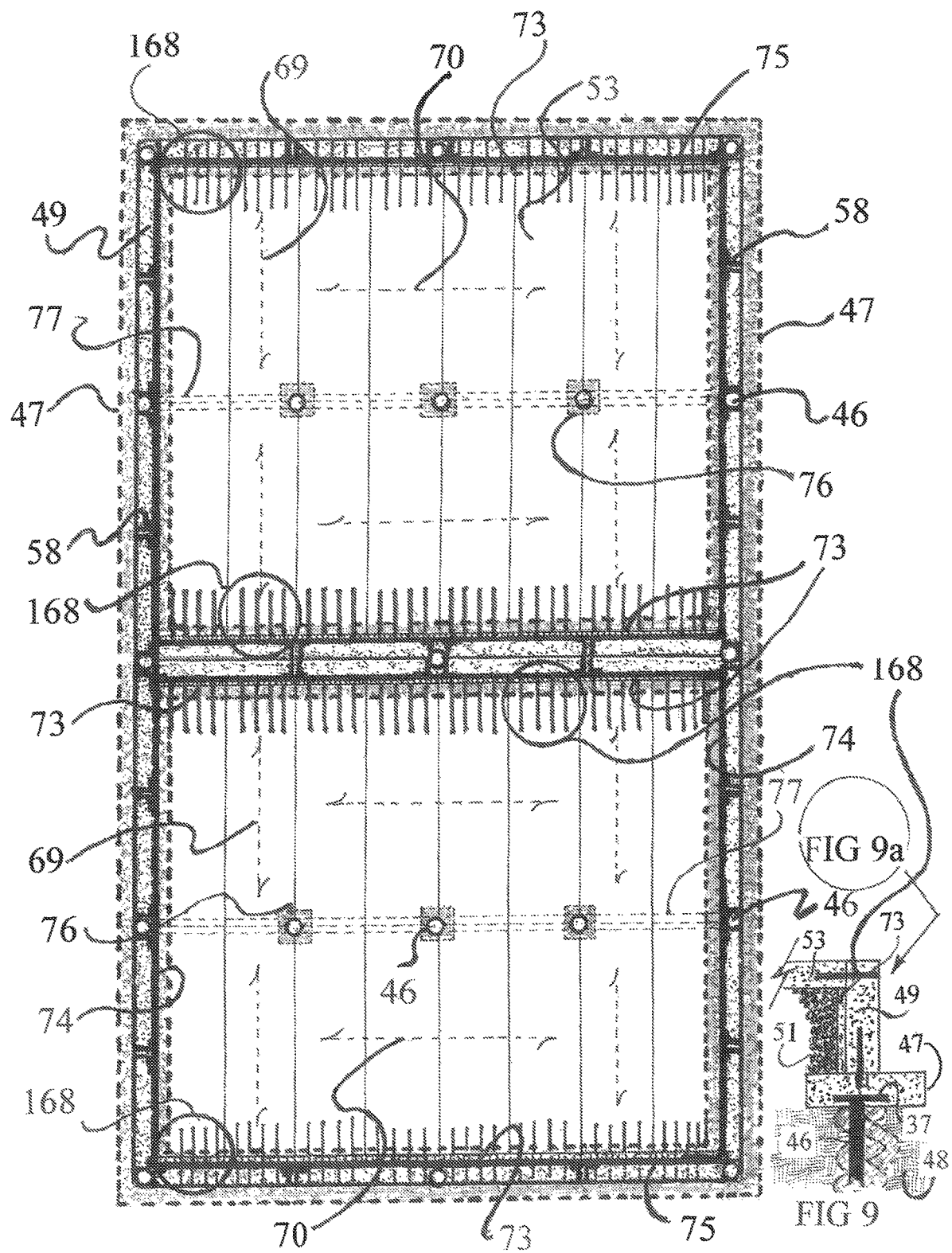

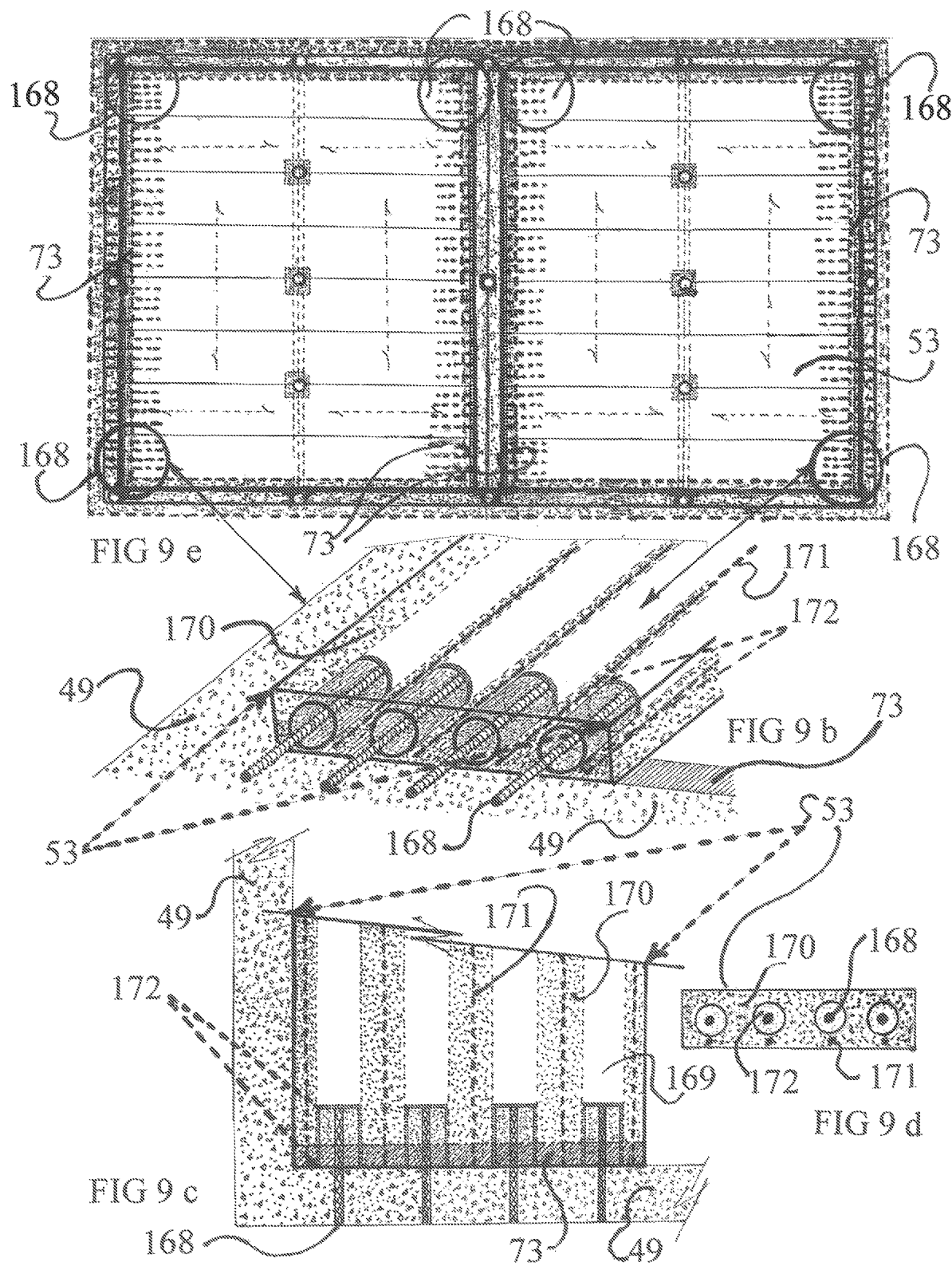

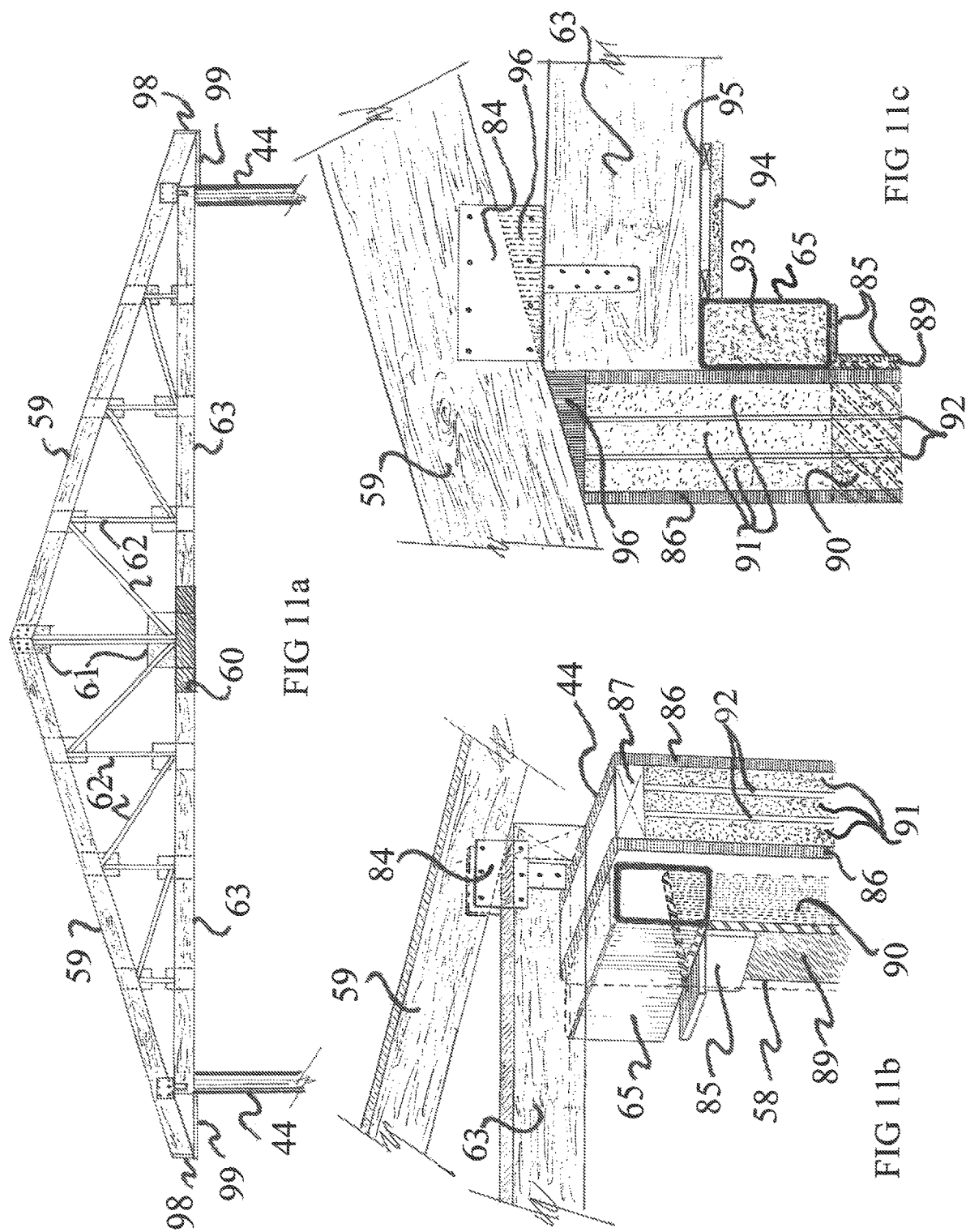

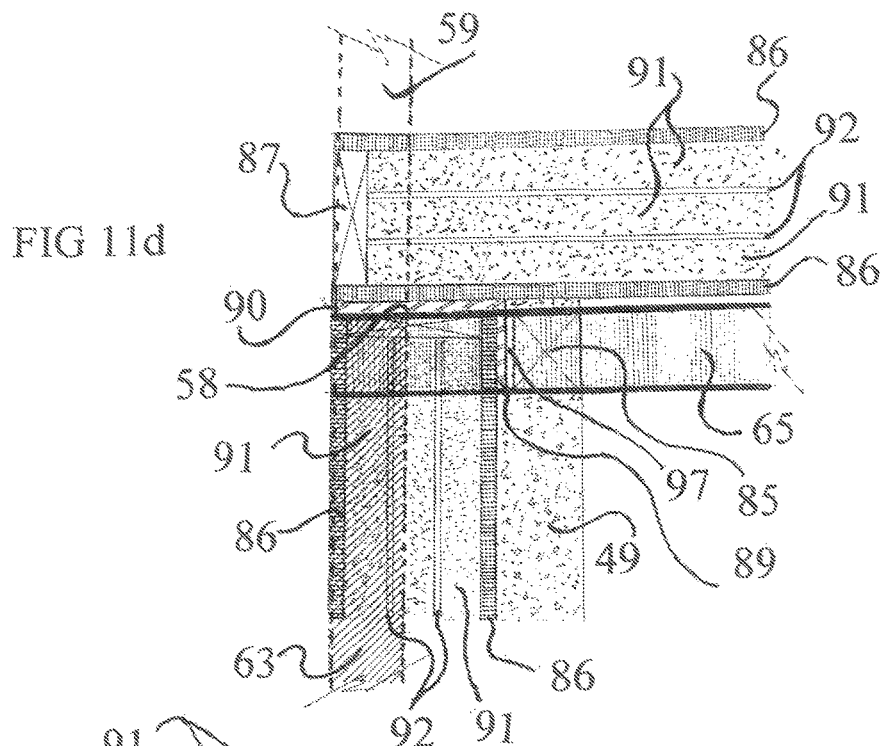
FIG 11d
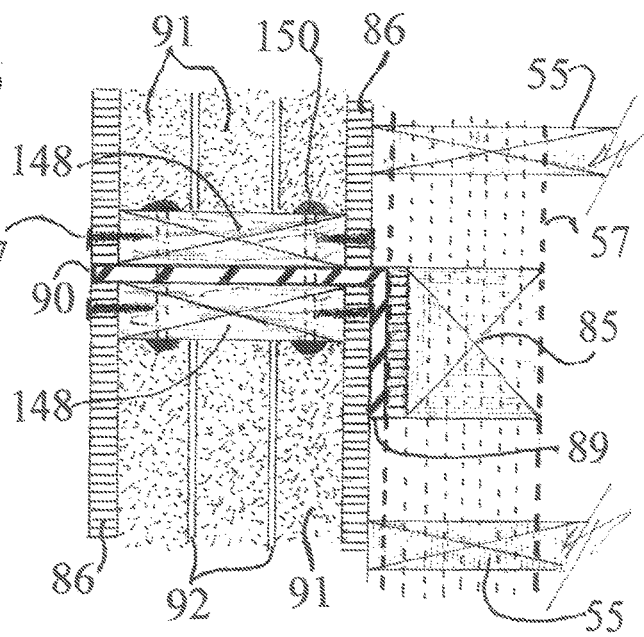
FIG 11e
FIG 11f

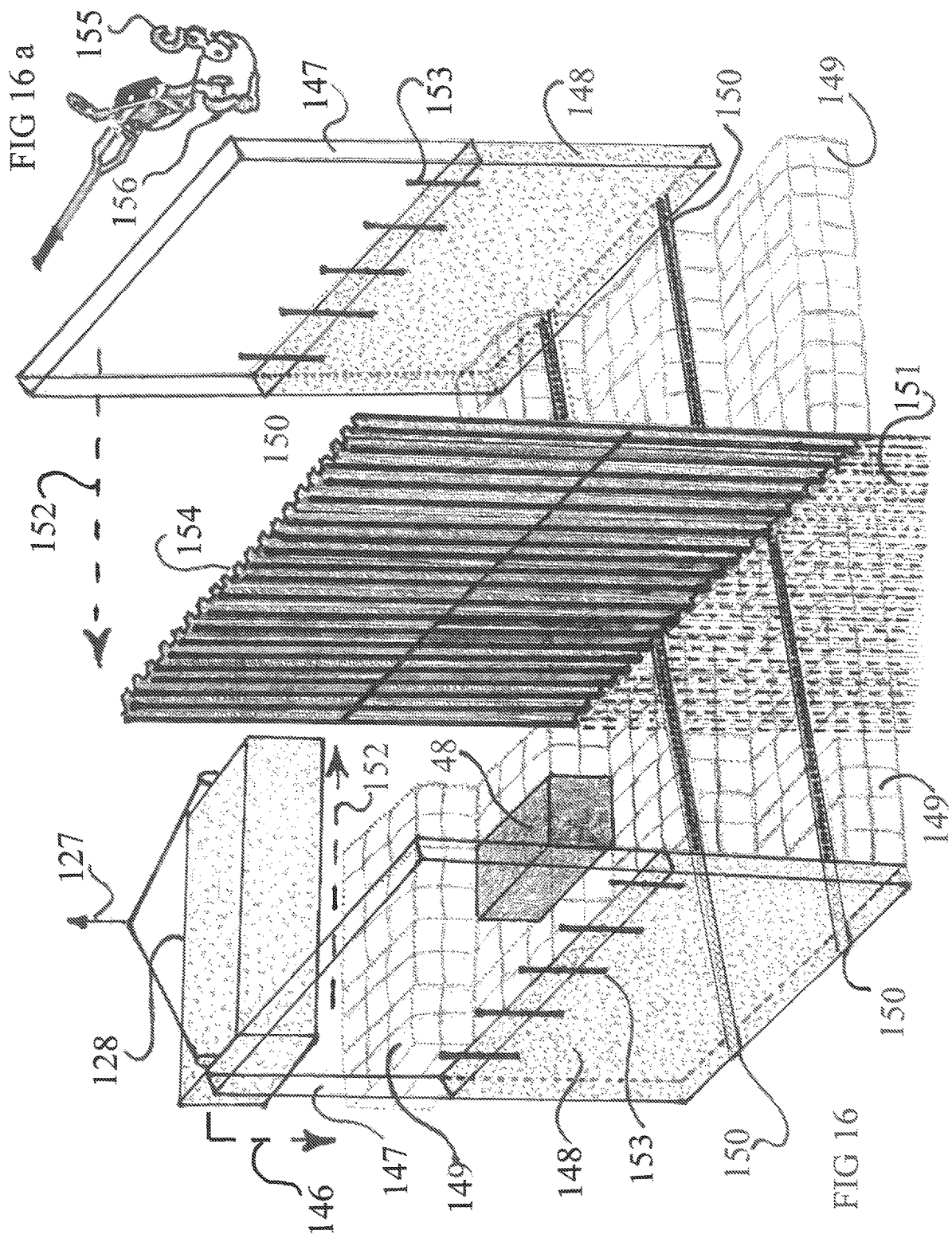

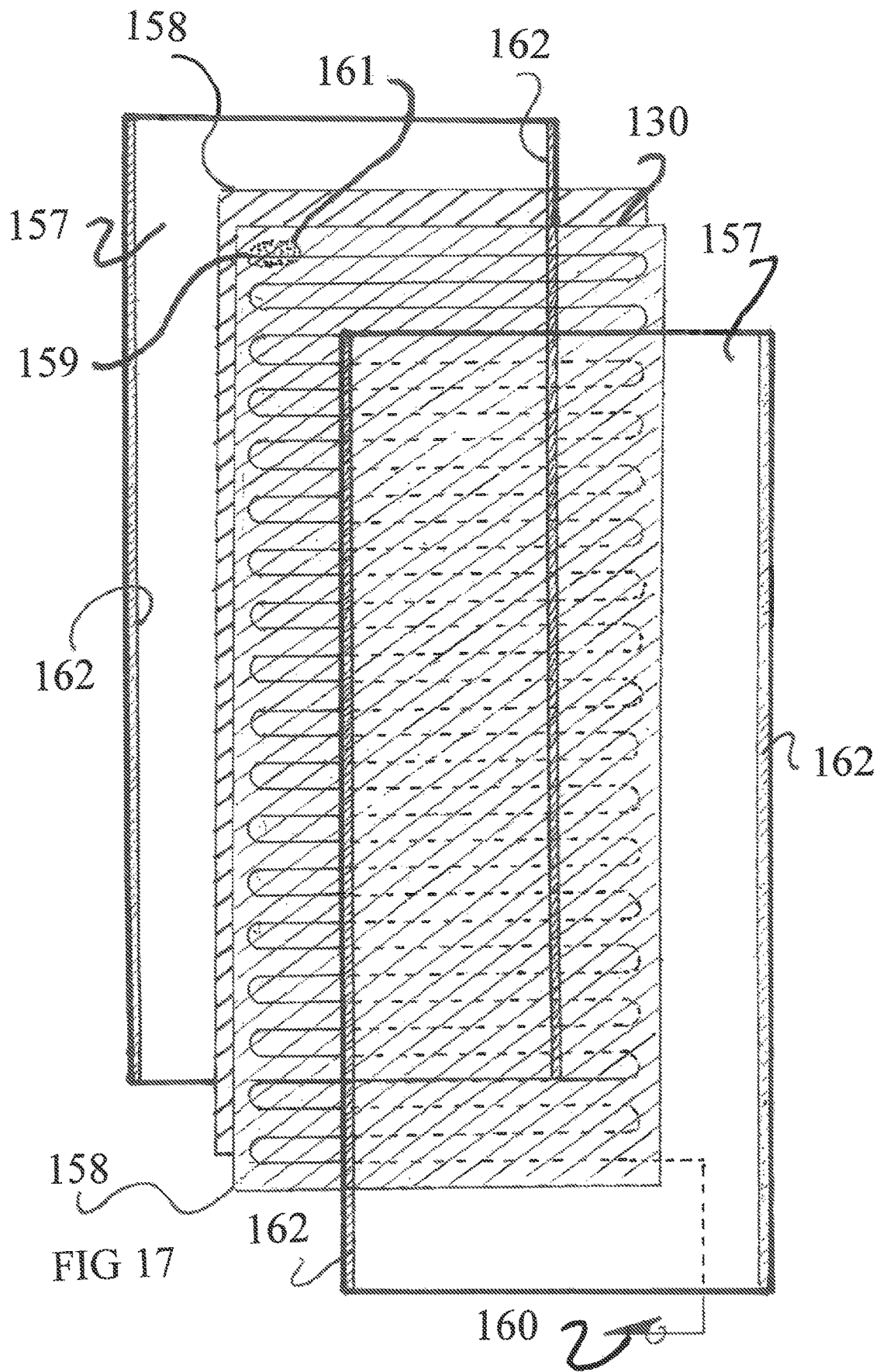

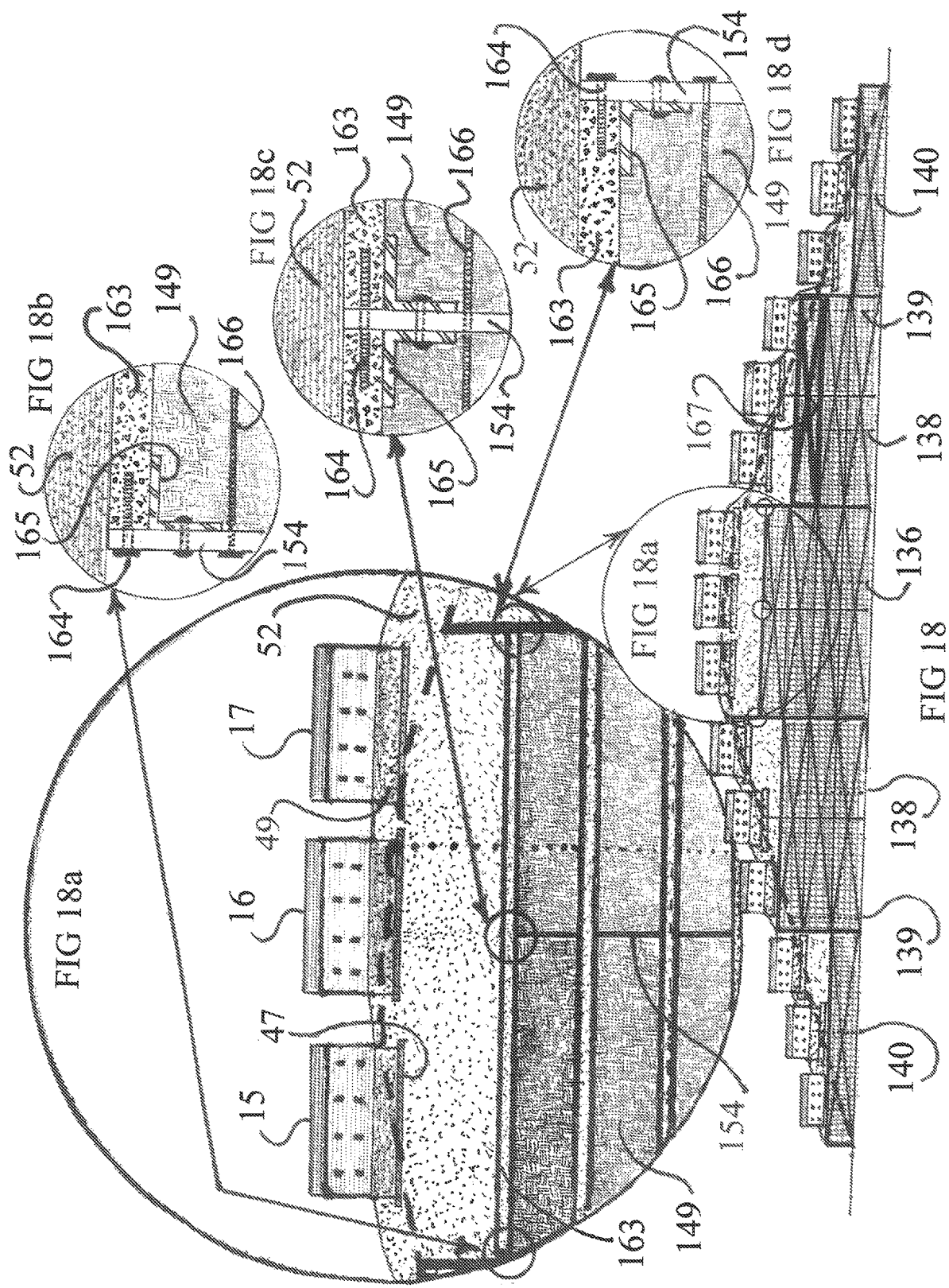

BUSINESS MODEL FOR RESIDENTIAL DEVELOPMENT OF VACANT ABANDONED LANDFILLS

BACKGROUND OF THE INVENTION

It has long been the practice of municipal local governments throughout the United States to dispose of garbage, refuse, trash, and other matter considered to be Municipal Solid Waste (MSW) into landfills located in areas designated specifically for that express purpose. According to the Environmental Protection Agency website, the U.S. has 3,091 active landfills, and over 10,000 old abandoned municipal landfills. However, quite recently, the availability of such previous designated areas for landfills has diminished drastically, thus presenting somewhat acute environmental problems in the disposal of garbage and similar MSW. More importantly, the on-going practice today is to engage the services of municipal waste haulers, who compact this refuse into ligated bales of MSW measuring 6'×3'×3', wrapped in several layers of impervious thick plastic tarpaulin and haul this refuse for dumping deep into our precious ocean waters, thus being first loaded upon shipping barges for that express purpose. This undesirable dumping of MSW garbage has always been considered the cheapest and easiest way of disposing of this unwanted municipal waste material. In fact, billions of tons of refuse garbage end up in the ocean each year, thus endangering aquatic life and of course, the vital fishing industry as an important source of food. Recognize that certain materials dumped in this manner are considered toxic waste. Even minute amounts of these substances tend to have negative and dangerous environmental impacts. Suffice it to say, the scale and magnitude of this ocean dumping is not just vast, but in fact huge and thus presents a grave existential threat to future living organisms. Therefore, the major existential question now being raised within this instant "business method" is, does this business model solve the problem of ocean dumping; while also generating an enviable revenue stream? The answer is a resounding YES !

By and large, another grave environmental concern also surrounds these aforementioned 10,000 old abandoned landfill sites as it pertains to the toxic leachate being formed day in and day out; which, originally in the form of pure virgin rainwater was only meant by Mother Nature to percolate and precipitate into our uncontaminated soil, then from there into our precious aquifers, eventually as healthy potable drinking water. However, these latter 10,000 contaminated abandoned landfill sites present a grave health and environmental danger and concern for cancer, since government regulations in most parts of the United States now require that only new landfills are to be constructed with specific liners, membranes, films or other impervious covering systems that isolate and protect both the soil and virgin ground water beneath the bottom of these new landfills from contamination by this toxic MSW refuse and its associated leachate. But what about these old abandoned landfills? Once again, this "business method" comes to the rescue. This is exactly the problem which this method of doing business addresses within Section "H"—Page 51. The reader soon learns that this "business method" poses a no cost solution to this major leachate environmental health concern. It must also be recognized that another primary concern with these active landfill operations is the preservation of the integrity of such impervious liners or covering systems. However, a close perusal of this "business method" solution obviates that requirement of such problematic liners or coverings; because the latter all eventually leak or break down over the years. Simply put, newly constructed waterproofed roofs as built herein do not break down !!!

By and large, both publications in general and relevant subject-matter literature are completely devoid of information pertaining to the quintessential problem inherent within this "business method" herein being described. This problem concerns the bearing capacity of the MSW garbage laden soil, since soil samples cannot be retrieved nor classified as is normally done. Therefore, from the standpoint alone of normal soil classifications, a classification of 5 (which is the least desirable category) is either uncompacted fill, peat or organic matter, or organic clays; which comes close to the very soil character of MSW landfill garbage. Hence, some measure of soil analysis must be obtained in order to determine the bearing capacity of this particular MSW soil within the landfill. Toward this end, a torque test probe is just such a device which measures the"torque value" of the soil to assist in evaluating the bearing capacity of the soil in which the ground anchor shown herein as Item #37 must be secured to the concrete foundation of Item #49. This important "torque value" is the measure of the load resistance provided by the soil (in short, a measure of its bearing capacity) when subject to turning or twisting force of said probe. The "torque value" for soil classification 5 is normally less than 175 inch-pounds.

How is this helical torque probe test (HPT) accomplished? It thus becomes axiomatic that the bearing capacity soil type can be inferred from the correlation between the tip resistance of the probe and the side friction. For example, when the helix probe is advanced, the torque needed, then becomes a measure of the force required to penetrate the soil, then expand a cavity for the helix probe within the soil, then overcome the frictional resistance of the side of the helix. Thus, when the helix is retracted, the torque required to retract the helix thus becomes a measure of the frictional resistance of the side of the helix. In sum and substance then, the ratio between the torque required to retract the helix, and the torque required to advance the helix is now defined as the "reverse torque ratio." It thus becomes a function of this probative analysis to determine whether this "reverse torque ratio" can be correlated with the MSW soil type to determine soil bearing capacity.

The reader is now advised to review Section B—Page 40 which deals with the decomposition process within landfills. In summary, at the incipience of a landfill's existence, decomposition of all organic matter takes place with understandable settling of the underlying MSW refuse debris. However, after several decades this anaerobic decomposition enters Phase V and thereby ceases all decomposing activity. Thus, the underlying soil reaches a status quo of somewhat stable soil density. The reader also learns that a typical apartment building site encompasses an area of 240 feet wide×180 feet long×30 deep; whereby the total weight of this area's underlying soil at that 30 foot depth level reaches 31,300,000 pounds. (See Section C—Page 41) It thus becomes a foregone conclusion that a typical Stelcor pile is driven as Item #46 to a depth where bearing capacity will be reached, since the axial column load for resistance of bearing capacity becomes a total of 7,515 pounds for each pile. Accordingly, the reader must now become comfortable with the fact that there exists two tests for verifying bearing capacity of this soil. One was the aforementioned "Reverse Torque Ratio" discussed earlier, the other is the "Plate Bearing Test", which is an insitu" load bearing test of soil used for determining the ultimate bearing capacity, and of course the likely settlement under a given load. This "Plate Bearing Test" will be carried out at the level of each concrete foundation. (See FIG. 9) Plates of varying sizes are used. The loading plate is placed on the ground and connected via a load cell to a reaction load. This plate is then loaded by hydraulic jack and its settlement measured in increments. It basically consists of loading a steel plate of known diameter and recording the settlements observed corresponding to each load increment. The test load is gradually increased until the plate starts to settle at a rapid rate. Thus, the total value of the load on the plate divided by the area of the steel plate gives the value of the ultimate bearing capacity of the underlying soil. However, a safety factor is then applied to yield a safe bearing capacity of the soil. Please note that all of these foregoing problems mentioned above are adequately solved herein with this "method of doing business."

FIELD OF THE INVENTION

The present invention herein relates generally to a. "method of doing business" which utilizes 10,000 old unwanted abandoned landfill sites which contain the disposal of garbage and refuse, while also teaching a method of creating new additional landfill sites into the future with no environmental downside; yet it pertains more specifically toward this vast array of residential landfill development sites as rental property exclusively devoted only to the First Responders of COVID-19 care givers, and additionally only to military personnel.

DESCRIPTION OF THE PRIOR ART

From a fair reading of this application's prior art, the reader soon learns that it thus becomes axiomatic to draw a conclusion that there does not exist any prior art whatsoever which teaches this same particular "business method" that essentially marries the technology of a patented Stelcor pile of Item #46; which will achieve bearing capacity of MSW landfill soil, within a systematic residential construction approach that results in a $75/square foot cost of construction, from which 20 million dollars in annual rental revenue can be achieved. Suffice it to say, this novel business model can thus be replicated systematically to all the other existing 10,000 abandoned landfills creating this same windfall profit from this undertaking. In general, landfill patents by and large, fall under the broad classification of Class 405/129.95. However, the reader must be mindful that this instant patent application centers only around a "method of doing business". Yet, in any discussion of the pertinent prior art, the hallmark of that embodiment is understandably, the claims. Accordingly, there are three general types of claims. (1) There can be a claim for a "thing" such as a machine, apparatus, or device. Next, (2) there could be a claim for a "method" of making a thing; or else (3) there could be a claim for a method of "using" a thing. Hence, it will soon be revealed that all of this prior art discussed herein simply falls within one of these three major categories; yet, not one of them is a "method of doing business." Accordingly, U.S. Pat. No. 8,939,676—involves a system for removing ammonia from landfill leachate. U.S. Pat. No. 8,864,413—is a method to efficiently capture the gas generated from the decomposition of organic matter. U.S. Pat. No. 8,807,871—is a specialized lined landfill system for the stabilization and containment of drilling wastes and coal combustion residues. U.S. Pat. No. 8,784,008—is a method for the construction of a berm to increase the capacity of an existing landfill. U.S. Pat. No. 8,784,007—is an apparatus for covering a large land area with a heavy wide width flexible sheeting. U.S. Pat. No. 8,727,664—pertains to a berm and a method of construction thereof to increase the capacity of an existing landfill. U.S. Pat. No. 8,696,244—describes a method to apply waste treatment liquid to a solid waste disposal site by filling a storage tank with waste treatment liquid. U.S. Pat. No. 8,672,586—this relates to systems and methods for extracting heat from the degradation, decomposition, and chemical/biochemical transformation of municipal, industrial and other types of waste.

Next, is U.S. Pat. No. 8,560,459—this art provides communities with a system and method to more effectively capture and use disposed MSW and other waste streams to provide renewable energy sources. U.S. Pat. No. 8,487,018—deals with the biodegradation of heavy metal free and anaerobically compostable vinyl halide compositions in landfills. U.S. Pat. No. 8,430,600—discusses a berm to increase the capacity of an existing landfill with fill material and a cover whereby a recess and an outer perimeter comprise its elements. U.S. Pat. No. 8,398,335—deals with PVC pipe and HDPE pipe risers to extract landfill gas from the decomposition of waste which gas enters said pipe. U.S. Pat. No. 8,376,657—a patent which uses a berm to increase the capacity of an existing landfill using a reinforced portion and backfill material. U.S. Pat. No. 8,313,921—a method of biodegrading MSW landfill waste by promoting anaerobic bacteria to digest this debris thereby producing methane gas for recovery. U.S. Pat. No. 8,292,543—deals with a gas recovery bioreactor in a landfill featuring liquid infiltration into a porous material layer located in a trench with perforated pipe. U.S. Pat. No. 8,287,625—discusses a system and method for treating landfill gas by using landfill leachate to chemically react together.

U.S. Pat. No. 8,140,959—concerns a geosynthetic tufted drain barrier utilizing the permeability of a membrane for preventing vertical migration of fluids. U.S. Pat. No. 8,163,242—a portable monitor used to measure landfill gas. U.S. Pat. No. 8,100,605—a composite material which includes a fiber web and a zeolite material containing metal to promote the absorption of odorous gas in a landfill. U.S. Pat. No. 8,052,349—a modular roof-like structure suitable for handling with heavy machinery which allows ventilation of harmful gases and odors in a landfill. U.S. Pat. No. 8,029,616—an easy to apply material cover composition of water, bentonite clay and synthetic fibers to protect landfills from wind, rain, animals and insects. U.S. Pat. No. 8,002,050—completion technique using liquids circulated through coiled tubing for removing and treatment of drilled solids into a container well. U.S. Pat. No. 7,972,082—invention involves a method for collecting biogas from a landfill at variable rates corresponding with the energy needs of the day. U.S. Pat. No. 7,959,376—methods for reducing greenhouse gases in landfills and coal mines. U.S. Pat. No. 7,955,419—a system and method for treating landfill gas by using the leachate to chemically treat and react with one component of the gas. U.S. Pat. No. 7,956,101—deals with anaerobically compostable polymeric composites in landfills such as outdoor signs, billboards, banners which are all biodegradable.

U.S. Pat. No. 7,934,544—using an electric plasma are apparatus to generate nitrate ions in the water processing system which can enhance oil recovery by means of microbial microorganisms. Further there is U.S. Pat. No. 7,902,271—using PVC sheets and other composites which are compostable and biodegradable in landfills. U.S. Pat. No. 7,866,921—this description provides apertures inside PVC, HDPE or plastic pipe riser in existing methane gas recovery wells installed at MSW landfills. U.S. Pat. No. 7,726,908— discusses a type of MSW landfill treatment process which is first separation; then processing and finally recycling. U.S. Pat. No. 7,699,563—a method of controlled septage into a wet cell layer for faster decomposition in a landfill thereby achieving greater landfill space. U.S. Pat. No. 7,628,567—discusses a fluid injection and removal system to inject or remove fluids from a landfill. U.S. Pat. No. 7,537,415—discloses a fluid injection and removal system from a landfill. U.S. Pat. No. 7,498,163—discloses a process for reducing solid waste volume from a landfill mass.

RELEVANT PRIOR ART

U.S. Pat. No. 5,244,311—discloses a method of increasing the available capacity of an active above ground or incised landfill that involves dynamically compacting successive layers of deposited refuse. This method increases the available volume of the landfill up to 20 percent without damaging the liner system that protects the surrounding soil base and ground water. Sep. 14, 1993—inventor Vito N. Galante U.S. Pat. No. 4,838,733—A landfill compaction system and method reduces the volume of landfill at an existing landfill site by essentially sealing off at least a portion of the landfill and utilizing a source of vacuum to extract gases from the sealed-off portion of the landfill, the extraction taking place relatively rapidly so as to make use of the sudden impact of atmospheric pressure upon the sealed-off portion to assist in the compaction of the landfill. Jun. 13, 1989 Inventor: Albert A. Katz U.S. Pat. No. 4,270,875—This invention relates to a method of using "red mud", i.e., slurry by-products from the Bayer process for extracting alumina from bauxite, for creating landfill. The red mud is first filtered to reduce its water content in the conventional manner and then mechanically compressed and dewatered until it has a void ratio less than 1.5, preferably, 1.0 to 1.5, and has the form of solid cakes or other bodies. The red mud cakes are easy to handle and are useful as a landfill material for reclaiming land when applied with light tamping or compacting. Jun. 2, 1981 Inventor Aldo Kainuma U.S. Pat. No. 3,898,844—A method of consolidating damp foundation soil, e.g., natural or synthetic clay or silt alone or mixed with sand, includes a number of cycles each including a dynamic force phase in which dynamic superimposed loads of at least 500 to 10,000 tons are applied to the soil to fluidize it, and a rest phase, possibly several days, during which the interstitial water escapes and the soil is restructured. Optimum parameters are ascertained by the use of a model testing rig comprising an expansible chamber to contain a sample of the soil, and means for applying static and dynamic pressure to the contents and measuring the relevant parameters. Aug. 12, 1975 Inventor Louis Menard U.S. Pat. No. 3,835,652—Rubbish is disposed of by drilling a plurality of large vertical holes in a large area of land having relatively firm soil. Small charges of loose rubbish are dumped into each hole. After each charge is dumped, the rubbish is compacted, as by hammering and/or downward compression. The area may then be covered with soil. To provide stability, the holes are drilled to a point above the water table, and adjacent holes are spaced and separated by a substantial mass of soil. Sep. 17, 1974—Inventor Walter Hignite U.S. Pat. No. 3,511,056—discloses a method for the disposal of trash and mechanisms thereof, the method being inclusive of the steps of excavating soil at the disposal site to provide a trench or depression extending below the initial ground surface, elevating the removed soil to a place above the initial ground surface with a portion of said soil being intermixed with trash before the trash and soil intermixture is redeposited in layers in the dug depression; then compacting same in the depression through the use of an apparatus whereupon a cover is placed over the depression. This embodiment uses trench diggers, soil elevation, a conveyor apparatus and a compactor. May 12, 1970 Inventor Alverne A. Jones U.S. Pat. No. 3,446,026—This invention discloses a hollow body of rectangular cross-section fitting snugly in a trench which has a refuse receiving opening in its upper portion, a refuse-discharge opening in one end opening substantially horizontally and located at a substantial distance below the refuse-receiving opening and a closed end opposite the refuse discharge opening. A ram in the lower portion forces the refuse-discharge through the opening after which backfill dirt is deposited in the trench. May 27, 1969 Inventor Tyman H. Fikse U.S. Pat. No. 3,478,656—This invention involves a method and means for compacting soils and other particulate matter. Soil is thus compacted by applying surface pressure to a zone of the soil thus placed under compression. While under compression, compressed air or gas is introduced into the soil under compression to weaken the same. These effects of surface pressure and gas pressure densify the soil to a degree not obtainable by surface pressure alone. Nov. 18, 1969 Inventor John K. McDonald.

U.S. Pat. No. 3,352,115—This invention has a hollow open-ended shaft where the shaft is then driven down into the ground. The waste material is forced up into the shaft column whereupon the column is then compacted to force the waste material into the soft ground surrounding the shaft. It employs a screw spindle to compact this waste. Nov. 14, 1967 Inventor Joseph J. Jurisich U.S. Pat. No. 1,650,827—The earth in preparation for structures, buildings, roadways or the like will compact earth underlying these structures and compact same to a considerable depth such as the consistency of rock. Sheet piling is utilized around the margins of the excavation while placing the form for the compaction therein. No soil is removed just compaction. Nov. 29, 1927 Inventor Friz U.S. Pat. No. 3,705,851—Refuse is utilized in combination with earth fill to provide an elevated recreational site. The graded surface is made substantially impervious to the penetration of water. The construction of berms or dikes at the base defines a series of cells which are then filled with refuse. The earth fill from the excavation of the nearby lake is employed to cover the refuse. Additional tiers of these cells as such are deposited in the same manner to ultimately form a small mountain for recreational use. Dec. 12, 1972 Inventor Robert C. Brauer U.S. Pat. No. 3,621,659—A method of compacting soil is provided using the steps of driving a probe into the soil to be compacted using a vibratory driver and then extracting said probe using a vibratory extractor and repeating these steps at spaced intervals over the area to be compacted. Nov. 23, 1971 Inventor Robert D. Anderson U.S. Pat. No. 3,614,867—According to this invention a sanitary landfill is developed by first grading the area to be tilled as a gradual incline, then spreading the garbage refuse continuously over the incline while irregularly penetrating and compacting this refuse so as to break this refuse into a compacted 2½ foot thick layer. Then moisten by sprinkling with water, then pump insecticide. Oct. 26, 1971 Inventor Tom Nieman

BRIEF DESCRIPTION OF THE DRAWINGS

FIG. 9 b—View of Item #168 steel dowel insertion into concrete tube of Item #172

FIG. 9 c—Plan view of Item #168 steel dowel into concrete Sonotube of Item #172

FIG. 9 d—Cross-section of Item #168 steel dowel insertion into concrete tube of Item #172

FIG. 9 e—Plan view of Item #168 steel dowel insertion into hollow core plank of Item #53

FIG. 12 c—Full 60 foot long North elevations of Complex "A"

FIG. 12 d—Full 60 foot long South elevations of Complex "A"

DETAILED DESCRIPTION OF THE DRAWINGS

FIG. 1

Figure 1:
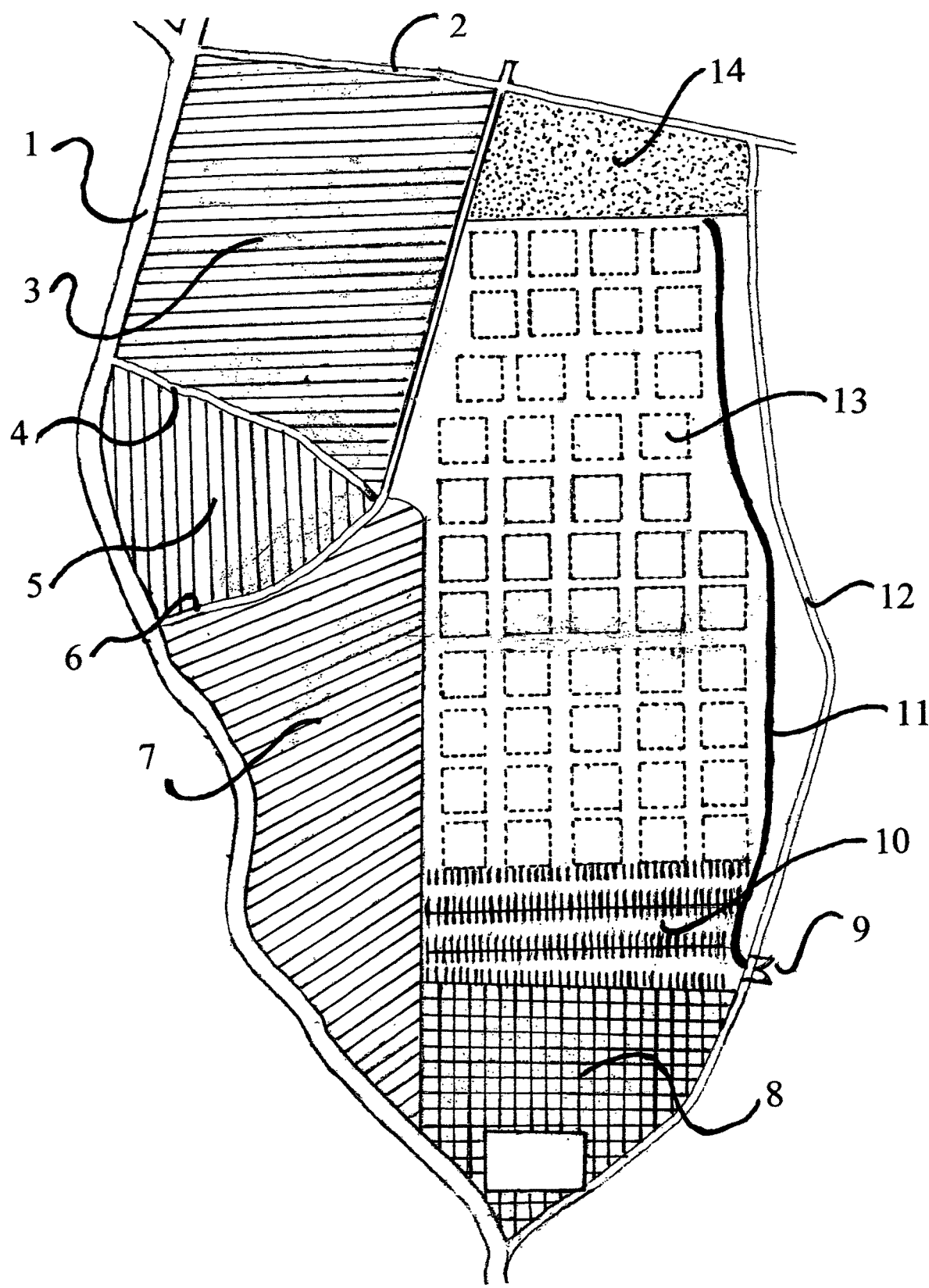
FIG. 1—Diagram of landfill refuse site showing 50 one acre parcels with 2,000 dwelling units FIG. 2—A one acre view of complexes "A"; "B"; "C" and "D" containing 40 dwelling units FIG. 3—Close-up view of Complex "A" showing all rooms and apartment dwelling features FIG. 4—Patented "Stelcor" mini-pile comprised of 5 Y2" steel shaft and 14" diameter grout core FIG. 4a—Cross-section thru 5'/2" steel shaft, welded helical flight and 14" diameter grout core FIG. 5—Refuse busting diamond drill augur for piercing stubborn impenetrable waste refuse FIG. 6—Orthogonal view showing all structural supporting components of typical dwelling unit FIG. 7—View of Complex "A" showing direction of floor joists and roof trusses FIG. 8—Cross-sectional view showing how "Stelcor" piles support concrete foundation FIG. 9—Plan view of "Stelcor" pile location beneath concrete foundation with support FIG. 9 a—Detail of Item #168 steel dowel insertion into hollow core plank of Item #53

1—Round Swamp Road in Nassau County runs North and South

2—Spagnoli Road runs East and West

3—Battle Row recreational vehicle "RV" campground

4—Battle Row a residential dead end street

5—Residential houses and Town of Oyster Bay Senior 55 and over residential complex

6—Clermont Road, a dead end business access road

7—Industrial zoned cement ready-mix commercially zoned business

8—Nassau County's Fireman's/EMS training academy

9—Entrance gate to 50 acre/2000 dwelling unit landfill development community

10—2000 car parking lot for residents of 50 acre landfill development community

11—Ascending roadway to top summit of landfill 2,600 feet long-160' high-gradient 7%

12—Winding Road runs north and south

13—Typical one acre parcel with 40 dwelling units consisting of complexes "A"-"B"-"C" "D"

14—Abandoned and shuttered incinerator owned by Town of Oyster Bay

FIG. 2

15—Complex "A" containing 12 dwelling units in a two-story structure

16—Complex "B" containing 12 dwelling units in a two-story structure

17—Complex "C" containing 12 dwelling units in a two-story structure

18—Complex "D" containing 4 dwelling units in a two-story structure

100—West elevation of Complex "A"

105—East elevation of Complex "A"

142—North elevation of Complex "C"

143—South elevation of Complex "C"

FIG. 3

19—Bedroom 1—size 12'×13' for Apartment #1 & #2 one of 12 dwelling units in Complex A

20—Living Rm—size 15'×22' for Apartment #1 & #2 one of 12 dwelling units in Complex A

21—Closets for Bedroom #1 and Bedroom #2

22—Bedroom 2—size 12'×13' for Apartment #1 & #2 one of 12 dwelling units in Complex A

23—Entrance door for Apartment #1 and Apartment #2

24—Triple glulam dropped header 22 feet long supporting 2×10 floor joists

25—Dining area for Apartment #1 and Apartment #2
26—2"×4" common stud wall acts as bearing wall to support 2"×10" floor joists
27—Back to back Kitchens for Apartment #1 and Apartment #2
28—Back to back Bathrooms for Apartment #1 and Apartment #2
29—Second floor concrete platform for staircases to Apartment #1 and Apartment #2

FIG. 4

30—Reverse helical flighting welded to steel shaft of "Stelcor" pile
31—5¼" diameter 80 KSI steel shaft of drilled-in displacement micropile
32—Annulus or void draws the concrete grout of #35 into void by way of displacement head
33—Lateral displacement plate creates positive annulus void of #32
34—Lead section of soil displacement head of driving plate
35—14" diameter secondary deformation concrete grout column along length of pile
36—building loads transfer from grout column of #35 to high strength steel shaft of #31

FIG. 4a

30—Reverse helical fighting welded to steel shaft of "Stelcor" pile
31—5¼" diameter 80 KSI steel shaft of drilled-in displacement micropile
35—14" diameter secondary deformation concrete grout column along entire length of pile

FIG. 5

37—drive plate attached to hydraulic powered rotary equipment
38—top section of diamond cutting tool for impenetrable resistant garbage refuse
39—connector coupling expansion device to attach greater lengths of penetrating shafts
40—helical reverse fighting welded to steel shaft
41—diamond denticles bonded to under surface of diamond cutting tool plate
42—terminal section housing diamond coated helical plates
43—diamond denticles bonded to lateral surface of helical plate

FIG. 6

44—Structural Insulated Panel (SIP) 8" wide with two ¼" air between 3 polystyrene panels
45—back corner inside view of the Structural Insulated Panel (SIP) of #44
46—Patented "Stelcor" drilled-in displacement micro-pile tough garbage refuse
47—36"×12" concrete footing with formed keyway placed on undisturbed garbage refuse
48—undisturbed landfill garbage or refuse of municipal waste matter
49—24"×12" concrete foundation wall with bottom insert into keyway of #50
50—Keyway formed into concrete footing
51—recycled concrete aggregate (RCA) bearing material for concrete hollow core plank
52—engineered controlled compacted fill placed as several lifts or layers of tested soil
53—concrete hollow core plank first floor only grouted in place on formed shelf of #73
54—steel dowels help secure concrete footing Item #47 to concrete foundation wall Item #49
24—Three glulam (LVL) laminated veneer glued as one 22' long dropped header
26—2"×4" common stud wall acts as bearing wall to support 2"×10" floor joists
55—2"×10" wooden floor joists 16" on center resting on #26 and #24
56—4'×8' sheets of ¾" tongue and groove plywood subfloor glued and nailed to joists
57—8"×6" steel structural tubing welded to #58 an 8"×4" double angle iron
58—8"×4" double angle iron column spaced every 8'-6" and typical for five
59—Top chord of roof purlin truss 9'/2" deep (two 2×10)× 3'/2" wide (two LVL)
60—Structural steel tube 9'/2"×3'A" middle of truss prevents deflection of lower chord
61—Gusset plates connect top and bottom chord to perpendicular and angle web panel points
62—Structural web elements supporting top and bottom chords
63—Lower chord of truss 9'A"×3½" as a tension member restraining horizontal thrust
65—8"×6"×'/2" steel tube welded to a 8"×4" double angle iron column supports roof truss
66—See FIG. 11a; 11b; 11c; 11d for structural truss details
67—Concrete anchor bolts tie down pressure treated sill plate
68—2"×8" pressure treated sill plate anchors SIP panels
88—8"×4" angle iron column supports trusses spaced every 8'-6" and typical for five

FIG. 7

69—Direction of 2×10 second floor only floor joists typical for the six upper dwelling units
70—direction of 9½"×3½" roof trusses made up of lower #63 and upper #59 (see FIG. 6)
15—Complex "A" contains twelve dwelling units in a two story structure
24—Triple glulam dropped header-22 feet long supporting 2×10 floor joists
26—2"×4" common stud wall acts as bearing wall to support 2"×10" floor joists
29—Second floor concrete platform for staircases to Apartment #1 and Apartment #2
71—The longer roof truss side of a typical one unit apartment which measures 34' long
72—The shorter floor joist side of a typical one unit apartment which measures 30' long

FIG. 8

58—8"×4" double angle iron column spaced every 8'-6" and typical for five
68—2"×8" pressure treated sill plate anchors SIP panels
67—Commie anchor bolts tie down pressure treated sill plate
46—Patented "Stelcor" drilled-in displacement micro-pile through garbage refuse
47—36"×12" concrete footing with formed keyway placed on undisturbed garbage refuse 48—undisturbed landfill garbage or refuse of municipal waste matter
49—24"×12" concrete foundation wall with bottom insert into keyway of #50
30—Reverse helical flighting welded to steel shaft of "Stelcor" pile
31—5½" diameter 80 KSI steel shaft of drilled-in displacement micropile
34—Lead section of soil displacement head of driving plate

FIG. 9

46—Patented "Stelcor" drilled-in displacement micro-pile through garbage refuse
47—36"×12" concrete footing with formed keyway placed on undisturbed garbage refuse
49—24"×12" concrete foundation wall with bottom insert into keyway of #50
53—concrete hollow core plank first floor only grouted in place on formed shelf of #49
58—8"×4" double angle iron column spaced every 8'-6" and typical for five
69—Direction of 2×10 second floor only floor joists typical for the six upper dwelling units
70—Direction of 9'/2"×3 Y2" roof trusses made up of lower #63 and upper #59 (see FIG. 6)
73—Ledger shelf formed into concrete foundation wall for support of hollow core plank
74—8"×6" steel tube welded to #58 (17' AFF) at roof level which supports roof trusses
75—8"×6" steel tube welded to #58 (8' AFF) at 2nd floor which supports 2×10 floor joists
76—24"×24" concrete pier over "Stelcor" pile supports glulam girder for concrete plank
77—Pressure treated glulam double girder supports mid span of hollow core plank
168 one inch rebar dowel penetrating through Item #49 and into Item #53

FIG. 9 a

37—drive plate attached to hydraulic powered rotary equipment
46—Patented "Stelcor" drilled-in displacement micro-pile through garbage refuse
47—36"×12" concrete footing with formed keyway placed on undisturbed garbage refuse
48—undisturbed landfill garbage or refuse of municipal waste matter
49—24"×12" concrete foundation wall with bottom insert into keyway of #50
51—recycled concrete aggregate (RCA) bearing material for concrete hollow core plank
53—concrete hollow core plank first floor only grouted in place on formed shelf of #49
73—Ledger shelf formed into concrete foundation wall for hollow core plank

FIG. 9 b

49—24"×12" concrete foundation wall with bottom insert into keyway of #50
53—concrete hollow core plank first floor only grouted in place on formed shelf of #49
73—Ledger shelf formed into concrete foundation wall for hollow core plank
168—1" steel rebar dowel inserted into concrete wall of Item #49 and concrete Sonotube
170—concrete matrix of concrete hollow core plank factory poured around plank voids
171—post-tensioned steel cable embedded into lower portion of concrete hollow core plank
1—circular cardboard concrete filled sonotube with embedded steel dowel of Item #168

FIG. 9 c

49—24"×12" concrete foundation wall with bottom insert into keyway of #50
53—concrete hollow core plank first floor only grouted in place on formed shelf of #49
73—Ledger shelf formed into concrete foundation wall for hollow core plank
168—1" steel rebar dowel inserted into concrete wall of Item #49 and concrete Sonotube
169—hollow core void empty space factory formed into concrete hollow core plank
170—concrete matrix of concrete hollow core plank factory poured around plank voids
172—post-tensioned steel cable embedded into lower portion of concrete hollow core plank
2—circular cardboard concrete filled sonotube with embedded steel dowel of Item #168

FIG. 9 d

53—concrete hollow core plank first floor only grouted in place on formed shelf of #49
168—1" steel rebar dowel inserted into concrete wall of Item #49 and concrete Sonotube
170—concrete matrix of concrete hollow core plank factory poured around plank voids
173—post-tensioned steel cable embedded into lower portion of concrete hollow core plank
3—circular cardboard concrete filled sonotube with embedded steel dowel of Item #168

FIG. 9 e

53—concrete hollow core plank first floor only grouted in place on formed shelf of #49
73—Ledger shelf formed into concrete foundation wall for hollow core plank
168—1" steel rebar dowel inserted into concrete wall of Item #49 and concrete Sonotube

FIG. 10

15—Complex "A" containing 12 dwelling units in a two-story structure
78—Ridge or high peak of all three roof structures for Building Complex "A"
79—Two lowest points of three roof structures channels water due to built up #83 crickets
54—horizontal gutters at end units sheds water from high ridge #78 to four leaders #81
81—Eight leaders or downspouts which removes all storm water from Complex "A"
82—Mid rise or ridge of reverse gable acts as cricket to shed water into four #81 leaders
83—Four low rise crickets channel water from high mid-roof central cricket of #82 into 4 #81

FIG. 11a

44—Structural Insulated Panel (SIP) 8" wide with two ¼" air between 3 polystyrene panels
60—Structural steel tube 9 Y2"×3'/2" middle of truss prevents deflection of lower chord
61—Gusset plates connect top and bottom chord to perpendicular and angle web panel points
62—Structural web elements supporting top and bottom chords
63—Lower chord of truss 9'/2"×3 Y2" as a tension member restraining horizontal thrust
59—Top chord of roof purlin truss 9'/2" deep (two 2×10)× 3'/2" wide (two LVL)
98—Fascia board covers end of top chord of roof truss at eave and soffit
99—Soffit covering underside of eave

FIG. 11b

44—Structural Insulated Panel (SIP) 8" wide with two ¼" air between 3 polystyrene panels
58—8"×4" double angle iron column spaced every 8'-6" and typical for five
59—Top chord of roof purlin truss 9'/2" deep (two 2×10)× 3'/2" wide (two LVL)
63—Lower chord of truss 9'/2"×3½" as a tension member restraining horizontal thrust
65—8"×6"x'/2" steel tube welded to a 8"×4" double angle iron column supports roof truss
84—Simpson column cap catalogue number CCQ46SDS2.5
85—Structural steel seated support bracket welded to #88 and supports #65 steel tube
86—¾" CDX exterior grade plywood sheathing
87—SIP end cap engineered "Trus Joist" lumber
89—4" shorter leg which receives welded support bracket #85 supports 8"×6" steel tube
90—8" longer leg which wraps around end of SIP panel #44
91—Rigid 2" thick Icynene spray foam insulation board
92—¼" air space held open with structural intermittent spacers

FIG. 11c

59—Top chord of roof purlin truss 9'/2" deep (two 2×10)× 3½" wide (two LVL)
63—Lower chord of truss 9'A"×3½" as a tension member restraining horizontal thrust
65—8"×6"×Vz" steel tube welded to a 8"×4" double angle iron column supports roof truss
85—Structural steel seated support bracket welded to #88 and supports #65 steel tube
86—¾" CDX exterior grade plywood sheathing
84—Simpson column cap catalogue number CCQ46SDS2.5
89—4" shorter leg which receives welded support bracket #85 supports 8"×6" steel tube
90—8" longer leg which wraps around end of SIP panel #44
91—Rigid 2" Icynene spray foam insulation board
92—¼" air space held open with structural intermittent spacers
93—Concrete or structural grout filling entire 8"×6" structural steel tube
94—⅝" thick drywall ceiling
95—⅝"×1"A" wooden furring strip to secure #94
96—Triangular wood wedge ground helps transfer upper roof truss chord load to SIP panel

FIG. 11d

49—24"×12" concrete foundation wall below with bottom insert into keyway of #50
58—8"×4" double angle iron column spaced every 8'-6" and typical for five
59—Upper chord of truss 9'/2"×3'/2" as a compression member resists roof live load
63—Lower chord of truss 9½"×3½" as a tension member restraining horizontal thrust
65—8"×6"×½" steel tube welded to a 8"×4" double angle iron column supports roof truss
85—Structural steel seated support bracket welded to #88 and supports #65 steel tube
86—¾" CDX exterior grade plywood sheathing
87—SIP end cap engineered "Trus Joist" lumber
89—4" shorter leg which receives welded support bracket #85 supports 8"×6" steel tube
90—8" longer leg which wraps around end of SIP panel #44
91—Rigid 2" thick Icynene spray foam insulation board
92—¼" air space held open with structural intermittent spacers
97—Downward leg of #85 welded to #88 supports #65

FIG. 11e

49—24"×12" concrete foundation wall below with bottom insert into keyway of #50
67—Concrete anchor bolts tie down pressure treated sill plate
68—2"×8" pressure treated sill plate anchors SIP panels
86—¾" CDX exterior grade plywood sheathing
91—Rigid 2" thick Icynene spray foam insulation board
92—¼" air space held open with structural intermittent spacers
147—screw into wood plate securing the SIP panel to the structural framework

FIG. 11f

55—2"×10" wooden floor joists 16" on center resting on #24 and #26
57—8"×6" steel structural tubing welded to #58 an 8"×4" double angle iron steel column
85—Structural steel seated support bracket welded to #88 and supports #65 steel tube
86—¾" CDX exterior grade plywood sheathing
89—4" shorter leg which receives welded support bracket #85 supports 8"×6" steel tube
90—8" longer leg which wraps around end of SIP panel #44
91—Rigid 2" thick Icynene spray foam insulation board
92—¼" air space held open with structural intermittent spacers
147—screw into wood plate securing the SIP panel to the structural framework
148—engineered lumber bolted to 8'×4" angle iron column 150 bolts securing Item #148 to the 8'×4" angle iron column

FIG. 12a

100—The West elevation of Complex "A" or Complex "B" or Complex "C"
29—Second floor concrete platform for staircases to Apartment #1 and Apartment #2
78—Ridge or high peak of all three roof structures for Building Complex "A"

79—Two lowest points of three roof structures channels water due to built up #83 crickets
81—Eight leaders or downspouts which removes all storm water from Complex "A"
82—Mid rise or ridge of reverse gable acts as cricket to shed water into four #81 leaders
102—Gutter running entire length of South elevation
103—Middle building of Complex "A" juts out which enables entrance to upper middle apt
104—Entrance to lower middle apartment of Complex "A" and shows #81 leader beyond
146—exterior staircase leading to second floor concrete platform for entry doors

FIG. 12 b

105—The East elevation of Complex "A" or Complex "B" or Complex "C"
29—Second floor concrete platform for staircases to Apartment #1 and Apartment #2
78—Ridge or high peak of all three roof structures for Building Complex "A"
79—Two lowest points of three roof structures channels water due to built up #83 crickets
81—Eight leaders or downspouts which removes all storm water from Complex "A"
82—Mid rise or ridge of reverse gable acts as cricket to shed water into four #81 leaders
102—Gutter running entire length of South elevation
106—Middle building of Complex "A" is recessed doorway entrance to left lower apartment
107—Middle building of Complex "A" is recessed doorway entrance to right lower apartment
108—Middle building of Complex "A" is recessed doorway entrance to left upper apartment
109—Middle building of Complex "A" is recessed doorway entrance to right upper apartment
146—exterior staircase leading to second floor concrete platform for entry doors

FIG. 12 c

78—Ridge or high peak of all three roof structures for Building Complex "A"
81—Eight leaders or downspouts which removes all storm water from Complex "A"
82—Mid rise or ridge of reverse gable acts as cricket to shed water into four #81 leaders
29—Second floor concrete platform for staircases to Apartment #1 and Apartment #2
102—Gutter running entire length of South elevation
103—Middle building of Complex "A" juts out which enables entrance to upper middle apt

FIG. 12 d

78—Ridge or high peak of all three roof structures for Building Complex "A"
81—Eight leaders or downspouts which removes all storm water from Complex "A"
82—Mid rise or ridge of reverse gable acts as cricket to shed water into four #81
leaders 29—Second floor concrete platform for staircases to Apartment #1 and
Apartment #2 102—Gutter running entire length of South elevation

FIG. 13

110—Vertical structural support with hole to facilitate evacuation of air and creates vacuum
111—Aperture for evacuation of air in vertical structural support of #110
112—Horizontal structural cross-strut which fits into internal grooves of VIP panel
113—Aperture in horizontal cross-strut of #112 which permits entry of vacuum needle
114—One of four sealed sides of top element of VIP panel acts as a raised platform base
86—¾" CDX exterior grade plywood sheathing
115—Building's 15 lb asphalt impregnated waterproof tar paper
116—Plywood attachment screw for securing #119 VIP carrier to #86
117—Thin film of trapped air acting as an additional abetting insulation medium
118—VIP vacuum panel which is the subject of Applicant's U.S. Pat. No. 9,771,714
119—Plastic extruded carrier channel for securing VIP panel in its proper orientation
120—Wooden ground attached to VIP panel's plastic carrier #119
121—Several layers of many small segmented air pockets in polyethylene bubble wrap
122—Wood ground attachment screw for securing #120 wood ground to #119 plastic carrier
123—Gypsum sheathing screw for securing external "Densglas"#124 to #120 wood ground
124—Dens-glas exterior grade sheathing
125—Exterior clapboard wood siding or building cladding
126—Building's interior sheetrock gypsum drywall
91—closed cell sprayed icynene foam insulation in three independent separated 2" layers
92—Two ¼" air gaps which create a thin film of insulation between three #127 boards
129—Plastic spacers to maintain the ¼" thin air gap between three #127 boards
130—Reflective continuous surface sheet of aluminum foil paper intensifies heat of #131
131—Continuous loop of metal wire mixed with resin and adhesive carries low volt current

FIG. 14

3—Battle Row recreational vehicle "RV" campground
4—Battle Row a residential dead end street
5—Residential houses and Town of Oyster Bay Senior 55 and over residential complex
6—Clermont Road, a dead end business access road
7—Industrial zoned cement ready-mix commercially zoned business
10—2000 car parking lot for residents of 50—acre landfill development community
11—Ascending roadway to top summit of landfill 2,600 feet long-160' high-gradient 7%
12—Winding Road runs north and south
13—Typical one acre parcel with 40 dwelling units consisting of complexes "D"
132—Twelve one acre parcels on northern slope all descending downward
4—Ten one acre parcels on southern slope all descending downward
5—Twelve one acre parcels on eastern slope all descending downward 135—Twelve one acre parcels on western slope all descending downward
136—Elevation+160 with six one acre level parcels within crosshatched area of Item #137
137—top of summit consisting of level ground elevation contour+160 Feet above grade
138—contour elevation +120 Feet above grade which circumscribes landfill all around
139—contour elevation +80 Feet above grade which circumscribes landfill all around
140—contour elevation +40 Feet above grade which circumscribes landfill all around
141—contour elevation ground zero +0.00 which circumscribes landfill all around at grade
142—north directional arrow

FIG. 15 *a*

13—Typical one acre parcel with 40 dwelling units consisting of complexes "A"-"C"-"D"
15—Complex "A" containing 12 dwelling units in a two-story structure
1—Complex "B" containing 12 dwelling units in a two-story structure
17—Complex "C" containing 12 dwelling units in a two-story structure
46—Patented "Stelcor" drilled-in displacement micro-pile through garbage refuse
48—undisturbed landfill garbage or refuse of municipal waste matter
49—24"×12" concrete foundation wall with bottom insert into keyway of #50
137—top of summit consisting of level ground elevation contour +160 Feet above grade
138—contour elevation +120 Feet above grade which circumscribes landfill all around
139—contour elevation +80 Feet above grade which circumscribes landfill all around
140—contour elevation +40 Feet above grade which circumscribes landfill all around
141—contour elevation ground zero +0.00 which circumscribes landfill all around at grade
143—top matching arrows coinciding with dotted match-line, a continuation of drawing shown
144—bottom matching arrows coinciding with dotted match-line, a continuation of drawing
145—undisturbed bearing virgin soil which was pre-existing before landfill

FIG. 15 *b*

15—Complex "A" containing 12 dwelling units in a two-story structure
16—Complex "B" containing 12 dwelling units in a two-story structure
17—Complex "C" containing 12 dwelling units in a two-story structure
46—Patented "Stelcor" drilled-in displacement micro-pile through garbage refuse
48—undisturbed landfill garbage or refuse of municipal waste matter
49—24"×12" concrete foundation wall with bottom insert into keyway of #50
137—top of summit consisting of level ground elevation contour +160 Feet above grade
138—contour elevation +120 Feet above grade which circumscribes landfill all around
143—top matching arrows coinciding with dotted match-line, a continuation of drawing shown
144—bottom matching arrows coinciding with dotted match-line, a continuation of drawing

FIG. 16

48—Ligated MSW garbage refuse bales stacked one atop the other ready for compaction
127—Attachment to a Liebherr mobile crane for placing Item #128 atop MSW garbage bales
128—20 Ton massive concrete weight to compact MSW ligated bales of garbage
146—Direction of the compressive force of wall compacting the stacked MSW garbage bales
147—Moveable future concrete wall stacked and secured above Item #148
148—Moveable concrete wall exerting lateral compaction compressive force against MSW bales
149—Bales of MSW garbage stacked in rows at a future landfill site for dense compaction Buried
150—steel channel containing steel ball bearings under steel plate to move Item #148 Buried
151—Interlocking steel sheet piling driven into soil below to act as restraining barrier The direction
152—that both concrete walls move to compact the ligated MSW bales of garbage Steel rebar
153—dowels used to secure/connect next concrete wall addition on top of Item 148 Interlocking
154—sheet piling above ground acting as a restraining barrier to move Item #148

FIG. 16*a*

155—Hook attached to 8 Ton come-along winch attached to Item #148 which helps move it
156—Hook attached to immoveable stationary restraint to operate the come-along winch

FIG. 17

157—46 Mil thick Ram-Board surface protection for aluminum craft paper
158—Heavy-Duty Aluminum Paper 0.024 mm (0.94 Mil) thick carries wire
159—Array of uniformly spaced thin resistance wiring conducts electricity
160—Connection to electrical source such as battery or low 24 voltage
161—Isotropic conductive adhesive conducts electrical current to Item #2
162—the zone of non-violation for stapling Item #1 to the 2×4 wood studs

FIG. 18

136 Elevation +160 with six one acre level parcels within crosshatched area of Item #137
138—contour elevation +120 Feet above grade which circumscribes landfill all around
139—contour elevation +80 Feet above grade which circumscribes landfill all around
140—contour elevation +40 Feet above grade which circumscribes landfill all around
167—Structurally compacted—reinforced MSW debris closed compartment 240'×180'×30'

FIG. 18 a

15—Complex "A" containing 12 dwelling units in a two-story structure
16—Complex "B" containing 12 dwelling units in a two-story structure
17—Complex "C" containing 12 dwelling units in a two-story structure
47—36"×12" concrete footing with formed keyway placed on undisturbed garbage refuse
49—24"×12" concrete foundation wall with bottom insert into keyway of #50
52—Engineered controlled soil fill compacted and tampered in several lift stages
149—Bales of MSW garbage stacked in rows at a future landfill site for dense compaction
154—Steel corrugated sheet piling acting as restraining barrier in MSW compaction process
163—Four inch reinforced concrete slab 240 feet wide×180 feet long

FIG. 18 b

52—Engineered controlled soil fill compacted and tampered in several lift stages
149—Bales of MSW garbage stacked in rows at a future landfill site for dense compaction 154—Steel corrugated sheet piling acting as restraining barrier in MSW compaction process
163—Four inch reinforced concrete slab 240 feet wide×180 feet long
164—#8 one inch rebar dowel attached to sheet-piling and embedded in Item #163
165—Steel ledger shelf bracket attached to sheet-piling which supports Item #163
166—Steel "X" diagonal cable bracing from sheet-piling walls post-tensioned with turn buckle

FIG. 18 c

52—Engineered controlled soil fill compacted and tampered in several lift stages
149—Bales of MSW garbage stacked in rows at a future landfill site for dense compaction
154—Steel corrugated sheet piling acting as restraining barrier in MSW compaction process
163—Four inch reinforced concrete slab 240 feet wide×180 feet long
164—#8 one inch rebar dowel attached to sheet-piling and embedded in Item #163
165—Steel ledger shelf bracket attached to sheet-piling which supports Item #163
166—Steel "X" diagonal cable bracing from sheet-piling walls post-tensioned with turn buckle

FIG. 18 d

52—Engineered controlled soil fill compacted and tampered in several lift stages
149—Bales of MSW garbage stacked in rows at a future landfill site for dense compaction
154—Steel corrugated sheet piling acting as restraining barrier in MSW compaction process
163—Four inch reinforced concrete slab 240 feet wide×180 feet long
164—#8 one inch rebar dowel attached to sheet-piling and embedded in Item #163
165—Steel ledger shelf bracket attached to sheet-piling which supports Item #163
166—Steel "X" diagonal cable bracing from sheet-piling walls post-tensioned with turn buckle

DETAILED DESCRIPTION OF METHOD OF DOING BUSINESS

A—A Novel Approach to Acquire Real Estate Revenue

This type of an intellectual property grant usually patents a "business method, which is combined with some measure of technological ingenuity, resulting in a novel way of doing business. Hence, this business model construction methodology itself is at the very heart of this instant "business method" patent application. Accordingly, said "business method" herein teaches the reader the method of creating an innovative approach to obtain annual financial revenue as rental income, which results from a rather large scale residential development project on heretofore, abandoned, garbage landfill sites.

In sum and substance, then, it forges the marriage of pre-existing technological tools with a method or way of doing business, that when combined together;—becomes a rather unique and different approach from anything else previously imagined. In practical terms, this innovative approach thus represents a particular form of procedure for accomplishing or developing a pragmatic "business model" by specifically transforming abandoned waste landfill sites into valuable income producing property.

Recently, closed landfills, even former superfund sites, are being viewed by developers as potential projects for uses ranging from residential, to commercial and even as solar farms. However, there are technical challenges inherent within this potential as a viable "business method." By and large, municipal building departments have always viewed landfill sites as an unsuitable building development site due to the ground being rather unstable settling terrain; as garbage deposited there, begins to break down from decomposition. How does this decomposition occur? The importance of this decomposition process thus becomes a vital factor as to how this patentable "business method" transforms deposited MSW "Municipal Solid Waste" into an income producing asset.

B—The Decomposition Process

Decomposition occurs as follows. Whenever MSW "Municipal Solid Waste" is first deposited in a landfill, it undergoes first and foremost, an aerobic (i.e. with oxygen present) decomposition stage, where little methane gas is being generated. Then, typically, within less than one year, anaerobic (i.e. without oxygen present) conditions are established, and as a result, methane producing bacteria begin to decompose the waste and generate methane. Therefore, the end result of this decomposition process results in differential settling of the landfill mass; in short; a rather unsuitable bearing soil for building upon. This decomposition process becomes the key factor why municipal building departments are reluctant to approve any building project upon a landfill site. Phase V of this decomposition process occurs after the landfill site has been in existence for decades. Hence, it enters into a final maturation and stabilization final phase, whereby the rate of this anaerobic microbiological activity slows down during this last Phase V of waste decomposition, simply because the supply of nutrients to the anaerobic bacteria, limits their chemical reactions; e.g. the bacteria's necessary life sustaining bioavailable phosphorus becomes increasingly scarce.

It is during Phase V that methane production almost completely disappears, with oxygen gradually reappearing. As a direct result decomposition thus ceases to occur. In short, after several decades; differential settlement as a concern ceases; thus making ripe this technological "business method" process for residential development of all abandoned landfills' pursuant to this "business method"; as an increasingly viable business model.

C—Municipal Solid Waste Factual Data

It is quite beneficial for the reader to gain further insight into the factual data concerning "Municipal Solid Waste" MSW disposal facts. The total annual MSW generation in the U.S. has increased by 73% since 1980, i.e. from 152 million tons per year to 262 million tons per year within the past 40 years alone. Extrapolating into the future for this "business method"; since garbage disposal refuse will not disappear, we can project that status quo alone dictates that by the year 2060, we can expect 372 million tons of MSW per year. This fact harbingers well for this instant "business method" patent application. Furthermore, earlier it was indicated that after several decades, as the landfill decomposition decay process enters Phase V and slowly grinds to a halt; the garbage landfill mass stabilizes and undergoes little if any differential settlement; which also bodes well for this "business method."

Figures 4, 4A:
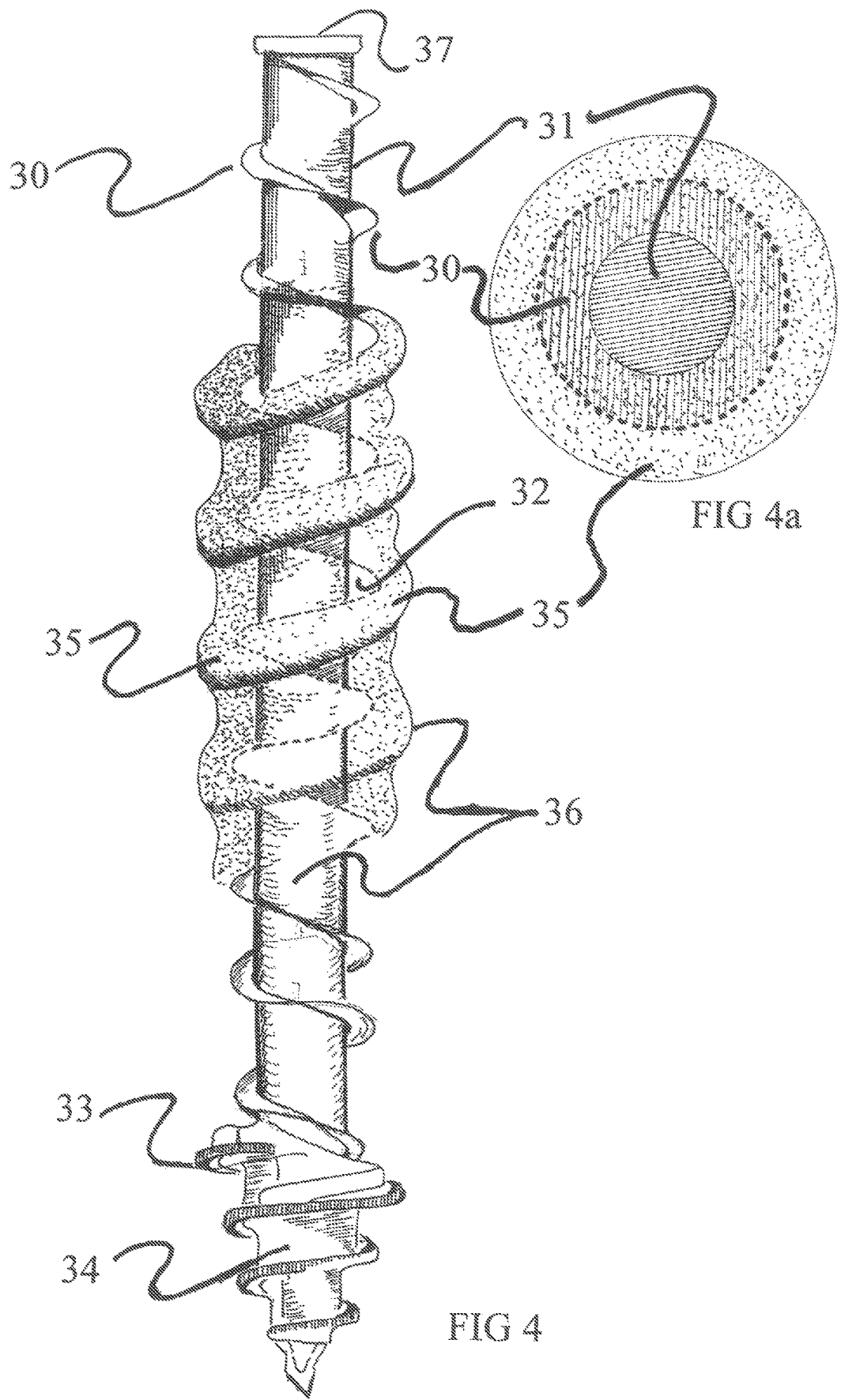

In analyzing the impact of this Phase V stabilization of differential settlement, the reader is now asked to consider the total volume of weight of landfill underlying the typical one acre parcel of land shown in FIG. 1—Item #13, which measures 240 feet long by 180 feet wide; and where the proposed full length of the Stelcor patented pile; which comprises all of FIG. 4 is 30 feet deep. The mathematics involved here is quite simply 240'×180'×30' which equals 1,300,000 cubic feet in total. It then becomes easily verifiable via the internet, to ascertain both the measurements of one singular typical bale of transported and packaged MSW bundle of trash. This exercise will enable the reader to verify the total weight of garbage debris underlying that one acre of Item #13. It is also a fact that a typical bundled bale of trash measures 6 feet long×3 feet high and 3 feet wide, and thus contains two cubic yards of waste which weighs 4,000 pounds per bale. Now dividing the total cubic feet of 1,300,000 CF by 27 yields 24,074 total bales of MSW underlying that one-acre parcel of Item #13. It is also easily verifiable that said aforementioned typical 6'×3'×3' bale of MSW weighs 4,000 pounds. Hence, the total weight of this MSW landfill mass underlying that typical one acre of Item #13 weighs approximately 96,296,000 pounds. Thus, when Phase V of differential settlement is reached, this volume of MSW landmass weight exerts a tremendous amount of pressure; which further consolidates the landfill debris and causes it to become much more dense; thereby also becoming much more amenable toward achieving the necessary soil bearing capacity from a Steclor pile.

D. Soil Bearing Capacity Elements of a Stelcor Micropile

The reader must now appreciate that over the decades of depositing landfill refuse at one particular site, undesirable material such as construction debris, small appliances, and other similar material of a rather dense impenetrable nature can subsequently pose problems when a Stelcor pile is being driven to achieve sufficient bearing capacity for the construction project. Under normal pile driving conditions this is the manner of how bearing capacity of a Stelcor pile is achieved. The reader is now being referred to the patented Stelcor micro-piles bearing U.S. Pat. No. 8,926,228 B2 and U.S. Pat. No. 10,480,144 B2 shown in FIG. 4 where Stelcor drilled in displacement micro-piles are installed using hydraulic powered rotary equipment which are subsequently screwed into the landfill debris of Item #48 while a downward pressure is exerted on the steel core of Item #31 and a continuous flow of cementitious grout of Item #35 is provided to the top of the pile. Reverse grout flow flighting welded to the steel core of Item #30 draws the grout into the void or annulus of Item #32 created by the displacement head of Item #34 located near the tip of the steel core.

Figure 5:
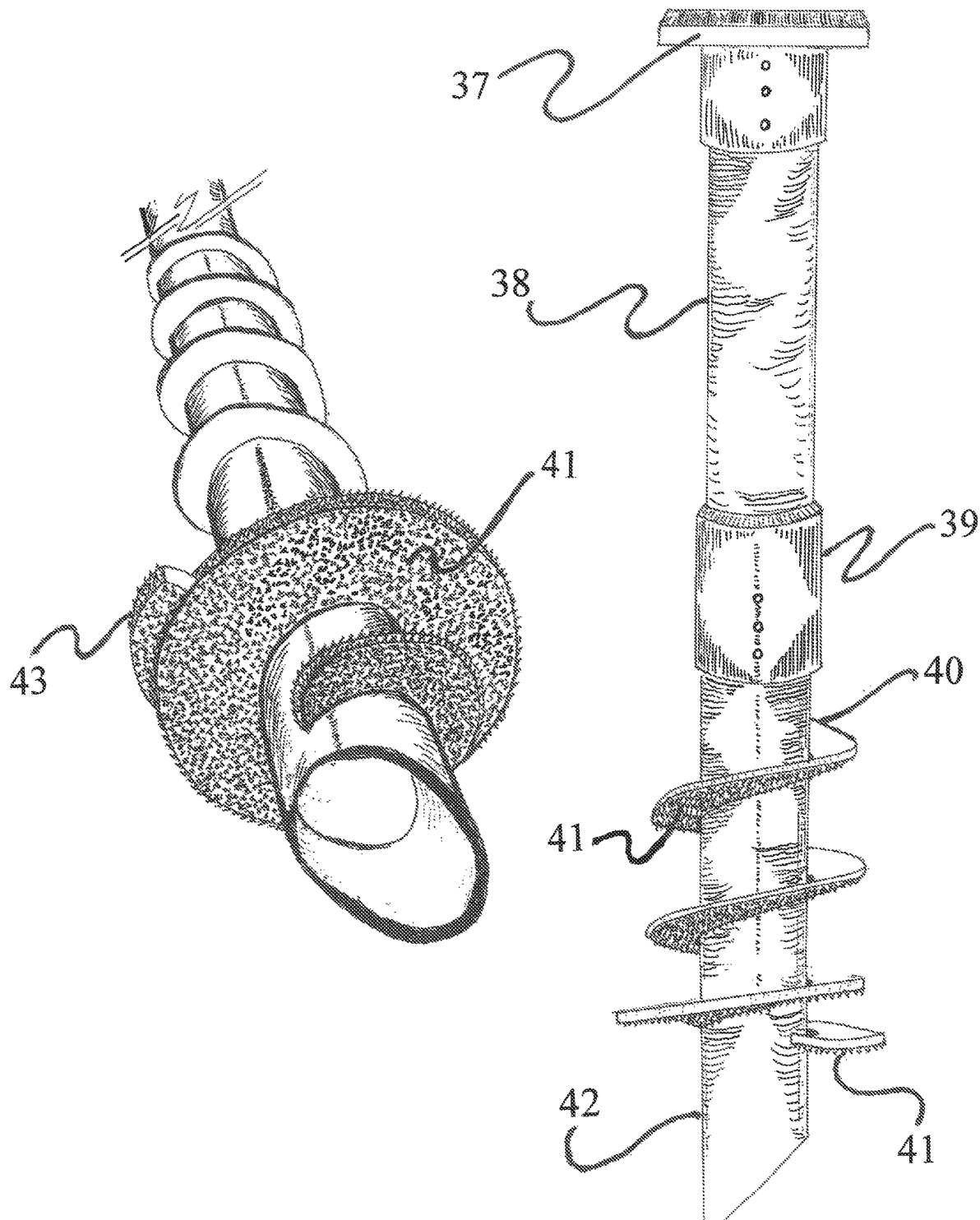

A continuous flight augur drill is used to evacuate a hole where concrete grout is injected through a hollow shaft under pressure as the augur is extracted. Reinforcement is then inserted after the augur is removed which creates a continuous pile without ever leaving an open hole. However, should the Stelcor pile experience resistance in its travel downward; then a rather unique technological breakthrough which aids and abets this "business method" is the diamond adhered abrasive coated under plate and side lateral diamond impregnated edge disc of a special clearing pile; See FIG. 5 Item #41 and Item #43. Diamond is the hardest substance known to man and will effectively cut through any and all resistant landfill material, thus eventually allowing smooth introduction of the normal conventional Stelcor pile of FIG. 4 to achieve soil bearing capacity and travel downward through the MSW landfill debris of Item #48.

It is noteworthy to point out how this patented Stelcor pile achieves bearing capacity for a building project such as the subject of this invention's "business method." Normally piles are either timber piles, round steel cylinders or steel "H" beams. All of the latter achieve bearing capacity through surface frictional resistance; where the end cap of that pile cannot proceed any further downward due to the forces of friction bearing against the entire lateral surface area of the pile. However, with the Stelcor pile, there are two main contributing features. One is the spiral reverse fighting of Item #30 welded to the 5½" diameter steel core of Item #31. The other bearing element is the 14" diameter spiral shaped grout column of Item #35. Therefore, it is the mathematical surface supporting areas of both of these latter items which achieves bearing capacity; as explained below. See FIG. 4a.

The grout column of Item #35 is 14" in diameter and has a circumference of 44". However, its area is the most important feature which is 154" minus the area of the steel core (24") which yields 130". Whereas, the reverse flighting spiral disc of Item #30 welded to the steel core has an area of 78.5 "minus 24" (for steel core) or 54" in total. 130 inches (grout spiral) plus 54 inches (flighting) equals 184 inches. Accordingly, it is a fact that both spirals circumscribe the 5½" steel core and subtend a complete 360 degree spiral descent every 6 inches; which means that in the total pile length of 30 feet, there are 60 total bearing surfaces each yielding 184 inches×60 revolutions or 11, 040 total inches. If we now divide by 144 square inches (one square foot) we see that the total bearing surface of both bearing pile elements of each Stelcor pile is 76 square feet of bearing resistance surfaces against the MSW landfill debris of Item #48.

E. Concrete Footings, Foundation, Building's Underpinning

Figure 8:
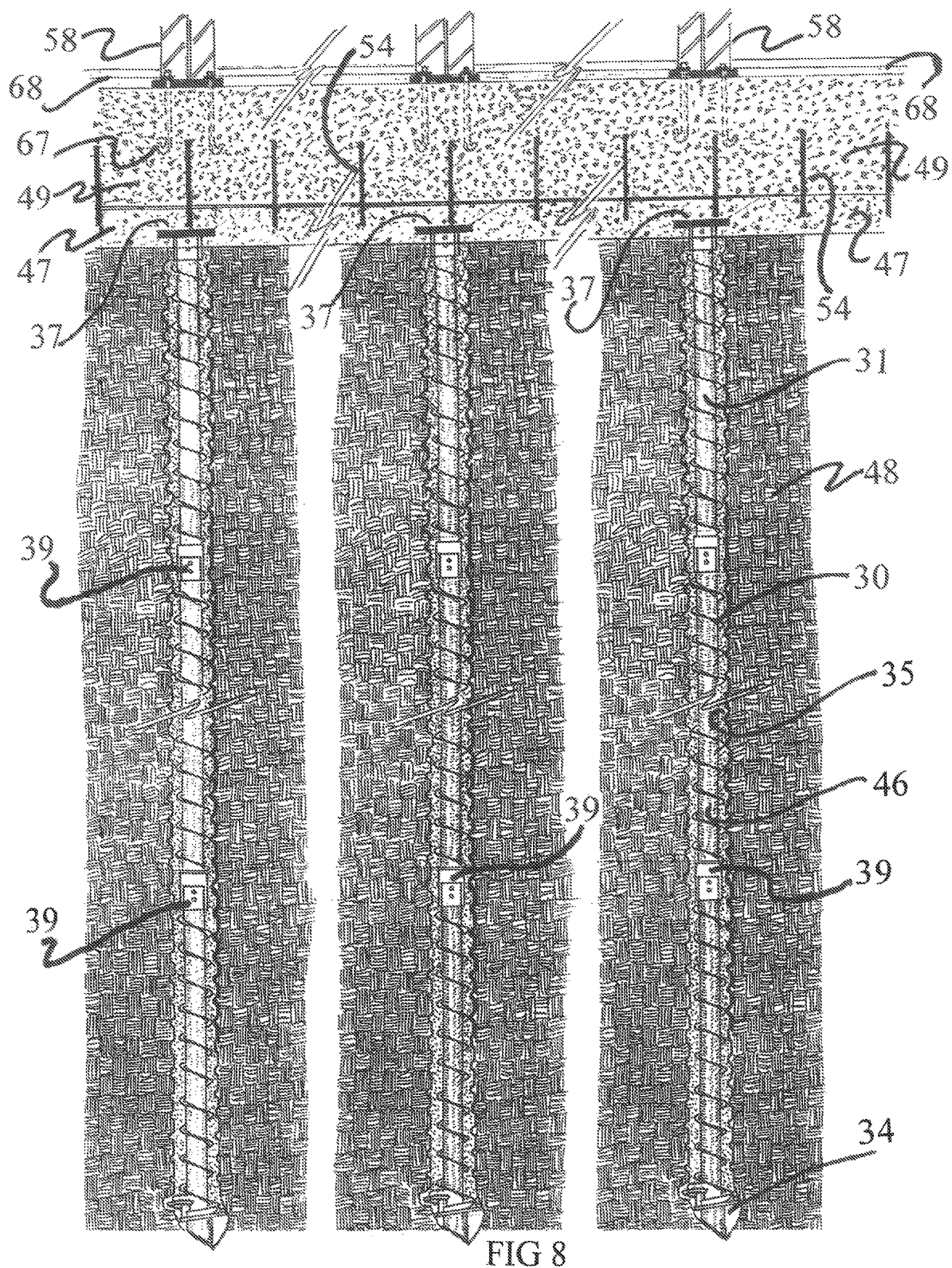

In order for the reader to fully understand the foundational "underpinning" of the building's basic support structure to deal with the live and dead loads of the residential structure above, one must first refer to FIG. 8 which shows the fundamental elements of the Stelcor pile; which are Item #39, the connector expansion coupling, Item #46, the entire Stelcor pile assembly itself; Item #34, the lead section of soil displacement head; Item #35, the 14" diameter secondary deformation grout column; Item #30, the reverse fighting welded to the steel core of Stelcor pile; Item #31, the 5½" diameter, 80 ksi steel core; and finally Item #48; which is the entire landfill garbage debris area which the Stelcor pile descends into and bears upon. These elements unquestionably provide the necessary soil bearing capacity to support the building's live and dead loads looming above, which total sum amounts to 142,800 pounds. Therefore, the nineteen piles shown must each support 7,515 pounds. However, notwithstanding all of these combined features, the quintessential support element of the entire Stelcor pile is Item #37, which not only attaches as the drive plate to the hydraulic rotary equipment; but more importantly, anchors down, secures and binds the Stelcor pile to the supporting concrete footing of Item #47, via this specially designed bolted plate. The concrete footings and concrete foundation walls therefore comprise the "underpinning" of this tripartite load sharing.

Recognize that it is a proven fact that a Stelcor pile can tailor a specific design length of pile to achieve the necessary required soil bearing capacity within the MSW refuse garbage debris simply by attaching increasingly greater and greater lengths of the 5½" steel core of Item #31, by adding subsequent connector couplings via Item #39. Therefore, it becomes axiomatic that unquestionably, whatever the proposed length of pile required; soil bearing capacity will be achieved and reached. However, this only addresses the below ground" "infrastructure. Further, upon closer examination of the drawings herein, it becomes apparent that the combined supporting features for this building's total residential 142,800 pound uniform load, spread out over 1,020 SF, thus becomes a function of a tripartite support system sharing. The first of this tripartite sharing, the "infrastructure" becomes evident in the lower portion of FIG. 8 as elaborated above, and involves Items #30 through Items #39, which, as previously discussed, fully describes the soil bearing elements of the nineteen Stelcor piles. The top portion of FIG. 8 plus all of FIG. 9 also begin to explain the second supporting tripartite entity which is the concrete foundation known as the "underpinning".

It now becomes exceedingly important for the reader to understand what comprises all of these building loads brought to bear on this tripartite system of sharing. Under this system the Stelcor piles comprise the first factor, i.e. the "infrastructure". Whereas, the footings and foundation walls together comprise the second factor, or "underpinning"; while the steel framework above the latter comprises the third factor, or "superstructure." Accordingly, then, there are in addition three separate and distinct gravity building loads impacting the footprint of half of FIG. 9; which all have two key components; a "live load" for residential building calculations, which is 40 lbs. per sq. ft. and a "dead load" of 10 lbs. per sq. ft. for the latter's weight associated supporting elements, which combined calculation of 50 lbs. contributes to both total gravity floor load weights. Therefore, multiplying 50 lbs./sq. ft.×1,020 SF yields 51,000 lbs. for the first floor total load. This same calculation can be repeated for the second floor gravity load which also yields another 51,000 lbs. total load. Instead, the roof structure has a building load calculation 30 lbs. per sq. ft. for its "live load" and a "dead load" of 10 lbs. per sq. ft. for the latter's weight associated supporting elements, which combined calculation of 40 lbs. thus yields a total load of 40,800 lbs. Hence, under this tripartite system of sharing, the steel "superstructure" framework transfers both the second floor and roof loads down to the 3 foot wide spread footing, which total perimeter distributes that 91,800 lb combined load to the 384 sq. ft. surface area MSW soil distribution footprint.

In sum and substance, all of the existing live and dead loads transfer their gravity loads down to this 3,200 psi concrete "underpinning" shown in the upper portion of FIG. 8 and all of FIG. 9. The reader has already learned how the concrete footing of Item #47, is secured to the Stelcor piles via Item #37. Basically, this rectangular footing is locked in place and secured via that feature. Next, there are two distinct basic features which secure the foundation wall of Item #49 to the concrete footing of Item #47. One is the keyway shown in FIG. 6 as Item #50, while the other is the steel dowel rebar of Item #54, which secures the footing to the foundation wall of Item #49. Items #47 and Item #49 both comprise the second portion of the three tripartite support elements. Moreover, FIG. 9 further elaborates in rather graphic detail the structural refinements involved within this concrete superstructure. However, it is noteworthy at this juncture to point out that under normal building conditions a concrete footing and foundation wall are always placed within an excavated dug out area. Normally this excavation lies below grade and is eventually backfilled completely and as a result locked in place by virtue of the fact that it is completely buried underground.

By and large, this is not the customary circumstance within this instant patent application for a "business method." Accordingly, due to the undesirable nature of the inherent instability of the MSW refuse landfill debris shown as Item #48; the concrete footing of Item #47 is simply placed atop of the undisturbed MSW soil debris of Item #48 and completely locked and secured in place via Item #37. As discussed previously, the foundation wall of Item #49 is then locked in place atop of said footing of Item #47 via the keyway of Item #50 and the steel rebar dowel of Item #54. Next, FIG. 9 graphically shows the nineteen Stelcor piles of Item #46 lying beneath the concrete footing of Item #47, with the concrete foundation wall of Item #49 lying above the footing. (Also see FIG. 9 *a*) It also must be observed that the interior portion of the concrete foundation wall of Item #49 on only two sides has a built-in bearing ledger shelf formed in 3,200 psi compressive strength concrete shown as Item #73; which supports the hollow core concrete plank of Item #53.

It is also shown that said hollow core plank of Item #53 which supports the entire live and dead gravity loads of the first floor which totals 51,000 pounds (comprised of 40 lbs. /SF live load and 10 lbs, /SF dead load) rests not only on the concrete bearing shelf of Item #73, but also rests on Item #51; which is Recycled Concrete Aggregate RCA which is in essence previously existing concrete slab fragments which are then crushed into small nuggets comprising excellent structural bearing material. This RCA concrete aggregate is deposited directly right on top of the existing undisturbed MSW landfill debris. In turn, the hollow core concrete plank has its long span broken or thus supported via Item #77; the pressure treated LVL double glulam girder; which also rests upon the three Stelcor piles of Item #46. This foregoing analysis completes the second tripartite support system consisting of the complete mid-tier concrete super-structure, which is considered the "underpinning".

To further elaborate, the reader must now revisit Section "D"—Page 42, which discusses a valid concern for the bearing capacity of the underlying "MSW" refuse soil inherent in any landfill filled with disposal garbage. However, these concerns soon become alleviated when the reader now focuses instead on the disclosure contained within FIGS. 9*b*; 9*c*; 9*d*; and 9*e*. It is lucidly disclosed therein that Item #168 thus becomes the quintessential factor in establishing the end desired result of achieving bearing capacity of this garbage refuse soil. How then is this desired result achieved? The hollow core plank depicted therein contain four void spaces per plank built in by the factory, and that these four void spaces are now shown as Item #172; whereby the concrete solid matrix surrounding these four void spaces is shown as Item #170. Hence, subsequently inserted within these four void spaces are four cardboard Sono-tubes filled with concrete also shown as Item #172. Therefore, the 1" steel rebar of Item #168 is then pre-drilled into correct and precise alignment; first through the concrete foundation wall; then within each mid-center point of all four concrete-filled sono-tubes. Therefore, this process, whereby the 1" steel rebars are structurally secured to the concrete foundation wall of Item #49; and also simultaneously secured within the hollow core plank's four void spaces simply means that these concrete planks in turn, now act as one rather large 6,120 SF massive monolithic structural platform or diaphragm.

Figure 7:
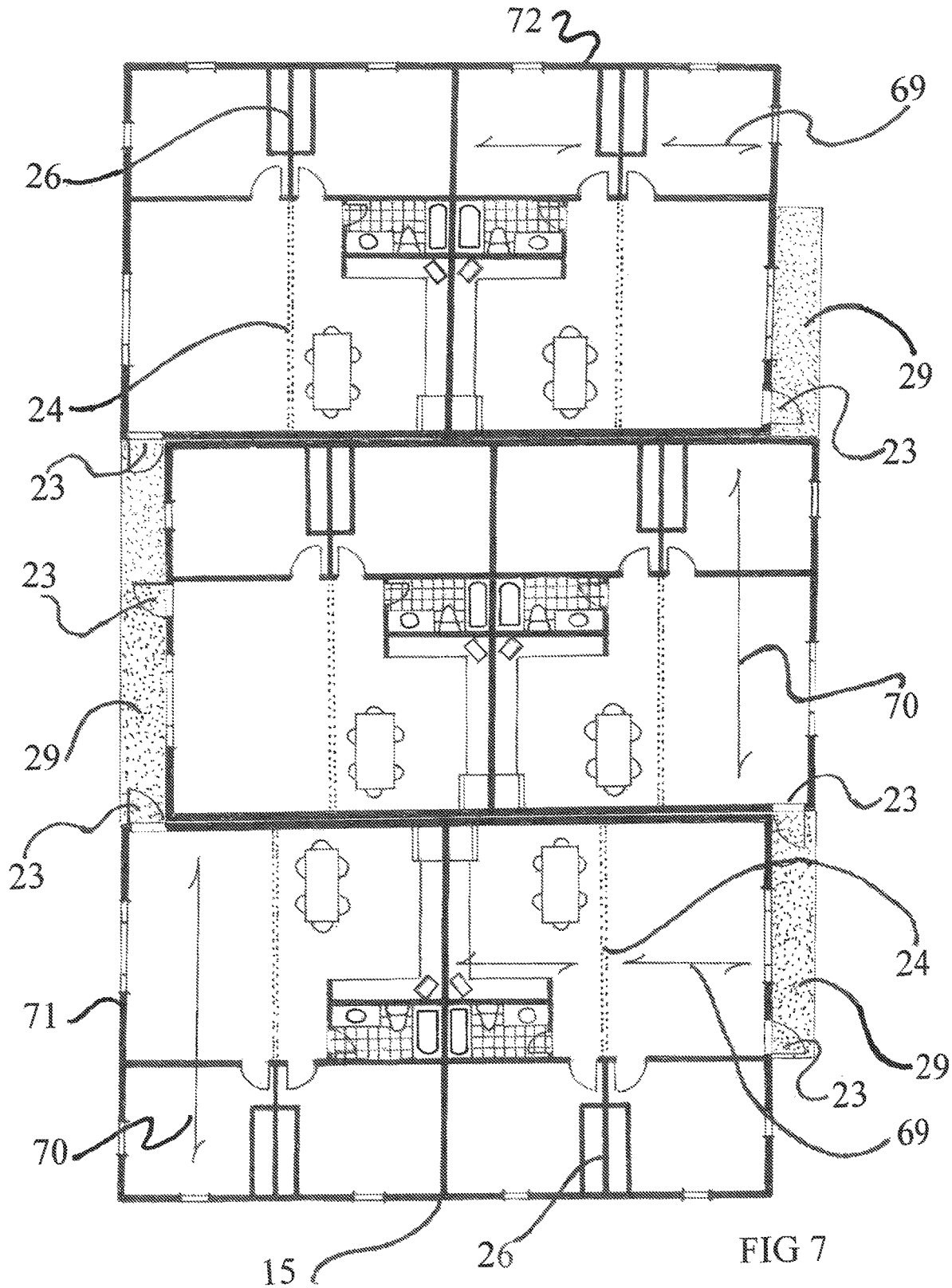

Accordingly, FIG. 9 graphically depicts two building structures of 1,020 SF each (i.e. 30'×34'), thus shown attached together side by side for a sum total yielding 2,040 SF. It is also noteworthy to mention that each bearing end of hollow core plank is also made to rest on the formed concrete shelf of Item #73. Further, FIG. 7 reveals that Complex "A", "B" or "C" shown therein is essentially six apartment dwellings in a two-story configuration. This simply means that the total footprint of square footage for FIG. 7 is now instead 6,120 SF; (i.e. 1,020×6). Therefore, from this foregoing analysis it can be seen that by and large, 6,120 SF is now pressing simultaneously against the entire "MSW" garbage debris; from which this hollow core plank massive platform of 6,120 SF is structurally tied into and secured to the concrete foundation wall; which in turn is attached to the concrete footing; which also is then secured to the 114 Stelcor piles (i.e. 19×6). In short, there should be no concern for bearing capacity of the garbage soil debris presenting any problem which would preclude a building department permit approval for construction herein.

F. Steel Load Bearing Columns & Beams of Upper Structure

This "business method" application eventually will involve some municipalities approval for residential development of multiple acres, heretofore on abandoned landfill sites, which, in the past have always been considered totally unsuitable for development of any residential nature. Each singular unit of this 2,000 unit development site has a first floor total gravity load of 51,000 pounds, comprised of 40 LBS/SF residential live load and 10 LBS/SF dead load. These latter loads are being supported by the concrete "underpinning" as discussed earlier under Section E. The second floor has a total gravity load of 51,000 pounds comprised of 40 LBS/SF residential live load and 10 LBS/SF dead load. While the roof total gravity load of 40,800 pounds is comprised of 30 LBS/SF roof live load and 10 LBS/SF dead load. Both the second floor and roof loads are being supported via this "superstructure" or steel network framing system as elaborated herein and also graphically shown in FIG. 6.

By and large, each residential unit measures 30 feet on the short side and 34 feet on the longer side. The reader also learns by reviewing FIG. 6 that the bottom portion of said drawing reveals the orthogonal relationship between the concrete "underpinning" secured by the Stelcor piles, while the upper level steel framing of columns, steel tubes, and wooden floor joists are graphically shown via the upper portion of said drawing. Therefore, within the landfill debris of Item #48 resides the Stelcor pile of Item #46. The end cap of Item #37 locks in place the concrete footing of Item #47 which rests atop of the undisturbed MSW landfill debris. The concrete foundation wall of Item #49 is thus locked into the footing below via the formed keyway of Item #50 and the steel dowel rebars of Item #54. The concrete anchor bolts of Item #67 secure in place the double pressure treated sill plate of Item #68 which is used as a nailing device to screw-in and secure the SIP—"structural insulated panel (front) of Item #44 and back portion of the SIP panel of Item #45. The concrete hollow core plank of Item #53 rests upon this RCA "recycled concrete aggregate" of Item #51 and also the controlled engineered fill of Item #52; in addition to the formed concrete ledger shelf as discussed earlier under Item #73 (FIG. 9). This graphic showing thus completes the concrete "underpinning" as elaborated herein within Section E, which forms the second tier of the three tripartite support systems.

It behooves the reader to now begin to learn and appreciate the third tier of this tripartite support system (superstructure), which are the steel double angle columns and steel tubing, that support the second floor load and the total roof load. The reader now learns that on the longer side of the apartment unit; i.e. the 34 foot side, there are six double angle iron columns measuring 8"×4"×½" with an allowable column axial load of 197 kips and spaced every 6'-9½" typical for six. Whereas, on the shorter side of this residential apartment unit; i.e. the 30 foot side, there are five double angle iron columns also measuring 8"×4"×½" with the same axial column load; however spaced every 7'-6" which are typical for five.

Figure 6:
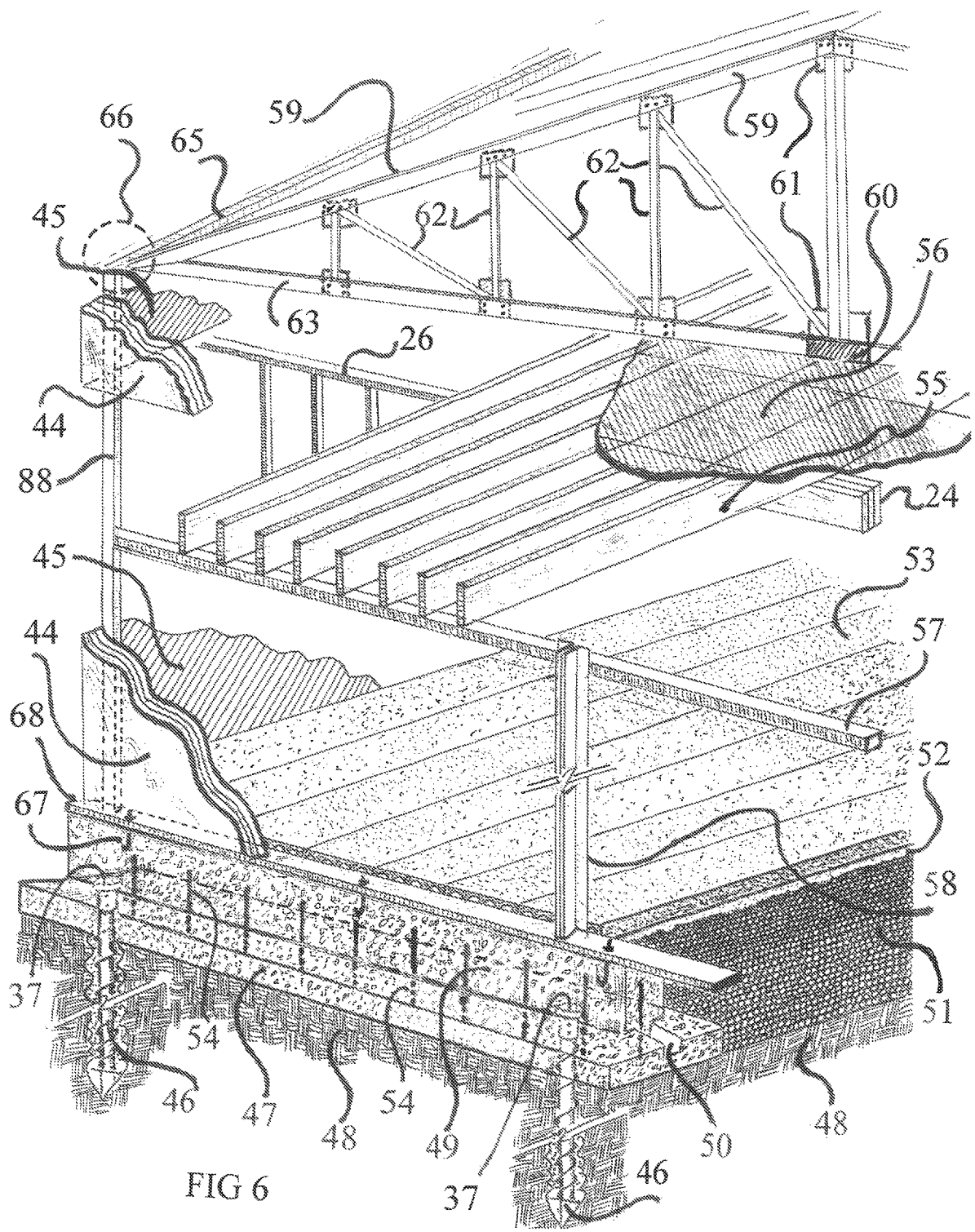

It is now advisable for the reader at this juncture to refer to FIG. 6 to obtain a full graphic understanding of the steel column and beam support features. Item #58, the double steel angle iron column is shown on the longer 34 foot side of the apartment unit and as such is shown supporting Item #57 which is the 8"×6"×⁵⁄₁₆" steel structural tubing which is welded to Item #58, but also sits on a welded steel bracket support of Item #85 shown in FIGS. 11c and 11b. It is this 8"×6"×⁵⁄₁₆" steel tubing which carries the second floor gravity load alone. This 8"×6"×⁵⁄₁₆" tubing has a section modulus of 18.1; where the calculations of the tributary gravity load has been computed to require a section modulus of 16 or better. Please also note that FIG. 11c also shows said 8"×6"×⁵⁄₁₆" tube as being filled with structural grout, shown as Item #93; which enhances the structural supporting properties of said beam and also offers fire resistance as well. However, on the shorter 30 foot long section; it is Item #88 as the 8"×4"×½" double angle iron column which supports Item #65; which is the 8"×6"×⁵⁄₁₆" steel tube supporting the roof trusses. Said tube is not only welded to this steel column of Item #88 but also has the steel support bracket of Item #85.

This foregoing steel structural analysis supra. only comprises the steel skeletal framework upon which the subordinate complementary wooden structural components must be added to finalize the entire support system for both the second floor and roof. Hence, once again we analyze FIG. 6 and learn that 2"×10" @ 16" o.c., Douglas fir wooden floor joists rest upon Item #57; which is the 8"×6"×⁵⁄₁₆" structural steel tube at each extreme exterior end of the apartment unit. It is a fact that Item #55, which are the 2"×10" Douglas fir wooden floor joists can easily span 17 feet @ 16" o.c.; however this span is in fact 15 feet; which is allowable. Also take note that this mid span of 15 feet is highly dependent upon the 2"×4" common stud bearing wall Item #26 of each bedroom, as well as the triple Item #24 glulam LVL laminated veneer glued lumber 22 feet long girder; which the remaining 2"×10" floor joists rest upon. Covering the entire second floor joists are 4"×8" plywood tongue and groove subflooring, screwed and glued to said 2"×10" floor joists, shown herein as Item #56. In addition, the upper portion of FIG. 6 also provides a quick review of the structural elements which support the roof load. They are Item #59 the wooden top chord which measures 9½" deep (comprised of two 2"×10" Douglas fir lumber LVL's)×3½" wide. Whereas, the bottom chord of Item #63 has the same structural properties as the top chord.

It is also noteworthy to mention that because the effective length of the bottom chord in reality measures 34 feet long and subject to deflection, there is a mid-span structural steel tube of Item #60 which prevents deflection mid-span within this member. Finally, there are various structural web elements such as Item #62 adding to the engineering structural performance of said truss; each being attached and secured to either the top or bottom chords as Item #61, the 12 gauge metal gusset plates. Moreover, the reader is guided to review the detail of Item #66—FIGS. 11a; 11b; 11c; and 11d for all relevant truss connection details. This completes the steel load bearing elements as the third and final tier of this tripartite support system, viz. the "superstructure".

G—Connection Details for Building's Roof Truss

FIG. 11a becomes a basic review for the prime elements of the roof truss showing the wooden top chord as Item #59 thus fashioned out of two LVL Trus-Joist engineered laminated lumber measuring 9½"×3½" wide. Whereas, the bottom chord of Item #63 which has the same dimensions is a tension restraining member resisting horizontal thrust. Because this member measures 34 feet long, the steel sleeve of Item #60 is attached at mid-span to eliminate deflection there. Item #62 has several structural intermediate web elements either perpendicular to each chord or at 45 degree angles, in order to support the compressive forces of the roof load. These latter panel points are connected to both chords via the 12 gauge steel gusset plates of Item #61. The SIP panel is shown as Item #44 under the terminal end of the lower chord. Item #98 and Item #99 close off the eave end of said truss as the soffit and fascia board.

FIG. 11b shows the top chord of Item #59 and the bottom chord of Item #63 being connected by a special Simpsom Strong-Tie column cap and amply being supported as resting upon the SIP panel of Item #44 and the structural steel tube of Item #65. In turn said structural steel tube is welded to the double angle iron steel column of Item #58 which is the 8"×4"×½" bearing column and has the steel support bracket welded to it; which the steel tube of Item #65 in turn rests on. It is informative to point out that while the SIP panel of Item #44 is being shown as a possible supporting entity for the lower chord of Item #63; it is totally non-structural whatsoever and essentially is being utilized within the parameters of this "business method" purely as a complete non-bearing curtain-wall insulating building envelope.

Let us now disclose the efficiency of this insulating building envelope. The SIP panel consists of three separate and distinct insulating entities such as Icynene closed cell foam panels each 2" thick (6" total) shown as Item #91 separated by two separate and distinct ¼" layers of air space shown as Item #92. Each insulating R-value of Icynene closed cell foam panel is 7.1 per inch times 6 inches for the three 2" panels yields an R-value of 42.6. These three insulation foam panels are then sandwiched between two structural exterior grade ¾" CDX plywood sheets shown as Item #86; which has a wooden nailing substrate on all four sides of the SIP panel shown as Item #87; i.e. top (clip angles secure top to lower chord) and bottom (screwed as the sill plate of Item #68—See FIG. 11e) and the two sides which are bolted to the 8"×4"×½" angle iron columns of Item #58 (See FIG. 11f)

FIG. 11c reveals the same structural elements as the previous drawing FIG. 11b except that Item #93 shows that structural grout is used to fill the steel tube of Item #65 and the sheetrock ceiling of Item #94 is being shown attached to furring strips as Item #95 nailed to the underside of the bottom chord of Item #63. FIG. 11d is an aerial plan view looking down at the connection details of all the foregoing roof truss structural elements. Here in this drawing the top chord of Item #59 and the bottom chord of Item #63 lie over one another on the extreme left-hand side of the drawing. The structural steel tube of Item #65 is in the middle of the drawing and runs from the extreme left side to the extreme right side. The two intersecting SIP panels of Item #44 are shown coming together at right angles.

H 48% of Toxic Leachate Volume Abated Via Rooftops

According to the "Journal of Environmental Technology" Volume 38-2017—Issue 13-14; landfills are considered the most widely practiced method for disposal of Municipal Solid Waste MSW and 95% of the total MSW collected worldwide is disposed of in landfills. Leachate comprised of pharmaceuticals, volatile organic compounds, toxic metals etc. produced from MSW landfills may contain a number of pollutants and thus pose a potential environmental risk as pure rainwater trickles down into contaminated landfills and then this pure rainwater now picks up this toxic chemical waste, thereby polluting the ground water acquifers. It now becomes factual that each one acre under consideration herein measures 240 feet×180 feet or 43,200 total SQ FT.

Figure 10:
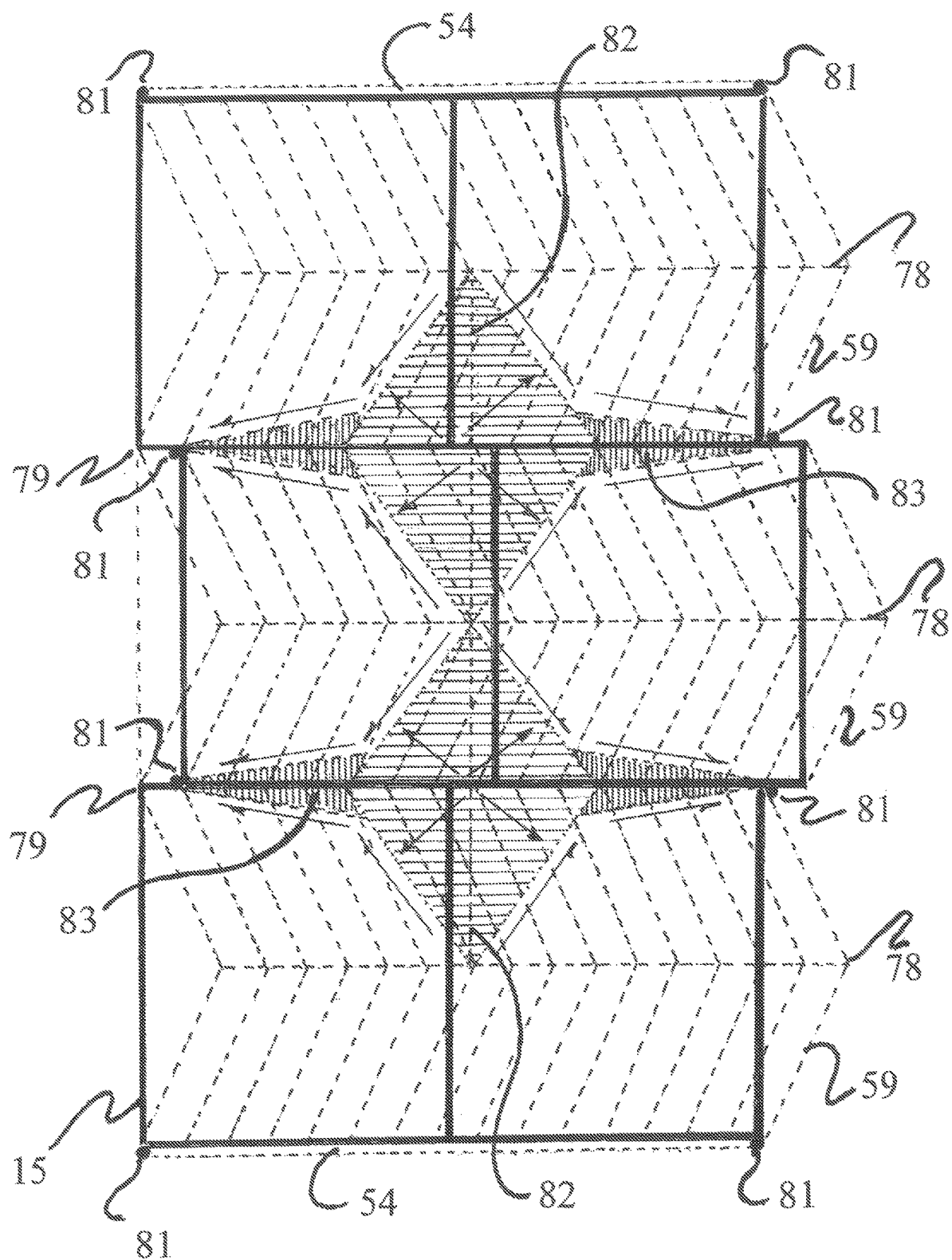
FIG. 10—Roof showing 50% collected rain ground water being reclaimed into aquifer FIG. 11 a—Entire roof truss spanning full 34 foot length of a typical dwelling unit complex FIG. 11 b—Orthogonal view showing how roof truss bears on axial column support and tube FIG. 11c—Cross-sectional view showing roof truss being supported by structural tube FIG. 11 d—aerial view looking down at entire roof truss support elements FIG. 11 e Bottom of SIP panel secured to sill plate and concrete foundation FIG. 11 f—Sides of SIP panel secured to 8"×4"×'/2" angle iron column FIG. 12 a—Full 102 foot long West elevations of Complex "A"

Viewing FIG. 10 it now becomes a fact that the square footage of the total built-up roof area comprises just under half of the total square footage of that one acre or precisely 20,400 SF; that in fact becomes an impermeable surface against water penetration which is systematically collected via the various formed raised roof reverse gables such as Item #82 and the low rise roof cricket areas abutting the latter such as Item #83. Therefore, it can be easily verified that each complex of six apartment units (See FIG. 7) has three main roof areas shown as Item #78, formed from the roof trusses of Item #59 described under FIG. 11. That latter roof area is 6,120 SF times three separate buildings i.e. Complex "A", "B", "C" and 2,040 for minor "D". The latter math yields a total of 20,400 SF. In short, the amount of water collected is 48% of that total one acre. It also can easily be verified that all of the arrows shown within FIG. 10 shed away from the highest roof point of Item #78, then eventually get diverted to Item #82, and finally gets diverted to Item #83; whereby the total confluence of all rainwater following the direction of all the arrows, eventually automatically spills and empties into the storm leaders of Item #81 or the end unit side gutter system of Item #54. Thus, the confluence of all the arrows eventually enters one of eight downspouts shown as Item #81. The rainwater thus goes from highest point of Item #78 downward via the arrows to Item #82 then to the lowest point of Item #79 into one of the eight storm leaders of Item #81.

I. The Architecture of the Typical Residential Dwellings

Thus far this instant specification has concentrated solely on the structural supporting aspects of this residential development "business method." Instead, FIG. 1 herein demonstrates a real life example which now exists in Nassau County, New York State, which is a 65 acre landfill EPA declared supersite located in the Town of Oyster Bay, started in 1957, well over 63 years ago. The methane gas formerly generated there is no longer active and as a result the reader can now speculate that decomposition has ceased for the most part. (read Section B herein—Page 40) Item #13 therein also demonstrates that there are actually 50 of these one-acre sites just ripe for development. This graphic map also indicates that the site is easily accessible via automobile.

Figure 2:
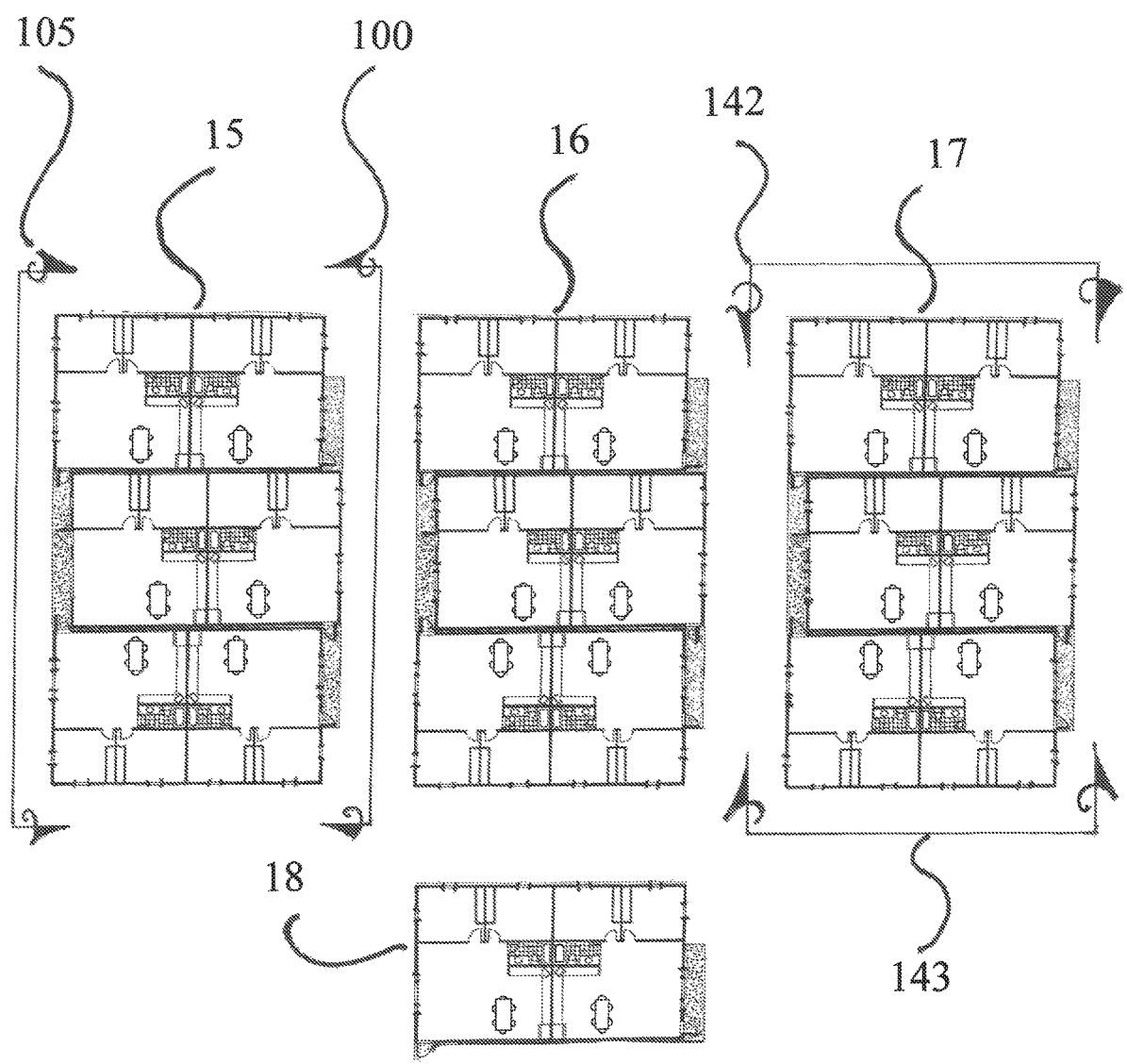

FIG. 2 on the other hand is an enlarged version of Item #13 above, which is adapted from FIG. 1. It shows 20 dwellings built as four complexes; i.e. Item #15 is Complex "A". Item #16 is Complex "B" and Item #17 is Complex "C"; while Item #18 is the smaller Complex "D". The elevation of Item #105 faces east; while the elevation of Item #100 faces west. Also the elevation of Item #142 faces south, while the elevation of Item #143 faces north. It is also noteworthy to point out that from the drawing of FIG. 12 these graphic 20 dwelling units are constructed as two story dwellings. Thus accordingly, there are actually 40 dwelling units per one acre site. Hence, this "business method" patent filing application has, as a business model the residential development of instead 40 dwelling units per one acre, thus yielding a total of 2,000 dwelling units being built upon this 50 acre landfill site. Additionally, this "business method" expressly intends to develop this landfill site exclusively for "First Responders" only; i.e. all nurses, doctors, ambulance drivers, EMT technicians and of course military personnel; in effect; . . . all COVID-19 professional care-takers who administered and cared for all those affected with that COVID-19 virus.

It is also informative to offer specific information geared toward the ultimate success of this "business method." From the very nature of this landfill site, and from the U.S. EPA Federal Register as a reliable resource dated Aug. 30, 1988, Volume 53, No. 168; said document reveals that in the United States alone, there are 3,091 active landfills and over 10,000 old abandoned landfills. Thus, it is safe to conclude that the latter sites are for the most part abandoned, where lack of approval for residential development becomes a foregone conclusion. However, this abandonment seems to harbinger well for the strong presumption herein that each municipality would be instead strongly amenable to granting or approving a ground lease for this 65 acre site for the sum of exactly one dollar per year. This effectively means that the landfill as a re-development site is FREE at no cost whatsoever. Moreover, municipalities would be more sympathetic toward granting approval for this residential development in so far as it is being exclusively offered only to "First Responders" and care-givers who constantly risk their lives for this nightmare COVID-19 pandemic.

Few then can deny the proposition that as a classification of people more worthy of recognition and reward in our society; should be the group known as the "First Responders" as COVID-19 care-givers. Unselfishly, these individuals are continuing to risk their lives for the health and well-being of those stricken with the Corona-19 virus. Toward this end it thus behooves this patent applicant to bestow upon these care-giving angels, a monthly rental charge or payment for each 1,020 SF two-bedroom dwelling, the sum of $800 rent per month. How is this "business method" then being made possible at this rental charge. To begin with, the land as previously discussed is FREE of charge. We now must focus on a rather detailed budget take-off estimated cost of construction for Item #13 which is a typical one-acre parcel containing 40 dwelling units.

| CONSTRUCTION BREAK-DOWN | |
| --- | --- |
| PILES | 540,740 |
| SIP PANELS | 283,200 |
| CONCRETE | 126,000 |
| STEEL | 210,600 |
| CONCRETE PLANK | 204,000 |
| FLOOR JOISTS | 26,936 |
| PLYWOOD SUB FL | 30,080 |
| OAK FLOORING | 204,000 |
| TRUSSES | 60,000 |
| WINDOWS | 29,360 |
| EXTERIOR DOORS | 16,000 |
| INTERIOR DOORS | 15,180 |
| SHEETROCK | 115,200 |
| APPLIANCES | 83,840 |
| PLUMBING FIXTS | 61,680 |
| KITCHEN | 168,000 |
| TAPE & SPACKLE | 60,880 |
| PAINTING | 200,880 |
| FINISH TRIM | 84,800 |
| PLUMBING | 200,000 |
| ELECTRICAL | 400,000 |
| ROOFING | 18,240 |
| SIDING | 154,666 |
| TOTAL | 3,058,542 |

In order for this somewhat unbelievable rental charge of $800 per month to occur, several factors must come into play. As mentioned earlier, the land dedicated for this project must be acquired absolutely FREE of charge. Next, there can be no real estate taxes; whereby the owner or the developer would be forced to pass on these costs to the "First Responder" as the lessee. Now let's examine the total rent revenue emanating from this entire residential development. $800 per month rental payment multiplied by 2,000 total dwelling units yields $19, 200,000 per year annual income. The estimated cost of construction for this typical one-acre parcel is shown via the construction break-down on page 54 as costing $3,058,542. Accordingly, the principal pay-out over a commercial 20 year mortgage for the sum total cost of construction of $3, 058,542 multiplied by 50 one-acre parcels yields a staggering $152,927,100; . . . which yearly pay-down for principal alone, without interest comes to $7,646,355 per year. It can thus be seen that the yearly rental income more than is sufficient to not only amortize this project cost in just 20 years, including interest payments, but to also guarantee that the lessee's target rental charge of $800 per month can be met as well.

Figure 3:
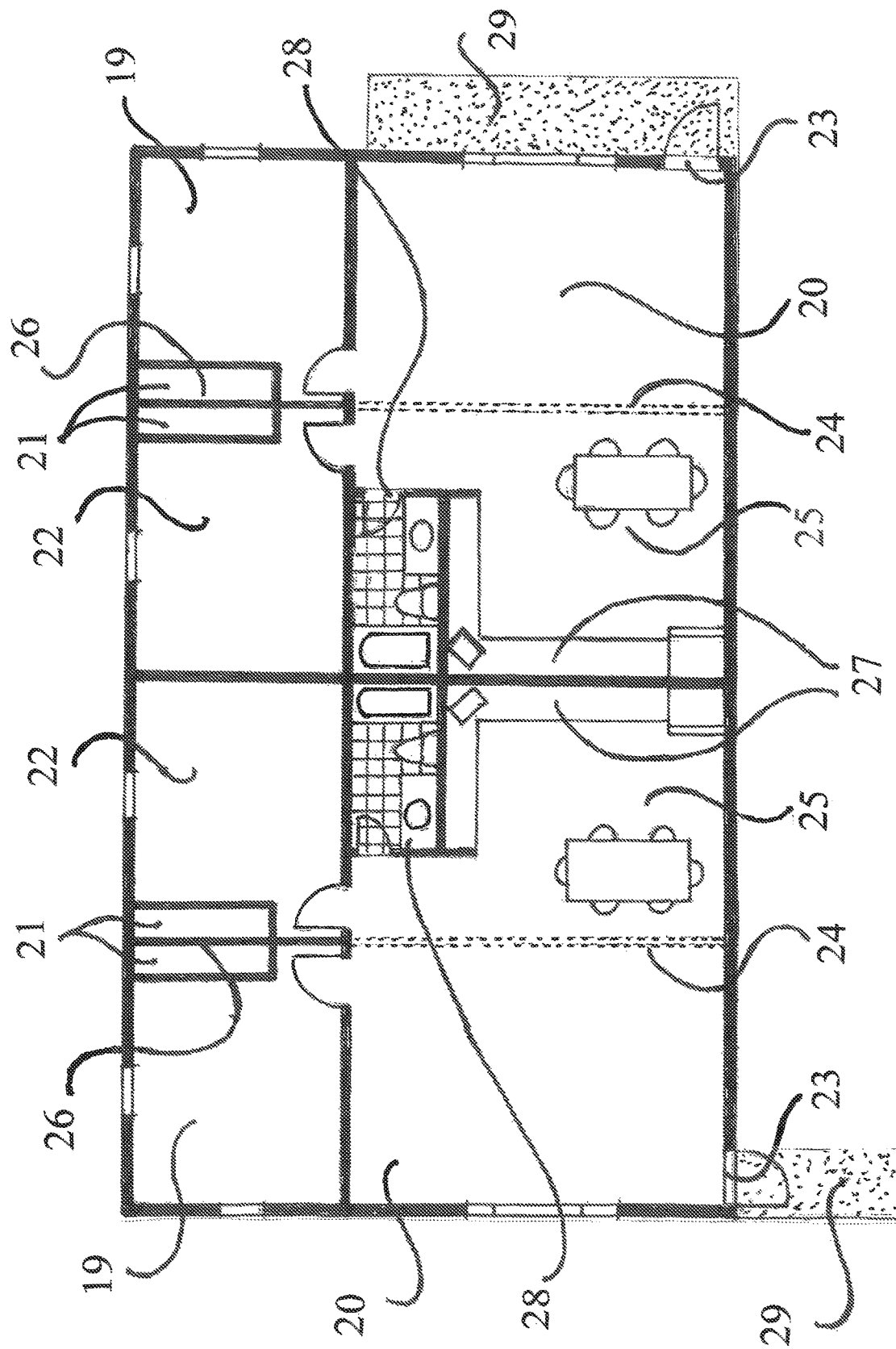

FIG. 3 will now demonstrate just how accommodating this 1,020 SF two bedroom is deemed both suitable and comfortable, as a dwelling apartment capable of providing one modest sized bedroom measuring 15 feet by 12 feet as shown under Item #19 with a clothes closet shown as Item #21 and another similar sized bedroom for one child or perhaps two sleeping in bunk beds shown as Item #22. Next, we see an ample sized living room measuring 22 feet long×15 feet wide shown as Item #20. There is also a typical sized 5 feet×7 feet bathroom shown as Item #28 with a ceramic tiled floor and a rather beautiful American Standard "Ovation" 60" standard fit bathroom one-piece kit with a sliding glass tub/shower door. A typical water closet and 24" sink with vanity. The kitchen shown as Item #27 has lower base cabinets and upper wall cabinets. The short wall of cabinetry measures 7 feet containing both upper and lower cabinets; while the longer wall measures 14 feet also containing upper and lower cabinets and a 24.9 cu.ft. stainless steel side by side refrigerator.

The dining room area shown as Item #25 resides within the kitchen area. It is noteworthy that FIG. 3 also shows the two main structural supports for the second floor 2"×10" floor joists; one which is shown as Item #26; which is the common 2"×4" stud wall separating the two bedrooms; while the other is the 19 foot long triple LVL glulam drop header or girder shown as Item #24. The entrance door to each apartment is shown as Item #23.

FIG. 7 is nothing more than an enlarged isolated view of FIG. 2 shown either as Item #15; Item #16; Item #17; i.e. either Complex "A"; Complex "B" or Complex "C". These main graphic viewpoints are to show the three main upper level concrete platforms which permit entry to the six entrance doors to each apartment shown as Item #29; while the six entrance doors are shown as Item #23. Naturally, there are three exterior staircases leading to these platforms. Item #69 shows the direction of the 2"×10" floor joists below as being supported on the 2"×4" common bedroom stud wall shown as Item #26. The rest of the 2"×10" floor joists are supported on the triple 2"×12" LVL glulam drop header girder shown as Item #24. The direction of the overhead roof trusses are being shown as Item #70. Item #72 indicates that is the shorter wall measuring 60 feet wide; while the longer side with the roof trusses measures 34 feet long shown as Item #71.

Figure 12:
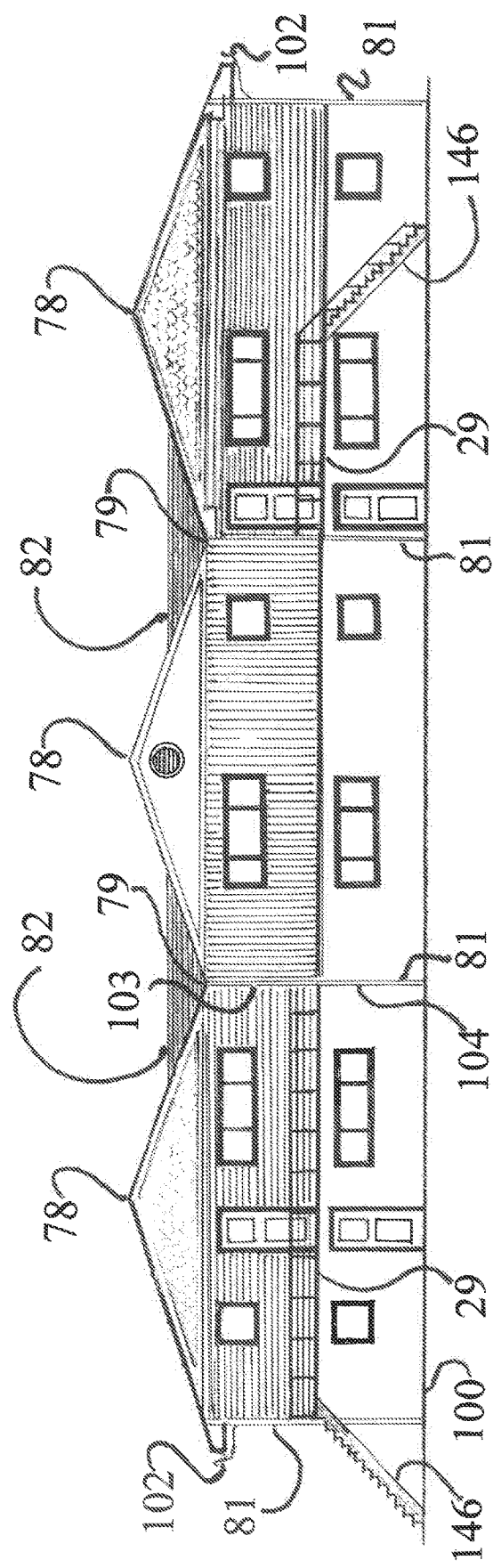
FIG. 12 b—Full 102 foot long East elevations of Complex "A"
Figure 12:
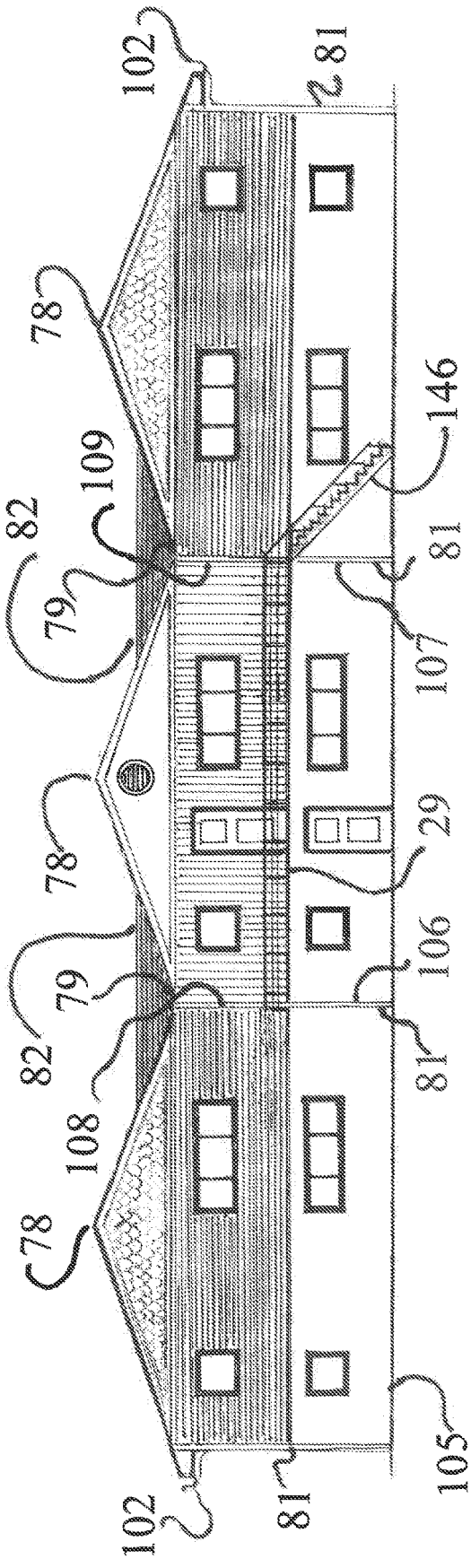
Figure 12C:
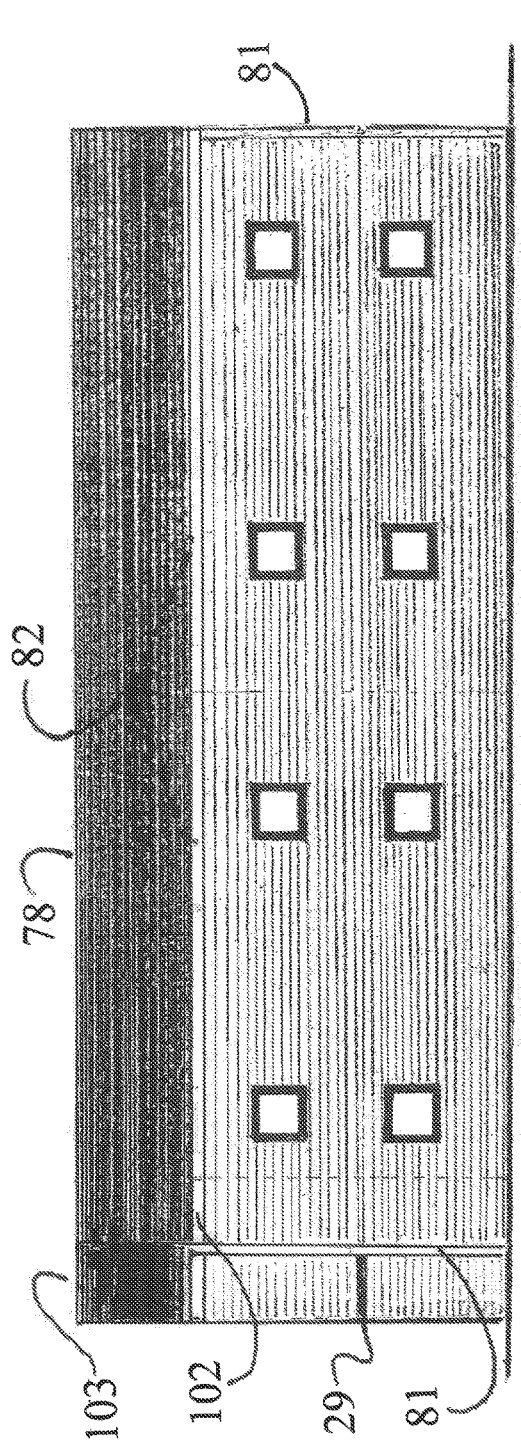
Figure 12D:
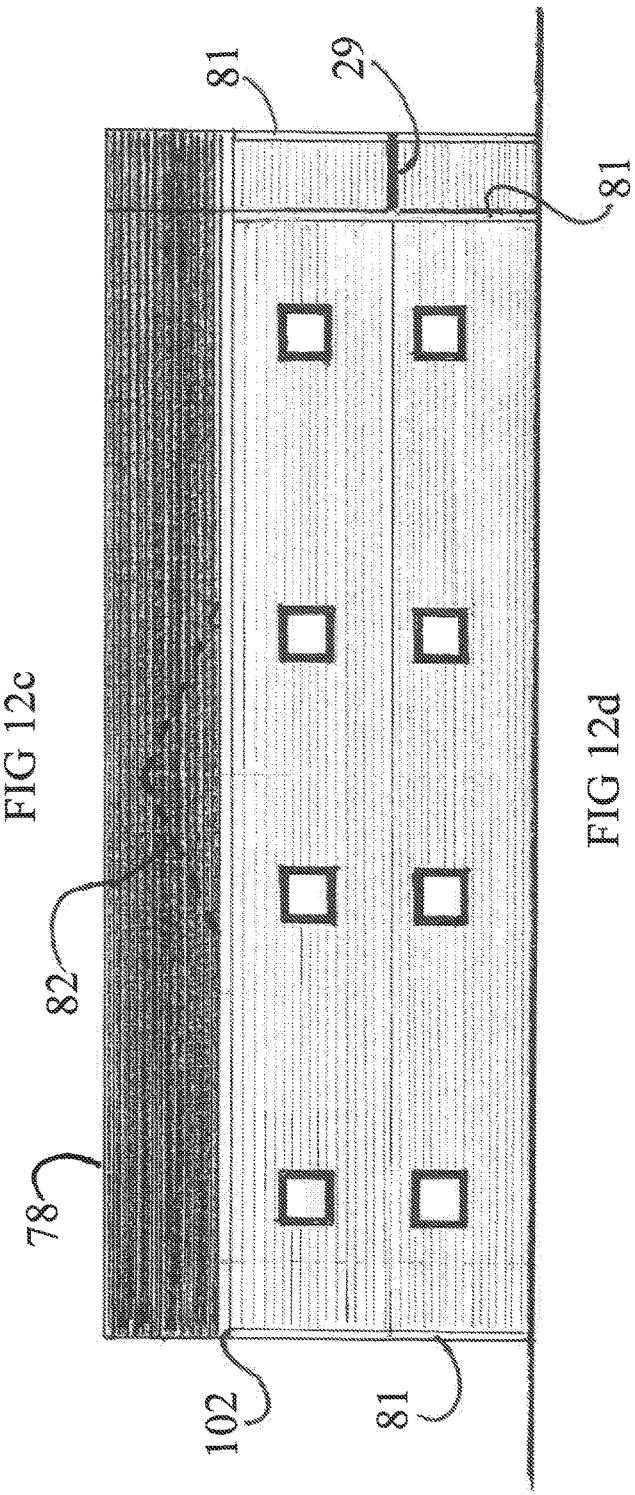

FIG. 12 a shows the west elevation of either Complex "A"; "B" or "C". It also graphically shows the highest point or roof ridge peak of the three prominent 34 foot long built-up truss gable roofs shown as Item #78. The discussion of how this rainwater is collected from these roofs was amply elaborated within Section "H"; page 51 herein. A quick graphic review thus reveals that from the highest peak of Item #78, the rainwater thus naturally flows from those drawn arrows indicated within FIG. 10 and then inevitably hits the intermediate mid-line reverse gables of Item #82; then flows unavoidably upon Item #83 the four hidden unseen crickets in this FIG. 10. It thus logically follows from a return to FIG. 12 a, that the lowest points on the entire roof system flowing off these four crickets becomes Item #79. From these low points of Item #79 eventually the rainwater spills into the controlled storm system of leaders of Item #81. Next, the three outside concrete staircase platforms are shown for each complex as Item #29 while the three exterior staircases themselves are shown as Item #146.

FIG. 2 and East elevation 12 b shows the middle most aspect of Complex "A" or Complex "B" or Complex "C" as being recessed approximately four feet inward, which permits a roof overhang to shelter the entrance doors of Item #23 of FIG. 3. However, at the West elevation this middle most aspect instead juts out four feet which is all explained graphically via Item #103 and Item #104. The same graphic explanation takes place for the East elevation as graphically shown via Item #106; Item #107; Item #108 and Item #109. Next, the side rainstorm gutters at each end of the building Complex are shown as Item #102; each one spilling into the downspouts of Item #81.

J—Marriage of Technology and Method of Doing Business

By and large, the hallmark of this patent application as a viable "business method" necessarily centers around the marriage of two diverse concepts. This flows from this instant business plan of action whereby certain "technological advancements" explained herein become inextricably intertwined with a method of "doing business", where this latter patent application is defined as "actively engaging in any transaction for the purpose of financial or pecuniary gain or profit." Within Section I—page 52 the reader learns that this pecuniary gain or profit from this "business method" is valued at $19,200,000 annually. Suffice it to say, the reader soon learns that within Section D—Page 42 the Stelcor micro-pile of FIG. 4 becomes the necessary "tour de force" herein since it is the main "technological advancement" for this "business method" whereby as a scientific "technological advancement" its utility as such must prove to any municipality via a "load test" that soil bearing capacity has been achieved within Item #48, which is the MSW landfill debris. However, should the Stelcor drilling process experience any drilling resistance in its forward progress downward; then the "technological advancement" within FIG. 5 would then come into play as Item #41 and Item #43. In other words; that diamond adhered drilling augur would penetrate that resistant and stubborn MSW garbage.

Normally a SIP Structural Insulated Panel shown as Item #44; although manufactured as an 8" thick panel, which is the same as this instant design, instead has a one-piece polyurethane foam core of 6½" thick. However, this instant "technological advancement" instead mandates three 2" thick Icynene closed cell sprayed foam insulation panels. Hence, a major part of the innovation of using this Icynene closed cell spray foam being utilized herein within this SIP panel, has been the use of the special blowing agents; which are the gases used to expand the cells of this Icynene spray foam polyurethane insulation and thus give it additional insulating properties; whereby this closed cell foam thus restricts gas loss best. Therefore, this Icynene closed cell spray foam insulation provides a tight air barrier to the interior of the SIP panel environment of Item #44, which helps mitigate the leakage of expensively heated warm air loss from the building interior to the cold winter outside environment. It also seals out moisture infiltration to stop any moisture vapor penetration into the building which also reduces the risk of mold and mildew growth.

Figure 13:
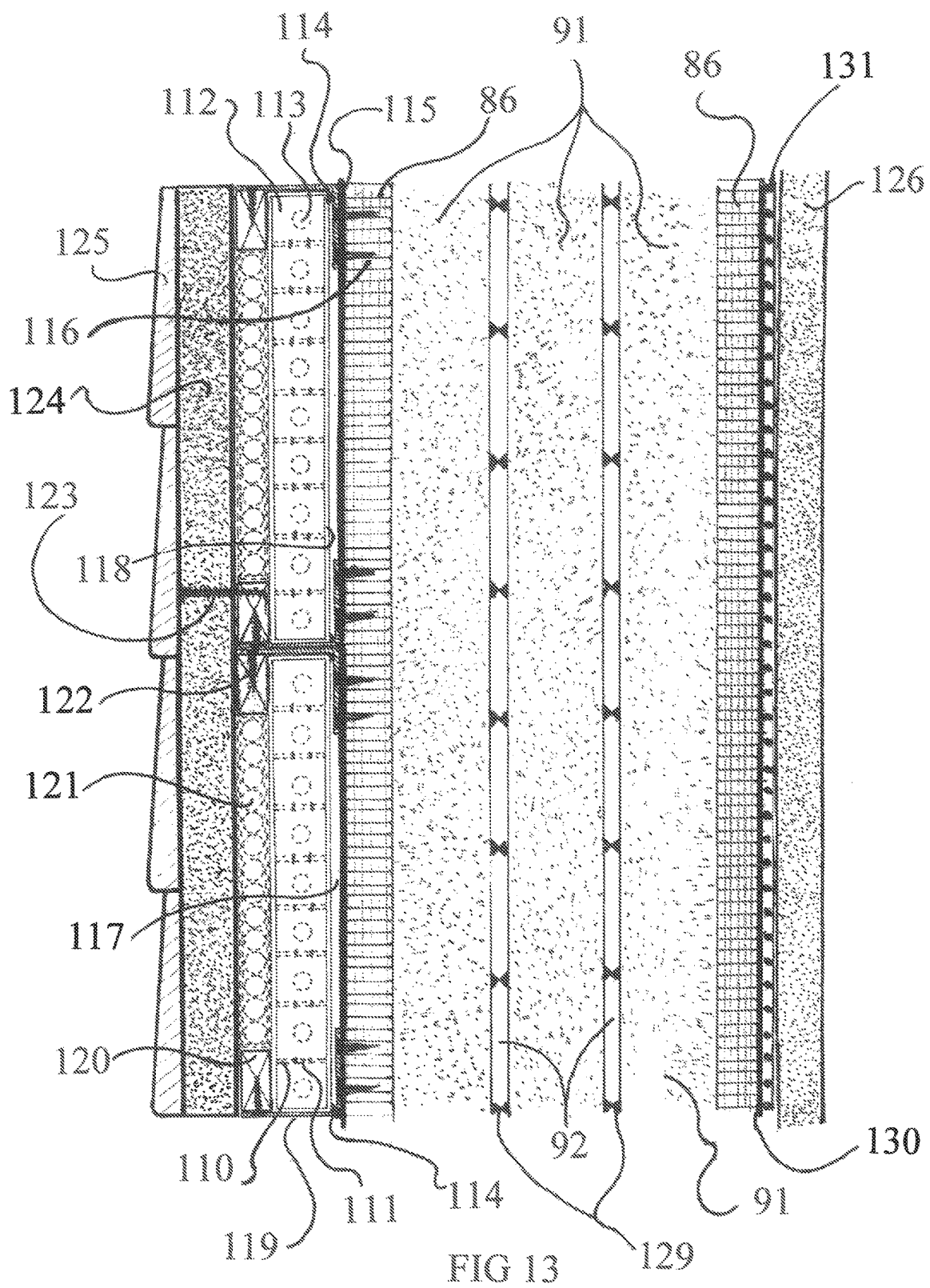
FIG. 13—Cross-section from exterior cladding of typical SIP panel through interior sheetrock FIG. 14—Topographical aerial view of entire 50 acre landfill showing five contour elevations FIG. 15 a—Cross-sectional view of the lower elevations through the above topographical map FIG. 15 b—Cross-sectional view of the upper elevations through the above topographical map FIG. 16—Compaction Process of MSW garbage bales in a newly acquired landfill FIG. 16 a—Come along winch which exerts tremendous lateral tension force FIG. 17—Electrical low voltage wall panel generating constant 40 degree F. temperature FIG. 18—Cross-section showing all full-capacity reinforced compacted landfill compartments FIG. 18 a—close-up view of full capacity compacted compartments with building dwellings FIG. 18 b—detail of steel dowel into concrete wall and concrete slab FIG. 18 c—detail of steel dowel into sheet-piling and two concrete slabs of two compartments FIG. 18 d—detail of steel dowel into neighboring adjacent concrete wall and concrete slab

Now the reader's focus should turn to FIG. 13. We must now come to appreciate that the two ¼" air gaps in between the three 2" thick Icynene closed cell sprayed foam panels of insulation; also contribute to the insulating R-Value of the SIP panel. It is thus an undisputed scientific fact that the trapped air beneath several layers of feathers in a pigeon which lives in the cold northeast during the winter months is the lone life-saving factor which keeps that pigeon alive; because the trapped air underneath those feathers insulates his body blood temperature from winter's heat loss. Analogously, the hairs within a polar bear's fur likewise trap air as an insulating medium and prevent heat loss from its body during the frigid artic winter climate. It is thus this "technological advancement" to utilize this trapped air which is deserving of merit for grant of this future patent application.

It now becomes unquestionably beneficial to discuss how this "business method" is aided and abetted by the insulating properties of these "technological advancements". For instance, the hallmark of this entire revenue acquiring "method of doing business" is quite frankly to enable the inventor herein the ability to charge these renting "First Responders" the unheard of affordable monthly rental charge of only $800 per month. It normally costs a homeowner or a lessee who pays for expensive heat the sum of $5,000 per year; . . . or accordingly instead, that rent would be $1,400 per month more ($800 rent+$600 heating). Therefore, this insulating value unquestionably helps achieve this revenue goal. More importantly, if this entire residential development of 2,000 units is fully rented because of the $800 monthly rental charge, then the owner as the inventor herein can easily make his debt service mortgage payments to defray this entire cost of construction.

Next, we learn that within FIG. 13 there are two other "technological advancements" which contribute to a major extent to this insulating factor which mitigates an unnecessary and costly monthly heating rental increase of $600 per month. Perhaps the major impetus toward this goal is the VIP vacuum insulation panel under U.S. Pat. No. 9,771,714; which this applicant herein is the sole inventor of, shown as Item #118. For a greater in-depth explanation of how expensive paid for home heating cannot cross a vacuum barrier such as the VIP vacuum panel of Item #118 and transmigrate out to the 20 degree Fahrenheit winter cold air; the reader is encouraged to research this aforementioned patent. By and large, the following are the basic elements of this VIP patent. Item #114 is one of four platform feet of the VIP panel. Item #112 is the horizontal cross-strut, while Item #113 is the aperture hole through it for evacuation of air. Item #125 is the exterior siding. Item #116 is a screw. Item #124 is the exterior Dens-Glas gypsum sheathing. Item #123 another screw. The VIP panel itself is Item #118. Item #122 is a screw into wood ground to retain the VIP. Item #121 is bubble wrap with trapped air; while Item #117 is a thin layer of trapped air.

Item #120 is a wood ground. Item #110 is a vertical structural support with aperture for air evacuation. Item #119 is the plastic carrier for VIP panel. Item #111 is another aperture for air evacuation when vacuum is being formed. Item #115 is the 15 lb. asphalt impregnated waterproofing building paper. Item #86 is the exterior ¾" plywood sheathing of the SIP panel. Item #91 are the three 2" thick Icynene spray foam insulation boards. Item #129 are the plastic spacers which separate the foam boards. Item #92 are the two ¼" air gaps. This next "technological advancement of "Item #131; which forms the basis of claim 3 is the second major factor in insulation technology which is the continuous loop of wire similar to an automobile rear window defroster. Item #126 is the interior building' sheetrock. Item #130 is the reflective aluminum foil paper which conducts the 40 degree heat generated by Item #131 to mitigate expensive monthly heating costs. The reader is now urged to view a Provisional Patent Application filed with the United States Patent & Trademark Office on Sep. 2, 2020 under Application Number 63073658 whereby a formal utility patent for this device will be prosecuted in the very near future.

This above Provisional Patent disclosure of Application No. 63/073,658 centers around claim 3 within this application by this same inventor for a patent for a "Method of Doing Business". By and large, said claim 3 is a novel way to obviate the requirement to heat a home during the winter, whereby said dwelling has according to this "business method" the installation of another invention secured under U.S. Pat. No. 9,771,714 which essentially is the vacuum insulated panel discussed within claim 2 above. The science pursuant to that invention teaches that heat loss from an expensively heated home is not lost through the building's envelope simply because no thermodynamic molecular heat transfer can occur across a vacuum state. That latter disclosure thus forms the basis of claim 2 of this patent application.

Therefore, for the most part we can assume that said dwelling with the vacuum panel installed is not losing heat to the outside cold winter environment through the medium of conduction heat transfer. This presumption is also amply supported by the fact that said building envelope also has a rather large insulated building envelope with three layers each of 2" thick panels of closed cell spray foam Icynene polyurethane insulation which imparts an insulating R-Value of 46. Additionally, these three foam panels are each separated by two ¼" wide air spaces, which in and of themselves also impart insulting properties. Suffice it to say, during the winter it is theorized that this dwelling will not require heat at all. Hence, both claim 2 and claim 3 of this patent application, thus disclose a novel approach to further insure that the heating of that dwelling will not be necessary during the winter months; thereby saving rental costs.

Accordingly, how does this novel approach work in principle? In claim 3 the world at large is quite familiar with the secondary method of heating the rear window of an automobile during the freezing snowy winter days or nights. Simply turning on the dash-board button of that car activates the electrical battery charging system to deliver an electrical current through the very thin wires imbedded within the windshield. It is highly speculative that that window temperature in question now reaches 40 degrees Fahrenheit. It is also safe to say that all prior art dealing with that heating application only applied that novel approach principle to an automobile's rear window defroster.

However, it can thus be assumed in our present disclosure, that with a vacuum insulated panel installed on the exterior of this dwelling (claim 2—U.S. Pat. No. 9,771,714); coupled with the SIP super polyurethane Icynene insulation building envelope, and additionally assuming pursuant to claim 3 that a continuous 40 degree Fahrenheit temperature could be constantly present at the interior aspect of said dwelling, directly behind the building's sheetrock, then no heating equipment would be necessary at all; and the corollary benefit would be that the dwelling's lessee need not buy expensive home heating oil or gas.

Given these assumptions then, let the reader now learn how this is all being made possible. Item #157 within FIG. 17 graphically discloses two sturdy pieces of "Ram Board" which are heavy-duty protective sheets used in the construction industry to protect finished vulnerable surfaces, such as new oak flooring recently installed. Suffice it to say this material is 46 Mil thick, which is quite substantial. FIG. 17 also shows there are two such layers shown as Item #157 forming a sandwich between two layers of heavy-duty aluminum foil paper which is 0.024 mm or 0.94 Mil thick, shown as Item #158. Superimposed upon this aluminum foil paper is an array of substantially uniformly spaced primary resistance thin wiring formed as a continuous loop, undulating side-to-side or perhaps back and forth in a sinuous or wavelike pattern, shown as Item #159. The reader is now urged to review claim 3 herein which discloses that each single sheet of "Ram Board" (Item #157) in combination with each single sheet of aluminum foil paper (Item #158) are made with a multitude of tiny stamped four-sided pyramidal configurations; whereby both layers are then positioned back-to-back, such that the bases of these tiny pyramids align and mate, with the electrical resistance wiring of Item #159 traversing between these pyramids; thus heating the trapped air space formed thereby. Further, it is therein disclosed that both aluminum foil papers thus evenly conduct this 40 degree F. ° heating gradient throughout the interior aspect of this outer bearing wall envelope.

Therefore, in its normal application within the automobile industry said resistance thin wiring is spread one inch apart, yet still heats the glass sufficiently to melt the snow or ice. However, within this invention's scheme, there is the necessity to ensure that the entire surface area under consideration develops a uniform temperature gradient of 40 degrees Fahrenheit evenly distributed throughout the entire surface plane. This brings the reader to the point of measurements and dimensions. The area under discussion here is the stud to stud space in a normal wood frame building, which is 16 inches on center; measured from the middle of one 2×4 stud to the middle of the next. Item #162 is the border area for stapling this product to these aforementioned 2"×4" wooden studs. Accordingly, the area of heat generation for that resistance thin wiring would then be 14½" wide×96" high, which is an 8 foot ceiling height. Therefore, each panel shown in FIG. 17 would measure 16 inches wide×96" long. The reason for the heavy-duty Ram Board is to protect the fragile resistance thin wiring from developing a break in continuity, and to also form the tiny pyramids. The express reason for Item #161 is that the wiring is extremely fragile and cannot be soldered. It has to be glued with an adhesive substance. Some adhesives are poor conductors of electricity. Instead, this isotropic conductive adhesive shown as Item #161 is an excellent conductor of electricity. Hence, the aluminum foil of Item #158 itself also is an excellent conductor of heat and electrical current. All that remains within this novel approach to keep the interior dwelling environment comfortable during the winter months is a source of electrical power for this resistance thin wiring. Item #160 within FIG. 17 shows the wiring at the bottom of the panel leaving at the extreme bottom right hand side. In the real world this would be a wire tab either connected to a lithium battery or to a 24-volt low voltage transformer.

Herein lies the theoretical approach to this novel heating scenario. Nature loves equilibrium. In a conventionally heated dwelling; the temperature of the interior is at 70 degrees Fahrenheit while the temperature outside could be 20 degrees Fahrenheit. Since nature loves a state of equilibrium; then the hotter interior thermodynamic molecular energy naturally will flow from the dwelling's warm heated interior environment to the colder outside; thus, seeking to balance this uneven temperature state. Since this could never be achieved, then there is a constant loss of expensive heat through the building's walls. However, with this patent's novel approach, the 70 degree interior dwelling environment instead perceives a constant 40 degree wall temperature via this invention; therefore it is speculated that perhaps only electric space heaters would suffice to heat the space.

K Topographical Contour Map of the 50 Acre Site

Figure 14:
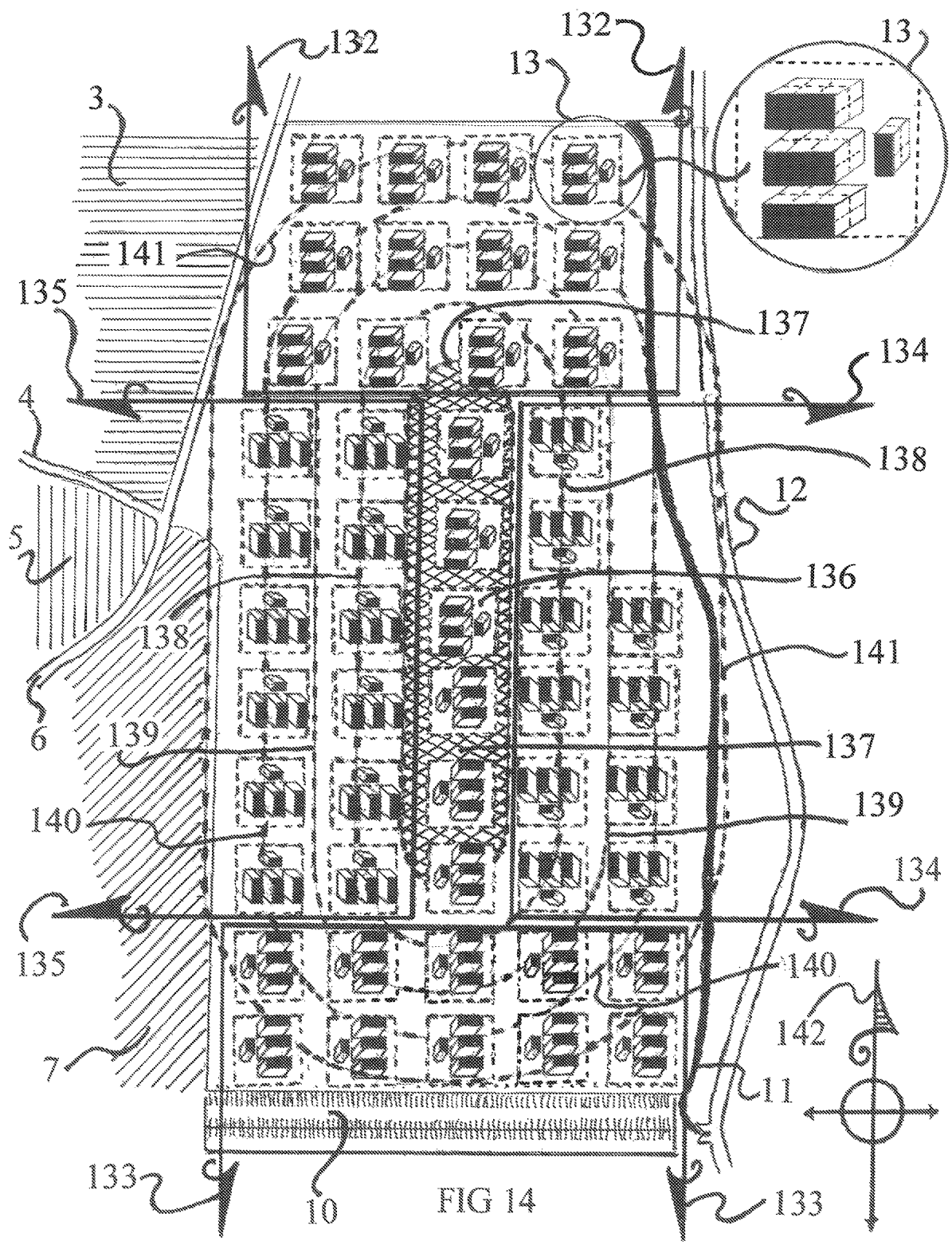

FIG. 14 becomes an explanatory note that although there are 150 main complexes; i.e. 50 of Complex "A"; 50 of Complex "B" and 50 of Complex "C" with 50 more of the smaller unit Complex "D"; these 2,000 dwelling units will not appear as unsightly box-car type army barracks. This is so, simply because this 50 acre dwelling site is essentially a rather large massive berm which measures 1,110 feet wide by 2,480 feet long; or 63 acres in total, spread out over the entirety of this berm. In sum and substance, these 2,000 units are configured according to this topographical map shown by FIG. 14. The outermost contour constitutes grade level or elevation ground zero, which is shown as Item #141. The next elevation is 40 feet higher and shown as Item #140. The reader must note that because the 50 acre site is really one large berm, each contour elevation circumscribes this residential development tract of land similar to an oval equestrian racetrack. The next highest elevation is 80 feet higher, which is shown as Item #139; whereas, the next highest elevation is at 120 feet up from ground zero, shown as Item #138. Finally, the summit of this entire berm becomes a level plateau at elevation 160 feet above grade, thus shown as Item #137. This is represented graphically by the cross-hatched area at the mid-section of this entire contour map.

Figures 15A, 15B:
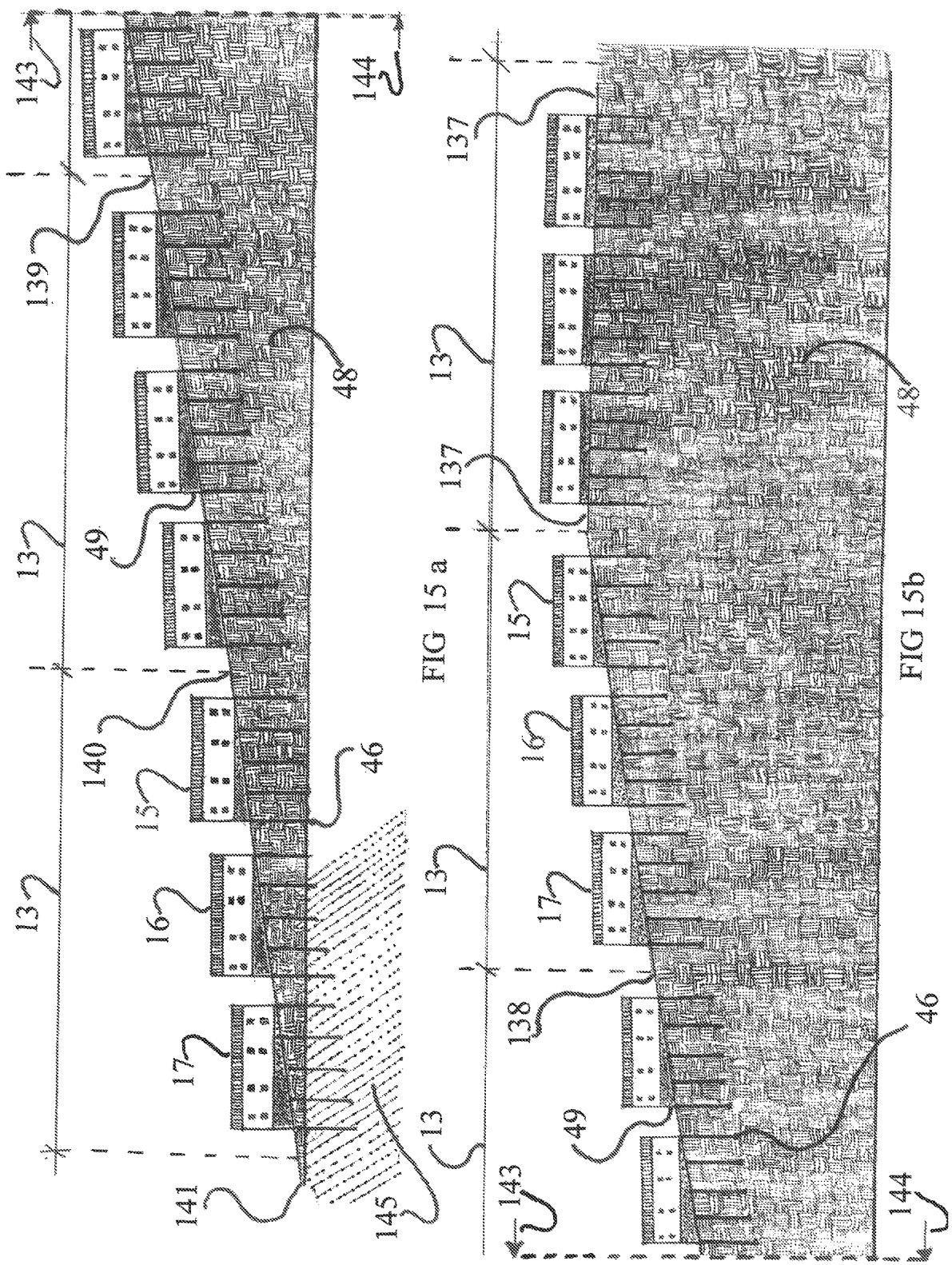

FIG. 14 also shows the different zoned developments such as Item #3 which is an RV campground. Item #4 is a dead-end residential street named Battle Row. Item #5 is a 55 year and older senior housing development. Item #6 is a dead-end commercial road named Clermont Road. Item #7 is a commercially zoned cement ready-mix facility. Item #12 is a north/south running street which fronts the site named Winding Road. Item #13 shows the typical one acre site with an enlarged version of just how Complex "A", "B", "C" and smaller "D" are situated therein. The interesting feature here is that each individual one-acre sites; viz. Item #13, are all situated differently as will soon be revealed. The arrows of Item #135 depict 12 Complexes all facing downhill and all sloping westward. Whereas the arrows of Item #134 show ten one-acre sites all facing downhill but instead facing eastward. Item #132 shows 12 one-acre sites all sloping downhill yet facing north; whereas Item #133 indicates ten one-acre sites all sloping downward and facing south. The parking lot area for the entire site is shown as Item #10. This contour map's north directional arrow is Item #142. Item #11 is the ascending internal roadway leading to the top of the summit As a further clarification, and in keeping with the aesthetic architectural and spatial arrangement of this residential 50 acre cluster dwelling site, vis-à-vis for each building placement within its respective one acre plot of land; . . . which is to say; just where Complex "A", "B" and "C" are positioned relative to their respective abutting buildings, we must now review FIG. 15. This graphic illustration depicts the profile of this massive dome-like berm which begins at ground zero elevation at level grade, as shown by Item #141. The reader can now visualize how Complex "C" shown as Item #17 sits at the lowest point or elevation within this one-acre configuration of Item #13. It also simply means that since Complex "A" or Item #15 is at the highest elevation within each one-acre site, then Complex "B" or Item #16 is midway between both "C" and "A". Logic then dictates that the differential in elevation from Item #141 (elevation zero) to Item #140, is 40 feet higher up the berm. Accordingly, each roof line ridge of each apartment building complex is approximately 13 feet higher than its abutting neighbor. This fact alone belies any notion of an army barrack appearance.

It is exceedingly informative to point out that in order to achieve this ever increasing 13 feet higher elevation for each subsequent abutting building and still maintain a level and plumb concrete foundation for each and every building; said concrete foundation must be in the triangular shape as graphically shown via Item #49. It is also informative to note that that based upon prior experience, it is theorized that 30 feet deep may be the required length for the Stelcor pile shown as Item #46; i.e. in order to achieve soil bearing capacity within the MSW refuse berm of Item #48. However, the garbage debris lying beneath Complex "C" and "B" shown as Item #17 and Item #16 are in fact shallower than 30 feet; which only means that said Stelcor pile will have to traverse undisturbed virgin soil (not garbage debris) as shown via Item #145.

Therefore, in furtherance of this graphic exposition, similarly, Item #139 is at elevation +80 feet; . . . with also the same incremental increase of 40 feet higher than that of Item #140. Likewise, Item #138 is at elevation +120 feet and also 40 feet higher. The only difference within this map profile is that Item #137 is on a level plane at elevation +160 which similarly is 40 feet higher than Item #138. However, for the entire continuity and clarification of this berm-like landfill mass; then the Item #143 (top right side of drawing) arrows must be matched along the dotted lines to coincide with Item #144 (bottom left side of drawing).

L—Environmentally Sustainable Approach to Future MSW Disposal

Under Section C—Page 41, it was indicated that MSW garbage generation went from 152 million tons in 1980 to 262 million tons in 2020, with 372 million tons expected in the year 2060. However, today, this newly generated MSW garbage disposal is now being dumped in the ocean waters instead of landfills. Read "Background Of The Invention" on Page 14; where that disclosure points to the fact that municipalities are now paying waste service providers, such as "Waste Management Inc." to haul thousands of ligated bales of MSW garbage (See FIG. 16—Item #149) to shipping barges for the dumping of this refuse at sea; thus polluting our ocean waters. Accordingly, this practice came about because the public has for years frowned upon the disposal of MSW garbage within any new landfill sites.

As a result, any newly acquired landfill site now has to undergo stringent environmental EPA excessive costs and protocol to cover and cap that new landfill surface, thereby preventing toxic leachate from percolating through this landfill garbage debris into our aquifers. Hence, the environmental impact from this new illegal ocean dumping has huge existential health implications. By and large, one of the solutions to this problem as a "method of doing business" is not only extracting financial revenue from building 20 million dollar two-bedroom apartment dwelling units on 10,000 old inactive landfill sites as disclosed under Sections "D" through "H"; but to also eliminate the practice of this illegal ocean dumping, by offering a suitable environmental approach to sustainability; and by performing in a unique and novel way; . . . which will ensure that future generations will have those precious vital water natural resources they are entitled to have.

This novel sustainable approach is graphically and fully disclosed within FIG. 16 as follows. It has previously been disclosed within this specification that the one-acre parcel shown as Item #13 measures 240 feet by 180 feet long. Therefore, Item #154 of FIG. 16 is the steel corrugated sheet-piling driven into the ground of a newly acquired landfill site; whereby that buried driven portion into the soil is graphically shown as Item #151. This penetrated demarcation line illustrated therein occurs midway between both concrete walls shown as Item #148. Said walls are 20 feet long by 12 feet high and are each spread a distance of 240 feet apart. Therefore, said sheet-piling is placed and driven at the 120-foot midway point between both concrete walls. Also buried in the ground are four steel channel troughs or raceways shown as Item #150, lined with steel ball bearings along its entire track thus laden with axel grease to reduce friction. There is also a steel plate or foot-pod bolted to the underside of Item #148 at the precise point over-lying the steel ball bearing raceway. This plate facilitates the movement of the wall.

This foregoing construction process described now makes ready the positioning and stacking of the tarpaulin heavy-duty polyethylene wrapped and ligated MSW bales of garbage shown as Item #149 and Item #48, in neat rows, one on top of the other, ready for concrete wall dense compaction. These are the bales that were destined for dumping in the ocean. In sum and substance then, the sheet piling of Item #154 thus becomes the stationary immutable anchoring wall; whereupon the mechanical or motor-driven 8-ton winch or come-along of Item #155 is connected to the moveable concrete wall of Item #148. This latter wall moves in the direction of the arrows shown by Item #152 and therefore each wall exerts tremendous pressure on the loosely packed MSW bales of garbage. Hence, prior to this exercise, and thus documented within claim 4 is the prior insertion within each Item #149 MSW garbage bale of a long large bore needle attached to a vacuum pump to withdraw the contents of air (i.e. oxygen) from within, thus making ready the next step. Subsequently, after all air is withdrawn, an aqueous solution of anaerobic bacteria and fungi is introduced within each MSW garbage bale.

For the precise reasoning behind the evacuation of air contents and insertion of anaerobic bacteria, the reader is now urged to re-visit Section "D" Page 42 above. The latter anaerobic bacteria will decompose all organic matter within the MSW garbage bales, thereby creating undesirable voids which would vitiate future soil bearing capacity for a building structure. Accordingly, those MSW bales will shrink appreciably in volume from this decomposition process somewhat; . . . while the compaction process disclosed herein will restore the requisite amount of density needed within that compacted soil. Hence, as the bales of MSW garbage reach the 12 foot high mark of Item #148, the next incremental concrete wall of item #147 is positioned on top of the bottom wall directly over the steel rebar dowels of Item #153, thus now creating a new 24 foot high concrete wall ready for additional MSW bales and further compaction. In a similar fashion, additional steel sheet-piling barriers get bolted to that pre-existing sheet-piling portion below; which is then buttressed from the on-going densely compacted MSW garbage.

The final step in completion of this compaction operation is the placement by crane of a tremendous concrete 20-ton load shown as Item #128; downward as depicted by Item #146; which is placed on top of the MSW garbage bales; thus further ensuring the desired amount of compaction density in two different directions; i.e. side-to-side; and top to bottom. As a direct result of this claim 4 herein disclosed; this foregoing business operation reaps a two-fold benefit. (1) it creates an additional revenue stream from municipalities defraying their long hauling expensive carting of MSW waste to shipping barges for ocean dumping. (2) it thus creates new additional landfill sites into the future for additional apartment dwelling complexes to be built according to the same construction process outlined in claim 1.

M—Blue-Print Business Models for Five Major Revenue Streams

First Embodiment

As the First Embodiment pursuant to claim 1 this inventor herein discloses a "method of doing business" predominantly focused upon constructing 2,000 two bedroom apartment dwelling units leased to only Covid-19 First Responders and military personnel and erected solely upon 10,000 old abandoned municipal and private landfill sites; whereby that underlying municipal entity or agency would be amenable to grant a long term ground lease arrangement for that land on said abandoned sites. Thus, the disclosure within this instant specification, both graphic and written format elaborates as to the precise construction procedure within Sections "D" through "G" above. In sum and substance, the investment funding required as seed capital, in exchange for a 49% equity stake is essentially what should be viewed herein as a secured investment. Let us now examine these ramifications involved. A project of this size would be considered a secured investment because as a Class "B" construction project (i.e. not high safety risk) a performance surety bond would cost $25,500 in order to insure completion of the project. At the end of those two years when said project is complete, a permanent mortgage can be obtained where the principal plus interest would come to ten million dollars per year.

This still garners an additional positive cash flow of another ten million dollars per year simply because the rental revenue of $800/month for each 2,000 dwelling units comes to twenty million dollars per year. This mortgage would be based upon a 20-year fixed rate amortization. The logic behind this business method as a secured investment is as follows. Upon receiving a 49% equity stake for that 153 million dollar investment infusion seed capital; the equity investor receives that surety performance bond for the exact amount of said investment in order to guarantee completion of this building project. After the two years completion, the performance bond is no longer required and instead a 20-year permanent mortgage is secured on said real property. The debt service and amortization of said permanent mortgage becomes a secured financial arrangement predicated upon the guaranteed rental income of twenty million dollars per year. Accordingly, as a safe haven for this principal investment capital in the amount of 153 million dollars, the equity partner herein would normally view U.S. Treasury bonds as a safe haven investment vehicle in order to secure a 1.44% annual return for the equivalent sum of just $2,203,000 annual yield. Fortunately, it becomes an undisputed fact that the cash flow yield from the rental income to said equity partner is instead half of ten million dollars, or in short five million dollars per year. Therefore, from day one, this business venture makes sense to any prospective investor. Moreover, focusing beyond this one isolated project and instead viewing the remainder of the 10,000 other old and abandoned landfill sites; it becomes apparent by entertaining the investment vehicle of using a public shell instead; which is a company listed on a known stock exchange; that further investment capital and funding can be obtained to simultaneously build out many other landfill sites; in fact all 10,000 landfill sites.

Purchasing a listed public shell corporation would cost in the neighborhood of 150 K to 500K; but unquestionably it would accelerate the growth of this venture; thus, enabling an equity partner to realize vast revenue from building out many landfills at the same time. This above "First Embodiment" business model template thus indicates a positive cash flow for this one lone 50 acre parcel. Whereas; a public company raising unparalleled sums of money; using several different other construction companies throughout the United States for the 10,000 other sites would unquestionably make the stock price of that shell corporation soar; just based upon that accelerated growth potential. The reader is now urged to visit Global BX Business Exchange for a partial listing of several public shell corporations for sale. It is also interesting to note that if and when all 10,000 old and abandoned landfills are completely built with on average, 2,000 apartment units yielding $800 per month rent; and after the twenty year mortgage is paid off and fully amortized, then that annual revenue becomes $200 billion dollars yearly income forever.

Second Embodiment

As this Second Embodiment pursuant to claim 2 herein, this inventor now discloses a "method of doing business" predominantly focused upon providing a retrofit application in installing vacuum insulated VIP aluminum panels for the most part, initially, to the estimated 95 million single-family homes throughout the United States. This VIP apparatus to be installed as such was invented by this same instant inventor herein under U.S. Pat. No. 9,771,714 and is somewhat disclosed on Page 58 herein, and also graphically illustrated as Item #118 FIG. 13. Strictly as a "method of doing business", these other four embodiments disclosed herein; simply from revenue generating potential, pale in comparison to this second disclosed embodiment business method. Originally, as also discussed on Page 58 herein, one of the chief benefits in using this patented apparatus was to save the expensive requirement of having to pay approximately $4,200 per year for heating oil or gas during the winter months; . . . plus an additional $1,800 per year to run air conditioning during the summer months, which totals $6,000 per year, or approximately a $500 extra undesirable monthly expense.

Briefly then, the science behind this VIP panel is simply that these 12"×12" square×1" thick aluminum panels are manufactured by creating a pure vacuum inside this aluminum canister by subsequently removing the air contents therein. It is also a well-known scientific and proven fact that thermodynamic molecular building interior heat energy from the winter heating season cannot cross a vacuum barrier. Hence, installing these patented VIP exterior panels for this project will achieve what is known in pure patent language as "proof of concept." This concept simply put, means the invention achieves what it claims it does. Next, the reader is now encouraged to view the following financial impact set forth herein from strictly the sheer mercantile common sense in achieving unparalleled financial revenue and vast market capitalization from claim 2 herein.

This financial probative analysis is best begun by first examining the total market potential for a projected and verifiable customer base. Thus, according to the American Housing Survey, as quoted by Quora on the internet, and also the U.S. Census Bureau estimates, there are approximately 95 million single family homes throughout the United States. The next important statistic is that according to the NOAA—"National Climate Data Center", during the winter months, every state in the U.S. requires a home to be heated; because even in the southern belt (latitude 35°-30°) that geographic area experiences an average temperature of between 45°-50° F., which would be somewhat uncomfortable in the interior of the dwelling during the winter months. Quite the reverse situation exists for Florida and Hawaii; which instead indicates that because of the torrid sweltering temperature there year-round, then these VIP panels understandably will be necessary all over the USA, first just to abate air conditioning costs all year with the latter; and second, heating costs during winter for the former. Therefore, as a quick financial review; the reader has to re-visit the cost or expenditure for either heating or cooling, or both; . . . for an average single family home. As mentioned earlier, that yearly expense is on average $6,000 (a rather important statistic)

Hence, from the standpoint of marketing/sale dynamics, this $6,000 undesirable expenditure for any single-family homeowner becomes a key ingredient within this financial analysis of a "method of doing business". To begin with it automatically creates a pressing sales need within this known 95 million single-family home owner customer base. More importantly, there is no similar product on the market, therefore no competition; simply because patent law protects this inventor for 17 years from competition. Furthermore, the highest R-value according to the prestigious American Society for Testing and Materials (ASTM) of Icynene spray foam polyurethane insulation is R-46; therefore it would behoove this inventor herein to have this VIP vacuum insulation panel tested with the ASTM to determine its specific R-value. Let's then assume and conjecture that because we are in fact dealing with a pure vacuum state, that the R-value would prove to be in fact R-500. This fact alone would muster sufficient showing to make an application to all 50 state courts within the USA as a specific legal cause of action to compel each state in the union to change their own state energy code; thereby creating law which would mandate the necessity for a planned and systematic nation-wide approach to institute the following sales marketing strategy for retrofitting all 95 million single family homes throughout the entire USA with said VIP vacuum panels. This foregoing discussion alone constitutes the rationale of the scientific background underlying this "method of doing business" for this second embodiment.

The reader is now urged to focus on the economic reality of just how feasible and economically practical this second embodiment is to implement. To begin with, it is noteworthy to point out that prior to any implementation; necessary tooling and dies have to rust be made in order to begin the manufacturing process of these VIP panels. That upfront cost could be approximately $40,000 initially. Next, let's examine all the costs associated with this business plan implementation. By and large, the average single family home attributable to construction technology is typically a two-story structure which measures 50 feet long by 26 feet wide; or 1,300 SF footprint. Since these VIP vacuum panels are one square foot in size; then the building envelope's total square footage yields 2,736 SF for the four sides (i.e. 152' perimeter×18' height); plus 1,300 SF to cover the ceiling plane. This above 4,036 SF coverage, totally wraps the entire house in an effective vacuum thermally protected barrier; thus, preventing expensive winter-time heat loss.

A cursory investigation involving the cost of aluminum material per pound for this VIP panel; plus, the internal plastic and rubber components; combined with the mass production process reveals upon close examination and belief, that the cost per VIP panel is approximately $2.00 (two dollars) for each VIP panel piece. Multiplying 4,036 SF times $2.00 yields $8,072 cost of goods sold. The inventor herein has over thirty-five years in the construction industry and estimates that the labor involved in careful removal of the existing exterior cladding for these 95 million single family homes; plus the labor to retro-fit the new VIP panels; plus the re-installation of the original carefully removed exterior cladding would necessarily involve three men for three days, or the equivalent of $1,800 for labor. Let's now assume another $128 miscellaneous supplies, we then round out a cost for labor and materials as $10,000.

Further, as a "method of doing business" it is perfectly acceptable to implement a specific target price fee of $15, 000 profit for each retro-fit installation. We are now at $25,000 for material, labor and profit. Add to this $25,000 latter figure another $5,000 for administrative expenses and project management; plus another $5,000 for the exterior Den-glas and other miscellaneous materials necessary to complete installation. Therefore, we are now at $35,000 to complete this valuable retro-fit VIP panel installation. It is now quite feasible to appreciate; that the federal government or each state government would subsequently offer any financial funding institution a guaranteed loan payment backing, similar to a federally backed student loan guarantee. It is also necessary at this point to factor in the $15,000 interest/loan debt service charge necessary for any financial institution to offer every single-family homeowner this loan to buy this $35,000 principal purchase, plus the $15,000 interest charge; which when combined totals $50,000.

The reader must now re-visit the end of the third paragraph herein which stated that the $6,000 yearly expenditure by the homeowner to both heat and cool their house was a "rather important statistic." The reason this is so is that if we consider the $35,000 purchase price for the VIP retro-fit; plus the $15,000 interest charge as a combined $50,000 homeowner indebtedness; then on an eight year installment credit obligation, this typical homeowner is still only paying their usual $6,000 normal heating cost per year to pay-off that loan in just eight years. Therefore, after day one of this VIP panel retro-fit installation, the homeowner suffers no inconvenience whatsoever, and eight years later, after said loan is completely paid-off, puts $6,000 per year in their pocket. Additionally, it was indicated within the first paragraph above that the other four embodiments "pale in comparison" to this claim 2 herein. Let's see why! Our foregoing economic analysis above offers two broad categories of rather important numbers which total to $50,000. One is the pure cost of VIP panel installation, comprised of material, labor, administrative costs and interest cost; or $35,000, while the other remaining ingredient is the quintessential, $15,000 pure profit. This latter financial gain is what makes the other four embodiments "pale in comparison". Herein lies the stark financial reality. For 17 years; there can be no competition, simply because this is a protected patent. For 17 years; there is an identifiable and known sales customer base in need of this product; notwithstanding any sought after change in each 50 state's energy code. For 17 years; $15,000 profit multiplied by 95 million single family homes yields, 1.42 trillion dollars in total revenue. Hence, viewed from a different perspective, for 17 years; each and every day including Sundays, there will be 15,522 new additional VIP panel retro-fit jobs from that 95 million single-family home base; which when multiplied by $15,000 for each job, yields a grand total of $232,830,000 million dollars each day. What makes this further astounding is the fact that this inventor has world-wide patent rights to U.S. Pat. No. 9,771,714, this VIP panel disclosed herein; which means that there are more than 95 million single-family homes besides the U.S.A. world-wide.

Third Embodiment

Within this "Third Embodiment" pursuant to claim 3 herein, this inventor now discloses a "method of doing business", predominantly focused upon two separate and distinct business models. Upon careful investigation it is now theorized that under the first of these two business models, the Provisional Patent Application No. 63/073,658, filed by this inventor dated Sep. 2, 2020, and disclosed herein as FIG. 17 would cost approximately $18 per panel. Accordingly, and pursuant to the measurements of this 1,020 SF typical two-bedroom apartment dwelling unit shown as FIG. 3 herein, which measures, 34 feet×30 feet; then 98 such panels would be needed to be installed therein for the sum of $1,764. As also disclosed earlier herein, the pre-dominant reason underlying this FIG. 17 installation is primarily to gain assurance that if the interior aspect of the perimeter walls are under a constant low voltage heating barrier of perhaps 40° F. similar to an automobile rear window defroster; then it would lend credence to the belief that no interior heating equipment would be necessary to warm this apartment. This belief is buttressed by the fact that the VIP vacuum panel of Item #118, installed at the exterior aspect of the apartment's perimeter outer walls; plus the entire interior ceiling plane would provide an effective vacuum barrier; thus obviating the requirement for heating equipment. This belief is also being supported by the fact that these perimeter outer walls also are comprised of three 2" thick Iynene polyurethane closed cell foam insulation boards which also contain therein two ¼" air spaces as well. Hence, even if the outside temperature is 20° F., then perhaps only two 4,000 watt 220 volt electric space heaters with thermostats would be needed as ample coverage for 800 square feet of space.

Hence, in lieu of a normal landlord/tenant rental lease agreement for this two bedroom apartment; which would normally require two months security deposit, with a return proviso at the expiration of said lease; . . . then instead, this inventor/landlord would require said up-front installation cost payment of $1,764 to defray the cost of that 98 electric wall panel installation. This first business model thus presents a win-win situation because the landlord/inventor will have VIP vacuum panels; in addition to the 6-inch—three layer polyurethane closed cell insulation; plus now the addition of these claim 3 electric wall panels. In short, heating equipment; except for the two 4,000 watt electric space heaters would not be needed.

With regard to the second business model for this "Third Embodiment"; however, more specifically as it relates to only new construction (not the existing 95 million single-family homes); then should this electric wall panel disclosed under FIG. 17 herein prove very effective, then in conjunction with this inventor's exterior VIP vacuum panel, shown as Item #118, plus the interior Icynene closed cell spray foam polyurethane insulation; . . . accordingly, a new home customer might be willing to pay for this added assurance. It is now prudent to make some estimated projections as to the potential revenue for this second business model. It is reasonable to assume that a typical new single-family home measures 50 feet long by 26 feet wide, or 1,300 SF for first floor, and 1,300 SF for second floor. These measurements reveal that 228 electric wall panels are needed at $18 apiece for a total of $4,104. Now it is also perfectly reasonable to assume that a new home buyer would be willing to spend just once, double that latter figure, or $8,208 after realizing that he is saving $6,200 per year for heating and cooling. Therefore, according to the National Association of Home Builders (NAHB) there are approximately 1 million new single-family homes being built each year in the United States. Doing this math reveals that 1 million homes times $8,208 comes to 8.2 billion dollars in revenue each year for this second business model of this "Third Embodiment".

Fourth Embodiment

As this Fourth Embodiment pursuant to claim 4 herein, this inventor now discloses a "method of doing business" predominantly focused upon a "leveraged buy-out" whereby the purchasing power inherent in the materials buyout for this construction project thereby becomes the financial catalyst in acquiring a desirable and necessary retail building supply acquisition. The reader is now urged to re-visit Section I—Page 52, to view "Construction Break-Down" which clearly indicates that the sum total cost of construction for just one acre out of the 50 total sites comes to $3,058,542, or simply 153 million for the entire project. It thus becomes a foregone conclusion, that each construction trade estimate therein involves both material and labor for completion. It also is a rough rule of thumb that material and labor in construction are usually in a 50%-50% ratio. Therefore, it is safe to say that the costs of materials alone for this entire 50 acre project comes to $76,500,000 million dollars. This latter figure relates to the mandatory portion of "hard costs" for this construction project. We can now also theorize that any construction supply retail business entity, like a typical "Home Depot", pays 60% of that total to their wholesale vendors; thus, charging the general contractor an additional 40% mark-up for its retail selling price. What then would this business scenario look like if the owner/general contractor; or more appropriately, the inventor herein of this "business method" suddenly acquired its own retail building supply depot, and instead saved that 40% mark-up for a handsome additional revenue stream of $30,600,000 for this one project alone????? (that is 40% of the $76,500,000 cost for materials)

Accordingly, it is a fact that this theoretical business model does in fact exist in the real world as a roadmap for additional success. For the sake of keeping the true identity of this particular potential "leveraged buy-out" construction retailer anonymous, the reader is now being urged to consider these following facts, bearing in mind that they relate to a real-time true existing business entity just ripe for acquisition. How in fact does a "leveraged buy-out" work within this business model. A "leveraged buy-out" (LBO) would be the acquisition of this potential building supply chain using a significant amount of borrowed money (i.e. bonds or loans) to meet the cost of said acquisition. The assets; e.g. the building supply inventory of that company would necessarily be used as collateral for that loan, along with the positive cash flow being generated from this "business method" venture under First Embodiment herein; which is projected to be 10 million dollars rent revenue annually. The express purpose then of this LBO or "leveraged buy-out" is to allow the inventor herein to acquire a large significant acquisition without having to commit a lot of capital. Thus, this projected LBO business model calls for a ratio of 90% debt to 10% equity. Let the reader now investigate that the positive operating cash flow from the rental revenue stream of 10 million dollars annually herein, (See First Embodiment) will be sufficient to meet all debt service requirements. Hence, herein for "business model" analytical purposes, is the hard core real-time financial data for justification of this "leveraged buy-out".

At present, this particular LBO company has 18 retail building supply outlets throughout the northeast region of the U.S. with sales revenue of between $100-$500 million. However, for purposes of this analysis let us assume a median range of $250 million dollars in sales. Another important financial statistic is the number of employees, pegged at 100-500; . . . once again, let us assume a median range of 250 employees. At a safe assumption of $50,000 average annual salary for essentially mostly sales clerks, let us arrive at a cost of $12,500,000 dollars in annual salary expenditures for these 250 employees. Next, we can extrapolate that with average annual revenue of $250 million dollars and the usual profit from that sales revenue of 40%; then we should expect to see $100 million dollars earnings before deducting costs. Now, if the cost of wages is 12.5 million; then let us assume another 12.5 million in operating costs; like rent etc. This yields 75 million net "earnings" per year (i.e. 100 Mil-25 Mil). The usual and customary rule of thumb for an acquisition price is eight times "earnings"; or around $600 million dollars. Let us now conjecture that this family owned business will sell the entire company for a half a billion dollars or $500 million.

Hence, a quick review back to the 90% debt vs. 10% equity on a half billion dollar purchase thus yields 50 million dollars in cash required; which could prove problematical given a lack of cash flow from this 2,000 unit apartment project before its completion. Let us instead assume then, there is an angel investor waiting in the wings with this down payment sum. Subsequently, this scenario would then require a 90% debt load of 450 million dollars. While a secured loan of 250 million dollars could be justified with bank financing using the building supply chain's inventory as collateral; . . . this then would leave 200 million in long term notes or bonds at a significant interest rate. The good news is that the purchase of this LBO building supply chain unquestionably yields 75 million dollars in annual earnings from its own operating revenue; . . . plus an additional 30.6 million dollars savings from the necessary purchasing power of building materials for this patent's project under claim 1 herein. In sum and substance, then, this business acquisition will realistically generate $105.6 million dollars (75 Mil+ 30.6 Mil) in earnings from the building supply chain revenue, plus $10 million net cash flow from the rental income of this 2,000 unit apartment community after this project is built. In short, there is no problem paying back the $50 million dollar angel investor. Perhaps, another realistic outcome from this foregoing business model is that as the other landfill sites get built, additional building supply retail depots can be opened; whereby the debt service from this LBO acquisition remains the same; while additional sales revenue will accrue.

It is quite important within this embodiment to offer the following financially relevant statistics as a harbinger or springboard to increased future market capitalization. The small real-time 18 retail LBO chain used for this embodiment does 13 million dollars annually per store (i.e. 250 million divided by 18). Which by and large, should be considered a rather small Home Depot. However, this latter Home Depot New York Stock Exchange listed giant has 2,285 retail outlets throughout the U.S. and does 110 billion dollars in annual sales revenue; or more appropriately 48 million dollars per store. Therefore, as a fourth embodiment herein, if these 10,000 old abandoned landfill sites could eventually be built; and the material purchases required be instead funneled to this LBO, by opening 2,285 retail outlets in the same geographic areas as Home Depot; then accordingly, 2,285 additional LBO building supply retail outlets multiplied by 13 million dollars per store annually becomes a staggering 30 billion dollar revenue new business per year; which justifies this LBO building material supply acquisition retail purchase.

Fifth Embodiment

Within this "Fifth Embodiment" pursuant to claim 5 herein, this inventor now discloses a "method of doing business" predominantly focused upon providing new environmentally safe additional landfill sites into perpetuity, which simply put, means that a certain predictable cash flow of revenue will continue into the long-term future without an end in sight; due to the mere fact that MSW garbage disposal will never end. For the reader to gain meaningful insight into this projected cash flow revenue, it is necessary to first begin with the specification—Section "C"—Page 41; wherein it was disclosed that in 1980, . . . 152 million tons of MSW garbage was disposed of. While in the year 2020, . . . 262 million tons of MSW garbage were disposed of. Accordingly, it was therein also projected that by the year 2060, there will eventually be 372 million tons of MSW garbage over this future 40 year period. Next, we can extrapolate from this foregoing data that every year during that 80 year period; . . . a total of 2.75 million tons of MSW garbage was eventually disposed of. However, before we begin our discussion of the economic factors pertaining to this business model, the reader must now gain an understanding of this different construction methodology being implemented herein to achieve bearing capacity of the underlying MSW garbage soil debris in order to construct similar apartment dwelling units as per claim 1 and the First Embodiment disclosed above herein.

The reader must now refer back to FIG. 16 in order to gain further insight into a novel and more reliable garbage compaction procedure which will prevent undesirable differential settlement of the underlying MSW garbage soil debris. Therefore, from a careful reading of the specification section underlying FIG. 16, we learn that the two concrete walls, shown as Item #148 are separated by a distance of 240 feet, constituting the longer measurement of Item #13, which is the typical one-acre parcel. That 240 foot distance is then divided in half by the driven-in-place corrugated steel sheet piling shown as Item #154. It is now rather important to investigate the dynamics relevant to a typical MSW bale of garbage debris shown therein as Item #48. It is a known fact that most municipalities hire MSW service providers such as Waste Management Inc. which business entity provides garbage trucks to first pick-up neighborhood garbage and then haul same to transfer stations; which then compact and loosely bundle or bale said garbage debris into rectangular bales measuring 3'×3'×6' and weigh 2 tons each.

These bales are primarily covered with strong, flexible, water-resistant or waterproof material, often cloth, such as canvas or polyester; then coated with polyurethane, or perhaps made of plastic such as polyurethane. These MSW garbage bales according to this business method, instead of being hauled by flat-bed truck to shipping barges; and subsequently dumped into the ocean; . . . would instead be brought to this new landfill deposition site, which is a specially designed compacting facility pursuant to FIG. 16; . . . with the end goal eventually of erecting a 2,000 unit apartment housing complex thereupon as per First Embodiment. Further, as depicted within FIG. 16, these MSW garbage bales are then arranged in an orderly fashion; each side by side; then also stacked one atop of the other into neat files and rows as shown graphically therein. Next each concrete wall is then made to move in the direction of the arrows shown as Item #152; thereby compressing these bales into the restraining barrier of the corrugated steel sheet-piling shown as Item #154. This compression operation is accomplished via an 8 Ton come-a-long or electric winch shown as FIG. 16*a*. Next, a 20 Ton concrete slab shown as Item #128 is placed upon both stacked areas, which further compresses the bales in a downward direction shown as Item #146.

More to the point, when the facilities manager at this site deems the MSW garbage bales as sufficiently compacted, both side-to-side and downward; then the steel ball-bearing underground track of Item #150 is removed from under the concrete wall, and instead corrugated steel sheet piling is snugly driven downward between the inner aspect of said concrete wall and the compressed MSW garbage filled stacked bales; thus leaving only an attachment section for the next adjoining piece of sheet-piling to be both welded and bolted to the piece below. Soon afterward, the next adjoining section of concrete walls, shown as Item #147 are placed on top of Item #148 securing both walls to each other using the steel dowels of Item #153. Thereafter, when the entire top aspect of the lowest section of MSW garbage bales are thus level with the connection joint of both concrete walls, i.e. Item #148 and Item #147; then steel cable formed as "X" shaped diagonal bracing, shown as Item #166 FIGS. 18 *b*. c, d, is then bolted from one sheet piling wall to the middle sheet piling wall; . . . while that same operation is also performed for the other half sheet-piling wall section.

This steel cable "X" bracing is inserted along the entire length of the sheet piling and subsequently tightened by creating tremendous tension in said cable using a turn buckle. After both half sections are adequately tightened and braced with said steel "X" cables, then steel rebar dowels are bolted through the sheet piling, shown as Item #164—FIGS. 18 *b, c, d*, thus leaving a stub-up section protruding into the MSW garbage bale space about 12" in height. Additionally, several steel bearing shelf brackets shown as Item #165— FIGS. 18 *b, c, d*, are welded at various points onto the sheet-piling to eventually support a concrete slab. Next, sand is placed over the bales and compacted as a level surface plane. Afterwards, a reinforced welded wire mesh with 8"×8" squares is placed over the sand slightly elevated with rocks. Soon a 4" thick concrete slab of Item #163 is poured over the level sand bed with the wire mesh embedded and the 12" protruding rebars dowels embedded into the concrete slab, which dowels were welded to the sheet-piling. Said concrete slab shown as Item #163—FIGS. 18 *b, c, d*, is also made to rest upon the several steel bearing shelf brackets; shown as Item #165—FIGS. 18 *b, c, d.*

Item #167 of FIG. 18 shows a typical structurally reinforced encapsulated closed compartment which measures 240 feet wide by 180 feet long by 30 feet high, which is enclosed on both left and right sides with steel corrugated sheet piling shown as Item #154, It then becomes obvious from FIGS. 16 and 18 that in between both steel walls of said sheet-piling are the densely stacked and compacted MSW bales of garbage debris shown as Item #48 and Item #149. It is also graphically shown therein that this structurally reinforced enclosed compartment of Item #167 has a reinforced concrete slab as a top diaphragm and also a reinforced concrete slab as a bottom diaphragm both shown as Item #163; with diagonal "X" shaped steel cable bracing as Item #166 traversing from one corrugated steel sheet piling wall to the other corrugated steel sheet piling wall. It also becomes graphically clear that there are twelve such enclosed structural compartments shown as Item #167. What also becomes apparent graphically is that these twelve packed solid with internal MSW garbage bales, constructed as structurally reinforced closed compartments, in unison; form a pyramidal base upon which, subsequently, is deposited engineered controlled sandy fill tampered in sequential lifts, such that ultimately no Stelcor piles such as Item #46 need to be driven. Instead, the concrete footing of Item #47, and the concrete foundation of Item #49 are laid to rest within a normal typical construction excavation. The end result of all this foregoing construction procedure is that there should no longer be any concern as to the bearing capacity of the underlying soil in order to construct and erect the First Embodiment thereupon.

In order to analyze this Fifth Embodiment as a viable "method of doing business" the following business-related factors must be evaluated. In sum and substance then, . . . what will this new land acquisition cost? Also, what will the compacting infrastructure or basic underlying construction essentials cost? More importantly, what is the expected annual revenue? In short, does the expected revenue stream justify the costs? Hence, detailed probing into these costs uncovers two main components. The concrete slabs shown as Item #163 cost $91,872,000. While the corrugated sheet-piling of Item #154 costs $36,892,800. These combined costs amount to $128,764,800. However, it is a proven fact that most local municipalities pay an average sum of $43 per ton to an MSW garbage service provider, similar to Waste Management Inc. to handle the disposal of the garbage bales shown as Item #149. Further analysis into this potential revenue stream centers around the sheer fact that each MSW garbage bale of Item #149 which measures 3 feet×3 feet×6 feet weighs on average 2 tons per bale.

It also has previously been discussed on page 78 herein that these structurally reinforced closed compartments which each measure 240 feet wide×180 feet long×30 feet high shown as Item #167 contain exactly 24,000 MSW bales of garbage, which understandably interpolates into 48,000 tons (2 tons per bale) at $43 per ton; yielding a sum total revenue stream of $262,128,000. Therefore, the net revenue of profit after subtracting those aforementioned costs is thus $133,363,200 for each new landfill acquisition site purchased. Of course, the reader has to now factor in the land acquisition cost. Upon information and belief, the source being the well known commercial realtor; CBRE; they have surveyed 10 U.S. markets and determined that the average price for large industrial parcels (i.e. 50 to 100 acres) now sells at more than $100,000 per acre. This simply means that the acquisition cost for this typical newly purchased compacting landfill site will be approximately 5 million dollars.

However, after the entire new landfill site is completely compacted, then controlled engineered fill is deposited on the top most reinforced layers of concrete, shown as Item #163; which logically now reverts to the First Embodiment herein, then this Fifth Embodiment immediately becomes ripe as a continued revenue stream for another 20 million dollars rental revenue pursuant to that 2,000 rental apartment dwelling development at $800 per month rent. In summary, the reader can now recognize that this Fifth Embodiment; aside from generating its own one time revenue stream of $133,363,200 million dollars per new landfill site, will now generate annually 20 million dollars in rental revenue from the complete build-out of a new 2,000 apartment housing complex as outlined similar to the First Embodiment. Therefore, since MSW garbage disposal will never cease; then this 20 million dollar revenue stream can perpetuate indefinitely into the future without ever ending. In other words, when the 10,000 old abandoned landfill sites as discussed within the First Embodiment are completely built; we can rely on this Fifth Embodiment as a business model for a renewed perpetual source of new landfill sites well on into the future.

I claim the following:

1. A method for developing residential housing on old abandoned landfill garbage sites presented as one gigantic mountainous sloped berm comprising a plurality of acreage and comprising, in combination, the following steps of:
   (1)—utilizing a specified sized diameter steel core shaft with spiral descending helical aligned flights welded to said steel core and also having a specialized displacement head located at its very tip, which in its rotating downward descent into said berm thus creates via that latter displacement feature, an annulus or void within said refuse matter, thereby creating the opportunity to infuse and introduce at the very top of said shaft cementitious grout mixture consisting of water, portland cement, sand and fine aggregate particles which then culminates into a pre-determined and calculated circumference, which by virtue of these aforementioned features thus creates a screw shaped helical and spiral grout column which then rests upon this newly adapted and densely compacted immediate environment of refuse, said shaft being driven by a rotary hydraulic head affixed to an excavator and driven to a pre-determined length, which depth has been previously pre-calculated to achieve soil bearing capacity within said landfill material in order to accommodate building structural loads; . . .

(2) subsequently securing to the extreme proximal portion of this aforementioned steel shaft, a locking plate, which then becomes affixed to a geometric shaped spread concrete platform type footing formed out of sand, water, portland cement and coarse aggregates, and conveniently shaped to contain a slotted mortise in addition to also containing steel rebars as securing dowels or tenons, which then become positioned in a vertical orientation perpendicular to said platform;

(3) placing atop of this latter geometric shaped spread concrete platform another geometric type concrete wall, which comes into existence after being formed as such via conventional concrete formwork, such that an identical mixture of sand, water, portland cement and coarse aggregates are then mixed together into a slurry, whereby this semi-fluid mixture occupies and hardens within said concrete formwork and then occupies the mortise shape and adheres to the tenons or rebar and also the anchor bolts which secure the sill plate which assumes the shape of an inverted or upside down letter "tee", which combination as such thus becomes a locked and secured monolithic sturdy concrete substructure;

(4) positioning atop of this concrete formed wall a pressure treated creosoted wooden substrate called a sill plate, which then becomes the main means for attachment and securing at the bottom aspect of this building's exterior wall envelope a structural insulated panel, which consists of two substantially thick "cdx" exterior grade plywood panels, which sandwich together a plurality of sprayed foam "icynene" polyurethane panels manufactured with blowing agents as gases used to expand tightly those closed cells therein, thus resulting in superior insulating properties, and also in combination with a plurality of built-in air spaces uniquely formed with plastic separating spacers;

(5) securing said underlying structural concrete substrate within step 2 herein, via the first floor plane, and comprised of the following structural elements which will contribute to the bearing capacity of the soil by incorporating a built-in concrete bearing shelf within said foundation wall, upon which rests a plurality of hollow core concrete planks which has incorporated within the plurality of its inherent hollow voids therein and within which are positioned a plurality of cylindrical cardboard concrete filled sonotubes into which sufficiently sized thick steel rebar dowels are inserted after passing through the pre-drilled precisely templated and aligned holes within said foundation wall, whereby all of these above structural elements acting in concerted unison together resist any possible differential settlement of the underlying garbage soil, which aforementioned monolithic structural concrete unison becomes aided and abetted by the post-tensioned steel cables embedded within the lower inferior portion of this concrete hollow core plank, after which said aforementioned concrete foundation wall has bolted thereupon a geometric configured axial steel column, which is positioned vertically upright and perpendicular to this horizontal concrete foundation wall plane at calculated and predetermined periodic intervals along said concrete wall;

(6) welding onto the shorter upper aspect of this axial structural steel column a load bearing right angled steel supporting bracket, thus positioned and aligned as a structural bearing shelf upon which rests a geometric shaped structural steel tube, whereby the latter then traverses the entire second floor length of the building structure at each extreme exterior long side thereof, such that at calculated and repetitively, reoccurring intervals, there are installed in an upright rectilinear orientation a plurality of wooden floor joists cut and fabricated with a certain pre-calculated cross-sectional geometric property known as its section modulus, thus coming to rest upon this steel structural tube at each terminal exterior end on the longer side of each apartment dwelling; yet only on the second floor, from which the shorter side's perpendicular mid-span measurement is broken or interrupted in half by incorporating the following structural elements such that there is located at this mid-span on both the first and second floors, directly one over each other, a wooden stud wall partition which is common to both bedrooms on each floor shown and also incorporating along its continuation, a dropped triple wood engineered laminated veneer lumber glulam girder attached at the end of that latter common wall, and thus traversing in the same axial plane to the complete opposite end, which in effect both aforementioned structural elements thus continue in one straight continuous line, thereby effectuating a continuous mid-span structural support for those overhead floor joists, whereupon superimposed above said wooden floor joists are glued and nailed into these latter beams a structural floor plane diaphragm consisting of tongue and groove plywood veneered panels, which when assembled together, side by side and end to end, thus form a rigid and firm walking platform suitable for residential living;

(7) proceeding from said aforementioned concrete foundation wall below grade and positioned vertically upright from this latter wall as indicated within step 5 are bolted thereupon a plurality of geometrically configured axial steel columns situated at calculated and pre-determined periodic intervals along said wall, whereby subsequently this entire plurality of substrate axial column elements become ready to receive the next structural supporting element affixed thereupon by welding onto the shorter upper aspect of these columns, which welding operation then receives a load bearing right angled steel supporting bracket identified as item #85, thus positioned and aligned as a structural bearing shelf upon which rests a geometric shaped structural steel tube, whereby the latter then traverses the entire second floor length of the building structure at each extreme exterior short side thereof, such that at calculated and repetitively reoccurring intervals, there are installed in an upright rectilinear orientation a plurality of wooden triangular shaped trusses, whereby each two main members are produced and manufactured with a certain pre-calculated cross-sectional geometric property known as their section modulus, and where the lower chord comes to rest upon this steel structural tube at each terminal exterior end on the shorter side of each apartment dwelling; yet only on the extreme upper portion of the second floor said trusses thus comprising of a lower chord component consisting of two glued together wood laminated veneer lumber members, whereby the ratio of depth to width is 3:1 and which member is acting as a tension force in consort with this tripartite triangular structural arrangement from which also an upper chord component is also comprised of two glued together wood laminated veneer lumber members, and whereby the ratio of depth to width is also 3:1 whereby all three aforementioned triangular components, i.e. the lower chord, the upper chord and the king post together form a complete right triangle in which the intermediate web supporting elements resisting the roof compression loads are either exactly oriented in a vertical perpendicular position to the upper and lower chord, or else are diagonally oriented and braced between those main components, of which all those intermediate web panel point struts and are braced via steel gusset plates;

(8) procuring two glue laminated veneer thick plywood structural panels thus being utilized as the outermost sandwich layers comprising the two extreme exterior sheets of this structural panel composition which contains a plurality of closed-cell spray foam insulation polyurethane icynene firm boards, each one being separated by small tiny plastic spacers which are interspersed throughout the entire surface thereof, thereby creating a plurality of thin shallow insulating medium of air spaces, whereupon these structural insulating composition panels are then secured at the bottom of that pressure treated sill plate as well as being secured at each and every vertical axial column interface on all four building sides via the attached lateral connection wooden upright posts and subsequently repeating the complete cladding of the structural upper chords, whereby a similar wooden ground connection is attached to said upper chords in order to secure the structural insulated panels to the roof structure; and (9) completing the outermost cladding of the building envelope by subsequently requiring the mating of two similar right triangular roof trusses together in a back to back fashion, such that the king post of an identical right triangular roof truss composition gets mated and secured to another identical right triangular roof truss composition, whereupon in this configuration, the pinnacle or apex of both aforementioned king posts together effectively becomes the highest point of the building's roof, synonymous with the roof ridge of a typical building, while the lowest roof points of these mated right triangular roof trusses are at the polar extreme opposite ends from one another, subsequently, another intermediate smaller triangular roof section becomes affixed at a lower midpoint of said latter higher ridge and positioned, exactly perpendicular to it as a reverse gable which in essence traverses and fills that entire valley space created by the confluence of two similar adjoining roof slopes, whereupon in doing so, in turn said intermediate reverse gable lower roof, in its complete occupation of that created valley, will as a result shed rain water systematically in a diagonally downward sloping direction from the highest roof ridge to the final lowest creation of a triangular cricket which finally diverts and channels any possible stagnant or trapped water in a downward last and final stage, thereby sloping away from that lowest valley created by the confluence of two adjoining roof slopes, whereupon all of this aforementioned diagonally downward progression of rainwater from the highest point of the building's roof, to the next lower reverse gable and subsequently thereafter to the final reverse cricket thus channels every drop of rainwater into a tributary system of horizontal rain gutters and thereafter into a plurality of rainwater downspouts or leaders into storm water piping, and covering this entire system of roof structures, from the highest ridge peak to the lowest nadir of roofing in a composition of several impervious waterproofed layers of asphalt tar paper and asphalt roof shingles, whereas all four exterior sides of said building structures are subsequently clad first with asphalt tar paper then wooden clapboard exterior siding, thereby completely enclosing and making waterproof, the entire building envelope as protection against the environmental elements.

2. A method for the express purpose of acquiring a new landfill site which generates revenue as a result of municipalities paying a service fee to dispose of their municipal solid waste refuse therein, whereupon after becoming full to capacity, said new landfill site immediately thereafter converts from said full to capacity waste storage facility into the revenue stream disclosed within claim 1 herein via the erection of new multi-unit two bedroom dwellings being constructed thereupon further involving a vast multiplicity of compact ligated bales of municipal solid waste refuse possessing distinct measurements and weight and orderly arranged within said new landfill site, further comprising:

(1) driving and installing at the midpoint of certain discrete calculated and measured distances therein, a plurality of steel corrugated sheet-piling which is driven into the earth underlying said midpoint thereby acting as a secure restraint for additional sheet-piling sections to be attached and subsequently added above that initial sheet-piling immutable wall, whereupon two massive concrete reinforced walls flank laterally said corrugated steel midline sheet-piling wall, thus being positioned parallel to said latter sheet-piling wall, which concrete walls are then made to move parallel toward said immutable sheet-piling wall in calculated incrementally measured stages, which movement is thus being made possible via the ball bearing tracks positioned exactly perpendicular to both sheet-piling and concrete walls and which lie beneath the same and are buried as longitudinal tracks to effectuate said lateral movement, whereby between both sides of each moveable bay comprising a concrete wall and corrugated sheetpiling are deposited a multitudinous amount of ligated tarpaulin covered bales of municipal solid waste bundles neatly and orderly deposited in side-by-side rows and also stacked one atop the other as horizontal rank and vertical file bales until which time said orderly bale stacking completely occupies and fills the entirety of space between the length and height of the dimensions of each concrete wall and corrugated sheet-piling whereupon a mechanical or electrical winch is employed to impart a considerable pressure bearing force, thus compacting said garbage bales laterally; while simultaneously another pressure bearing force as a massive concrete weight presses downward thereby causing both forces to densely compact said garbage bales (2) compartmentalizing each and every compacted municipal solid waste garbage bays into a plurality of discrete densely and solidly packed and contained load bearing structurally reinforced chambers whose outermost boundaries are comprised of both said reinforced concrete walls and steel corrugated sheet-piling walls, after which a plurality of steel cable tension ties, which tension is thus brought about via a turn buckle, is attached from one corrugated steel sheet-piling wall to its neighboring and adjacent corrugated steel sheet-piling wall, such that both the top and bottom of said compartmentalized chambers will eventually receive reinforced poured concrete slabs with densely compacted municipal solid waste bales filling the void space therein such that said completed chambers now automatically become load bearing structural entities, after which the final plurality of the upper-most chambers of these reinforced garbage laden compartments eventually receive compacted engineered control fill above whereupon 1,020 square feet two bedroom apartment dwellings are ultimately erected and built upon said compacted and controlled fill.

\* \* \* \* \*